(12) United States Patent
Le

(10) Patent No.: US 8,099,855 B2
(45) Date of Patent: Jan. 24, 2012

(54) METHODS FOR FABRICATING PERPENDICULAR RECORDING HEADS WITH CONTROLLED SEPARATION REGIONS

(75) Inventor: Quang Le, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 1063 days.

(21) Appl. No.: 11/957,467

(22) Filed: Dec. 16, 2007

(65) Prior Publication Data

US 2009/0154009 A1  Jun. 18, 2009

(51) Int. Cl.
*G11B 5/127* (2006.01)
*H04R 31/00* (2006.01)

(52) U.S. Cl. ............... 29/603.16; 29/603.13; 29/603.14; 29/603.18; 360/121; 360/122; 360/317; 451/5; 451/41

(58) Field of Classification Search ............... 29/603.07, 29/603.12–603.16, 603.18; 360/121, 122, 360/125.51, 125.42, 125.46, 125.59, 125.64, 360/313, 317; 451/5, 8, 10, 36, 37, 41
See application file for complete search history.

(56) References Cited

U.S. PATENT DOCUMENTS

| | | | |
|---|---|---|---|
| 5,738,566 | A | 4/1998 | Li et al. |
| 6,212,761 | B1 | 4/2001 | Yoshida et al. |
| 6,347,983 | B1 | 2/2002 | Hao et al. |
| 6,609,948 | B1 | 8/2003 | Fontana, Jr. et al. |
| 6,623,330 | B2 | 9/2003 | Fukuroi |
| 6,728,067 | B2 | 4/2004 | Crawforth et al. |
| 6,758,722 | B2 | 7/2004 | Zhu |
| 6,786,803 | B2 | 9/2004 | Crawforth et al. |
| 6,884,148 | B1 | 4/2005 | Dovek et al. |
| 7,110,217 | B2 * | 9/2006 | Lee et al. .................. 360/125.42 |
| 7,120,988 | B2 * | 10/2006 | Le et al. ..................... 29/603.07 |
| 2002/0012204 | A1 | 1/2002 | Boutaghou et al. |
| 2004/0033763 | A1 | 2/2004 | Bunch et al. |
| 2005/0047012 | A1 | 3/2005 | Lille et al. |

(Continued)

FOREIGN PATENT DOCUMENTS

EP        0253461        5/1991

OTHER PUBLICATIONS

Satoru Araki et al, Fabrication and Electric Properites of Lapped Type of TMR Heads for 50 Gb/in2 and Beyond, IEEE Transactions on Magnetics, vol. 38, No. 1, Jan. 2002, pp. 72-77.
Yufeng Li and Dallas Meyer, The Effect of Lapping Method on the Thermal Reliability of a GMR Head Based on Black's Equation, IEEE, Mar. 2001.

(Continued)

*Primary Examiner* — Paul D Kim
(74) *Attorney, Agent, or Firm* — Duft Bornsen & Fishman, LLP

(57) ABSTRACT

Methods of recording head fabrication are provided to fabricate a region of separation material between a write pole and a shield of a write head that forms a controlled spacing between the write pole and the shield of the write head. The method comprises forming a mask structure having an opening exposing a write pole of the write head and forming separation material above the portions of the write pole exposed by the opening. The method further comprises removing the mask structure and forming a shield of the write head above the separation material. The separation material forms a spacing between the write pole and the shield, which controls the amount of flux from the write pole absorbed by a shield (e.g., a wrap around shield) of the write head.

13 Claims, 47 Drawing Sheets

U.S. PATENT DOCUMENTS

2005/0070206 A1 3/2005 Kasiraj et al.
2005/0185345 A1 8/2005 Ding et al.
2006/0002016 A1 1/2006 Nikitin et al.
2006/0028770 A1 2/2006 Etoh et al.
2006/0168798 A1 8/2006 Naka

OTHER PUBLICATIONS

Pei Zou and Rudy Kellner, Simulatenous Stripe and Throat Height Monitoring and Control for Perpendicular Head Using FIB/SEM, FEI Company, 2007.

* cited by examiner

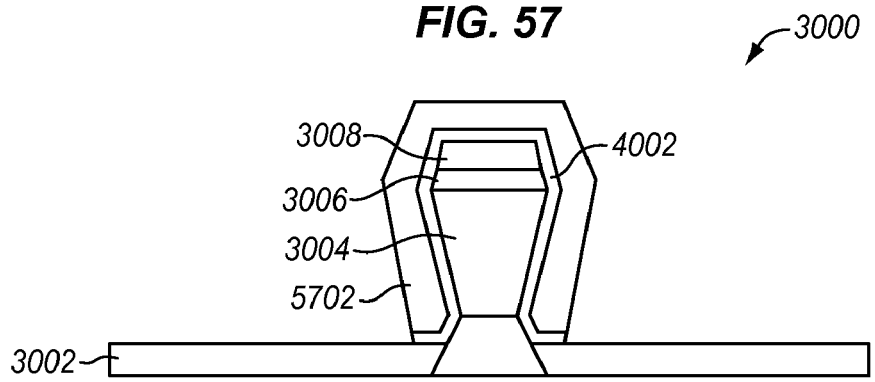
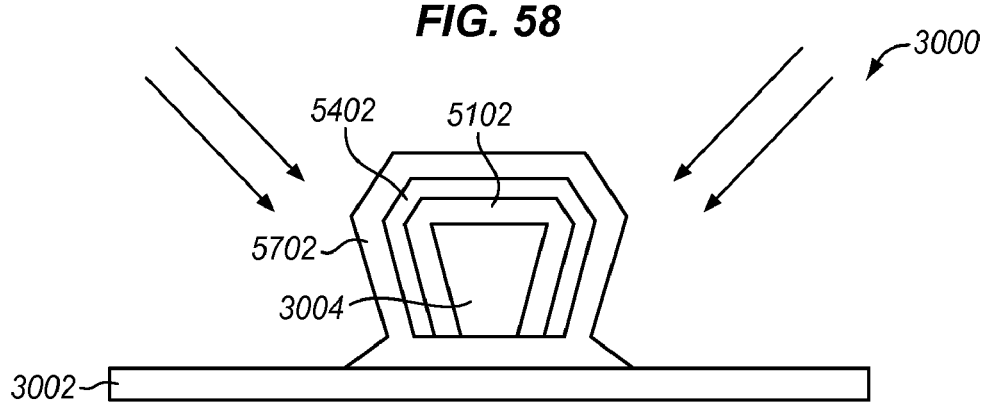
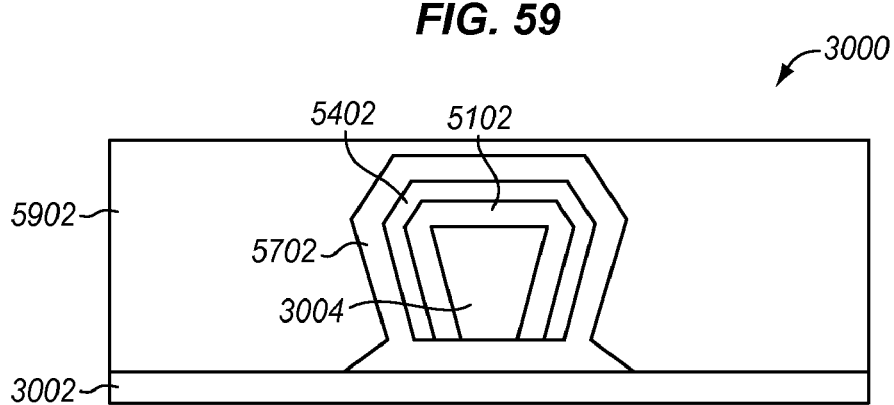

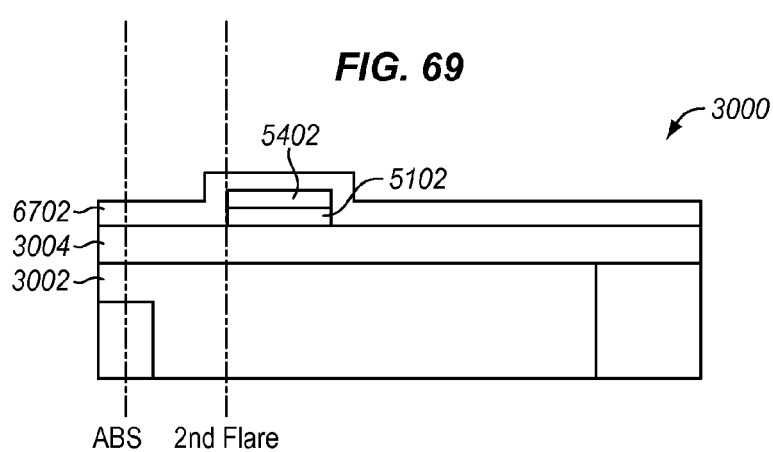
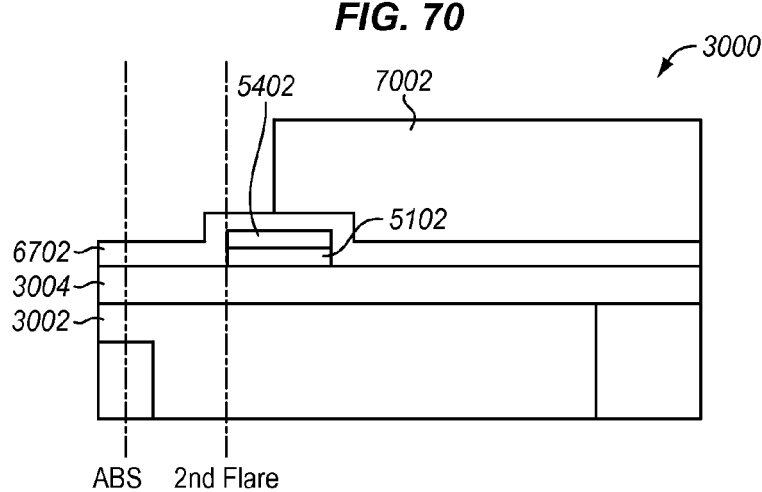
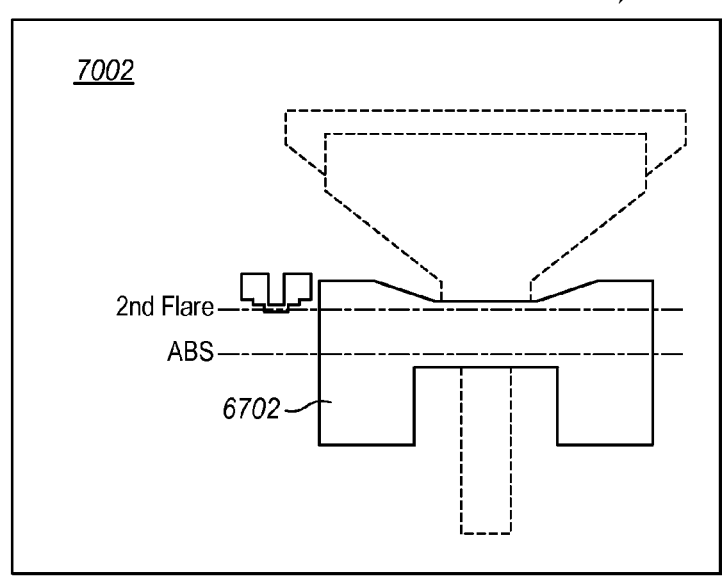

METHODS FOR FABRICATING PERPENDICULAR RECORDING HEADS WITH CONTROLLED SEPARATION REGIONS

BACKGROUND OF THE INVENTION

1. Field of the Invention

The invention is related to the field of magnetic recording disk drive systems and, in particular, to methods for fabricating perpendicular write heads with a controlled separation region providing spacing between a write pole and a shield of a write head.

2. Statement of the Problem

Magnetic hard disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

The increasing demand for higher areal density has caused a scaling of the recording head structure to smaller dimensions. In perpendicular recording devices, the distance separating the write pole and the wrap around shield needs to be accurately defined for optimal performance of the write pole. If the wrap around shield is placed too close to the write pole, then flux from the write pole is absorbed by the wrap around shield instead of being transmitted to the recording media. On the other hand, if the wrap around shield is placed too far away from the write pole, then the wrap around shield is ineffective. Thus, flux may be transmitted to adjacent bits of the recording media during the writing process, potentially corrupting the data of the adjacent bits. Present fabrication processes are ineffective for accurately defining the separation distance between the write pole and the wrap around shield. Thus, it is a problem for fabricating write heads providing optimal write performance.

Additionally, in longitudinal recording devices, the stripe height of the read sensor is an important parameter defined by lapping. The stripe height is controlled by electronic lapping guides (ELGs) which are aligned with the read sensor, or by the sensor resistance itself. When the read sensor resistance value reaches a target value, the lapping process is stopped.

By contrast, in perpendicular recording devices, critical elements defined by lapping now exist both in the read and write heads. For the write head, the placement of the flare point of the write pole and the back-edge of the shields are important to proper operation. Present lapping techniques are ineffective for simultaneously defining both the read and write elements within tight lapping tolerances. Thus, it is also a problem to accurately align elements of the recording head within the tight tolerances needed for optimal performance of the recording head.

SUMMARY OF THE SOLUTION

Embodiments of the invention solve the above and other related problems with methods for fabricating write heads that provide accurate alignment of the elements of the write head. Particularly, one exemplary method of fabrication provides a region of separation material between the write pole and the shield of the write head that forms a controlled spacing between the write pole and the shield of the write head. Advantageously, the spacing between the shield and the write head is more accurately controlled for optimal performance of the write head. Another exemplary method of fabrication provides a self-aligned process that defines multiple flare points of the write pole, and aligns the shield of the write head with respect to the flare points. Advantageously, the elements of the write head are more accurately aligned with respect to each other, and thus, the write head exhibits better writing performance due to the more accurate alignment of its elements.

An exemplary embodiment of the invention comprises a method for fabricating a write head. The method comprises forming a mask structure having an opening exposing a write pole of the write head and forming separation material above the portions of the write pole exposed by the opening. The method further comprises removing the mask structure and forming a shield of the write head above the separation material. The separation material forms a spacing between the write pole and the shield.

Another exemplary embodiment of the invention comprises a method for fabricating a write head. The method comprises forming a first mask structure over write pole material, forming a second mask structure over the first mask structure, and performing a removal process using the second mask structure to define a main pole of a write pole of the write head and a flared region of the write pole from the write pole material. The main pole and the flared region are coupled at a first flare point of the write head. The method further comprises removing the second mask structure, forming a third mask structure having an opening exposing at least a portion of the flared region and a portion of the main pole. An edge of the opening closest to a pole tip of the write pole defines a second flare point of the write pole. The method further comprises removing portions of the first mask structure exposed by the opening in the third mask structure, and forming magnetic material on the portions of the write pole and the flared region exposed by the opening in the third mask structure. An edge of the magnetic material closest to the pole tip forms the second flare point of the write pole.

The invention may include other exemplary embodiments described below.

DESCRIPTION OF THE DRAWINGS

The same reference number represents the same element or same type of element on all drawings.

FIG. 57 illustrates an ABS view of a write head after completion of step 2620 of FIGS. 26-29 in an exemplary embodiment of the invention.

FIG. 58 illustrates an ABS view of a write head after completion of step 2621 of FIGS. 26-29 in an exemplary embodiment of the invention.

FIG. 59 illustrates an ABS view of a write head after completion of step 2622 of FIGS. 26-29 in an exemplary embodiment of the invention.

FIG. 69 illustrates a cross sectional view of a write head after completion of step 2626 of FIGS. 26-29 in an exemplary embodiment of the invention.

FIG. 70 illustrates a cross sectional view of a write head after completion of step 2627 in an exemplary embodiment of the invention.

FIG. 71 illustrates a top view of a write head after completion of step 2627 of FIGS. 26-29 in an exemplary embodiment of the invention.

DETAILED DESCRIPTION OF THE INVENTION

Figure 1:
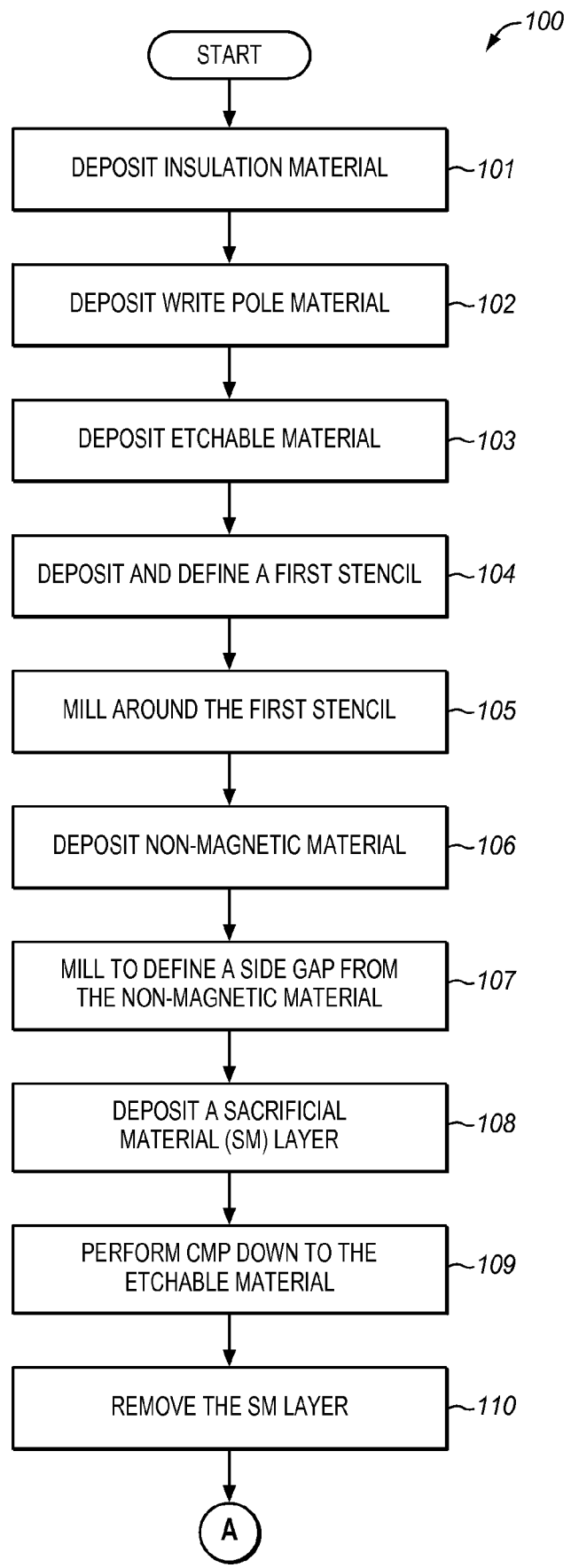
FIGS. 1-2 are flow charts illustrating a method for fabricating a write head in an exemplary embodiment of the invention.
Figure 105:
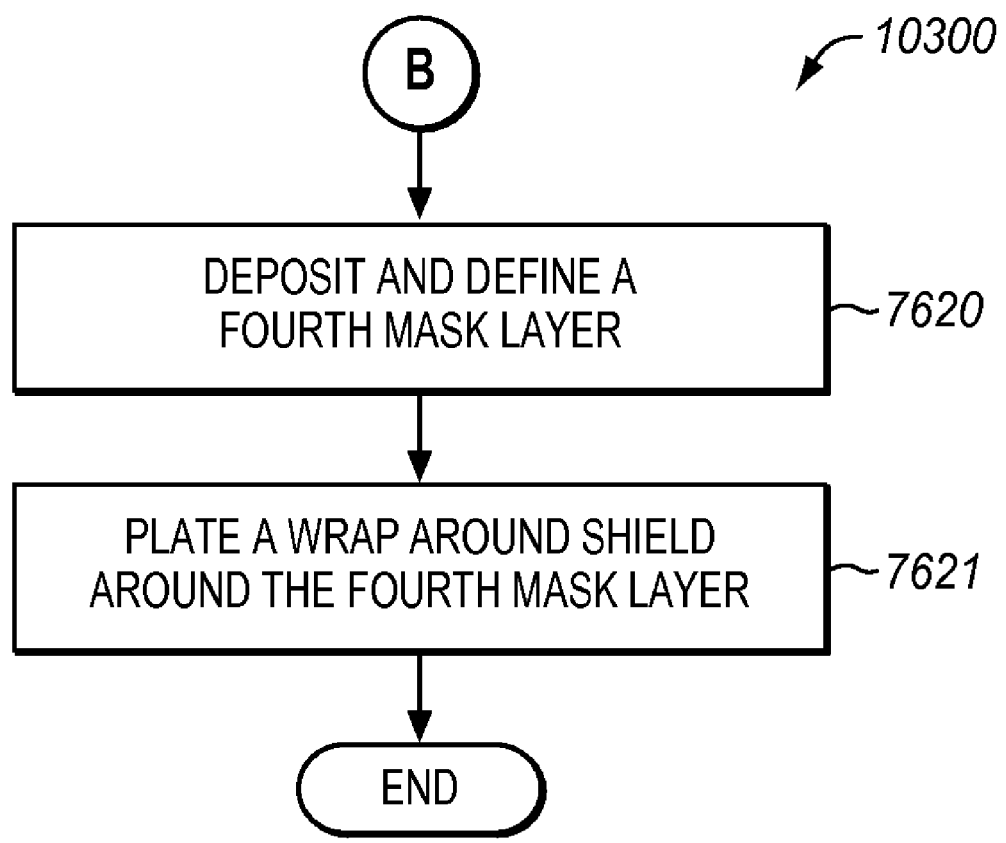

FIGS. 1-105 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 2:
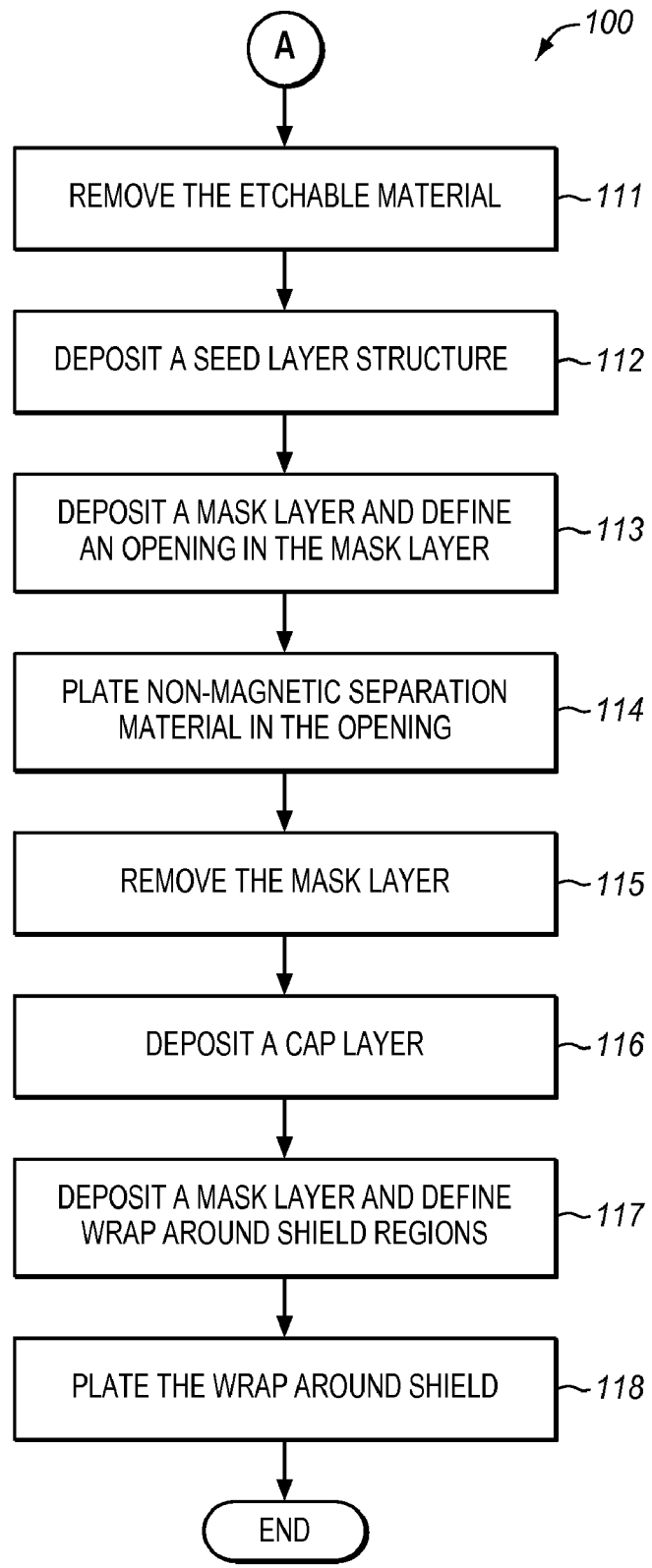

FIGS. 1-2 are flow charts illustrating a method 100 for fabricating a write head in an exemplary embodiment of the invention. Particularly, FIGS. 1-2 illustrate a method for fabricating a write head with a controlled separation region (also described herein as a bump region) between the write pole and the shield structure. FIGS. 3-25 illustrate a write head 300 during fabrication according to method 100 of FIG. 1, and method 100 will be discussed in reference to write head 300. The steps of method 100 may not be all inclusive, and may include other steps not shown for the sake of brevity.

Figure 3:
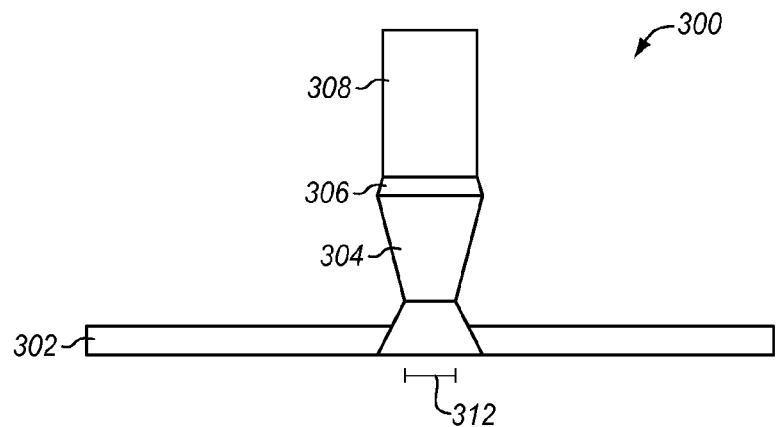
FIG. 3 illustrates an air bearing surface (ABS) view of a write head during fabrication after completion of step 105 of FIGS. 1-2 in an exemplary embodiment of the invention.

Step 101 (see FIG. 1) comprises depositing a layer of insulation material 302 (see FIG. 3). Insulation material 302 may be formed over a substrate (not shown), and may comprise alumina or another material having similar properties. Step 102 (see FIG. 1) comprises depositing a layer of write pole material 304 above insulation material 302. Write pole material 304 may comprise CoFe or a material having similar magnetic properties. Step 103 (see FIG. 1) comprises depositing a layer of etchable material 306 over write pole material 304. The layer of etchable material 306 may comprise a carbon material with a film density higher than about 1.8 g/cc. Etchable material 306 may comprise a layer of diamond like carbon (DLC) (e.g., ion beam deposition (IBD) carbon, or filtered cathodic arc carbon), or any type of etchable material that is utilized as a hard mask to pattern transfer the write pole photo into write pole material 304 and, optionally, as a chemical mechanical polishing (CMP) stop layer to protect write pole material 304 during a subsequently performed CMP process.

Step 104 (see FIG. 1) comprises depositing a first mask layer, such as DURIMIDE® and silicon oxide, over etchable material 306, and performing a photolithographic process and subsequent image transfer by reactive ion etching steps to define a first stencil 308 from the first mask layer and etchable material 306. Stencil 308 is utilized to define a track width of a write pole (e.g., the width of the pole tip) and a flared region of the write pole (also referred to as the yoke of the write pole) from write pole material 304. Step 105 (see FIG. 1) comprises milling around stencil 308 to define a track width 312 and a flared region (not visible in FIG. 3) of a write pole 304. An angled milling process may be utilized to remove portions of write pole material 304 exposed by stencil 308, thus defining track width 312 (e.g., a main pole) of write pole 304 and the flared region (not shown) of write pole 304. FIG. 3 illustrates an ABS view of write head 300 after completion of step 105 in an exemplary embodiment of the invention.

Figure 4:
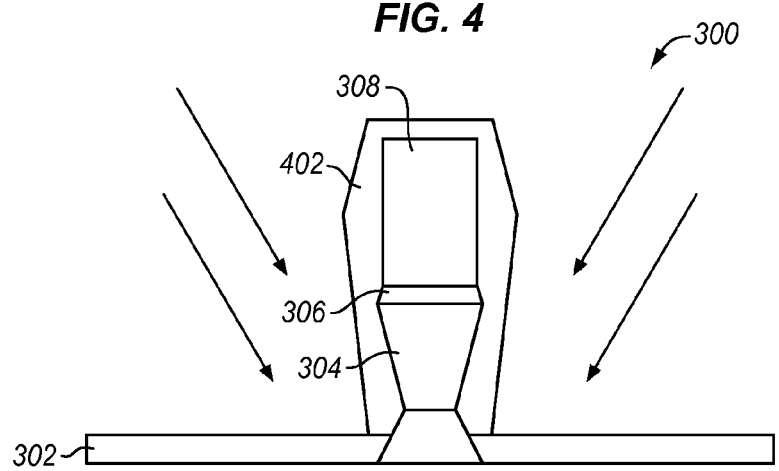
FIG. 4 illustrates an ABS view of a write head during fabrication after completion of step 107 of FIGS. 1-2 in an exemplary embodiment of the invention.

Step 106 (see FIG. 1) comprises depositing side gap material 402 (see FIG. 4) which forms a side gap of write head 300. Side gap material may comprise alumina deposited in an atomic layer deposition (ALD) process, or may comprise other types of insulating material having similar properties. Step 107 (see FIG. 1) comprises milling to reduce a width of side gap material 402 and define the side gap of write head 300. The milling process additionally recesses the floor of write head 300. FIG. 4 illustrates an ABS view of write head 300 after completion of step 107 in an exemplary embodiment of the invention.

Figure 5:
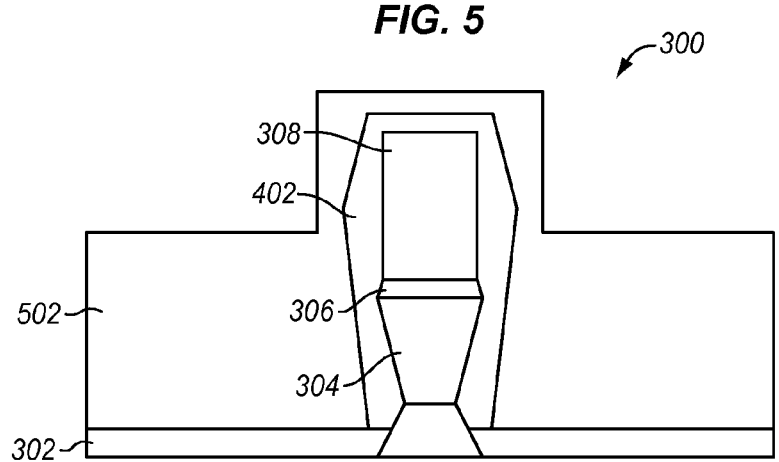
FIG. 5 illustrates an ABS view of a write head during fabrication after completion of step 108 of FIGS. 1-2 in an exemplary embodiment of the invention.

Step 108 (see FIG. 1) comprises depositing a sacrificial material (SM) layer 502 (see FIG. 5) that is used as structural support for layer 304 during CMP to remove layer 308. SM layer 502 may comprise $SiO_2$ or other types of etchable materials, such as $Si_xN_y$ or $SiO_xN_y$. FIG. 5 illustrates an ABS view of write head 300 after completion of step 108 in an exemplary embodiment of the invention.

Figure 6:
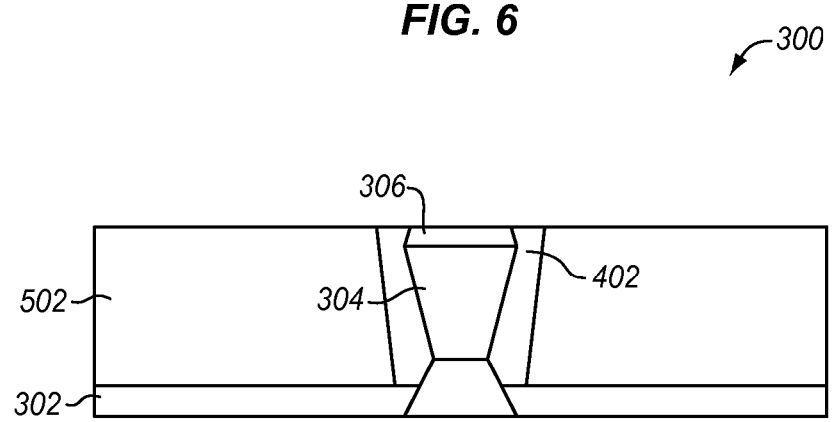
FIG. 6 illustrates an ABS view of a write head during fabrication after completion of step 109 of FIGS. 1-2 in an exemplary embodiment of the invention.

Step 109 (see FIG. 1) comprises performing a CMP process down to etchable material 306 to remove mask layer 308 and portions of side gap material 402. The CMP process also removes portions of SM layer 502 and planarizes a top surface of write head 300. Layer 306 serves both as an ion mill hard mask and CMP stop layer. FIG. 6 illustrates an ABS view of write head 300 after completion of step 109 in an exemplary embodiment of the invention.

Figure 7:
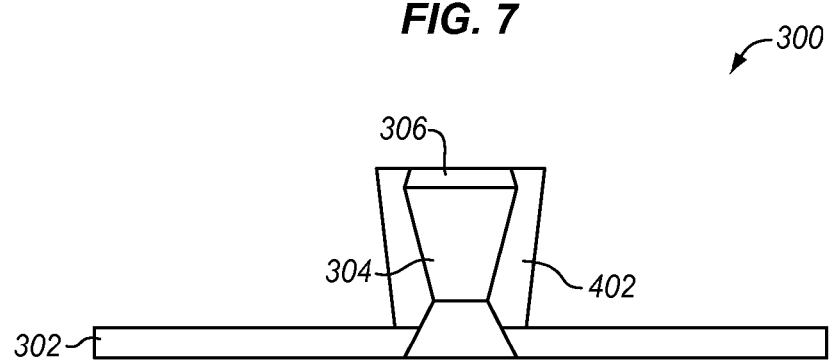
FIG. 7 illustrates an ABS view of a write head during fabrication after completion of step 110 of FIGS. 1-2 in an exemplary embodiment of the invention.

Step 110 (see FIG. 2) comprises etching to remove SM layer 502 remaining on side regions of write pole 304. The etching process may comprise a reactive ion etching (RIE) process using CF4 RIE chemistry. If SM layer 502 was not deposited during step 108 prior to the CMP process hi step 109, then step 110 will be unnecessary. FIG. 7 illustrates an ABS view of write head 300 after completion of step 110 in an exemplary embodiment of the invention.

Figure 8:
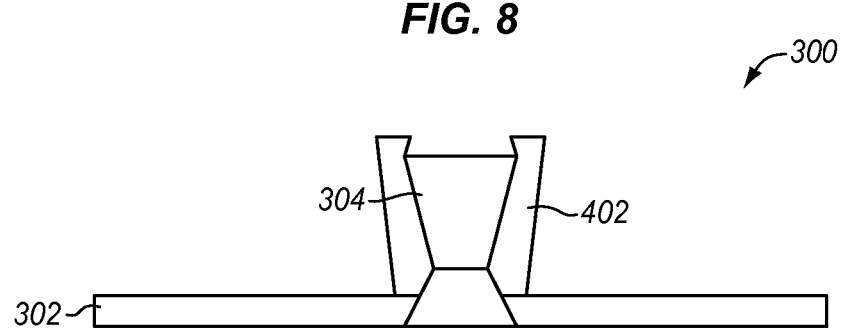
FIG. 8 illustrates an ABS view of a write head during fabrication after completion of step 111 of FIGS. 1-2 in an exemplary embodiment of the invention.
Figure 9:
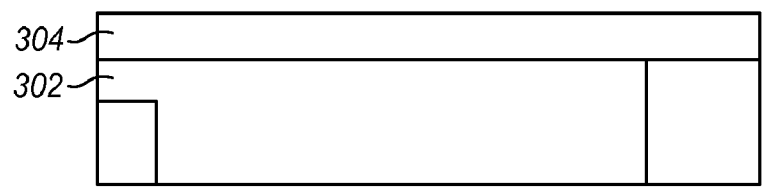
FIG. 9 illustrates a cross sectional view of a write head during fabrication after completion of step 111 of FIGS. 1-2 in an exemplary embodiment of the invention.

Step 111 (see FIG. 2) comprises performing an etching process to remove etchable material 306. The etching may comprise RIE using either $O_2$ or $CO_2$ chemistry. The etching process may leave a notch on a top surface of write pole 304 between side gap material 402 on side regions of write pole 304. FIG. 8 illustrates an ABS view of write head 300 after completion of step 111 in an exemplary embodiment of the invention. FIG. 9 illustrates a cross sectional view of write head 300 after completion of step 111 in an exemplary embodiment of the invention.

Figure 10:
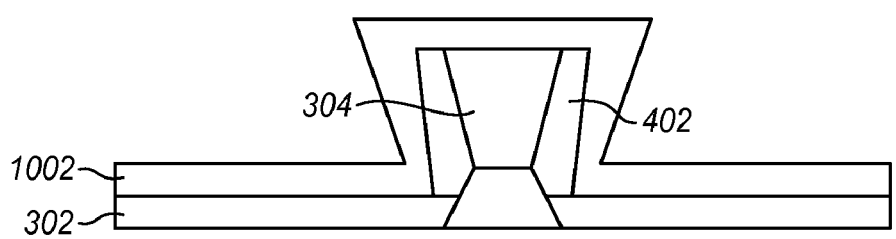
FIG. 10 illustrates an ABS view of a write head during fabrication after completion of step 112 of FIGS. 1-2 in an exemplary embodiment of the invention.

Step 112 (see FIG. 2) comprises forming a seed layer structure 1002 (see FIG. 10). Seed layer structure 1002 is utilized to promote growth of a subsequently formed separation material during a plating process. Seed layer structure 1002 may comprise multiple non-magnetic layers, including a Ta adhesion layer and a Rh seed layer. Other materials may be utilized in seed layer structure 1002, including Cr or Si as adhesion layer materials, and/or Pd, Au, Ag, Ir, or Ru as seed layer materials. FIG. 10 illustrates an ABS view of write head 300 after completion of step 112 in an exemplary embodiment of the invention.

Figure 11:
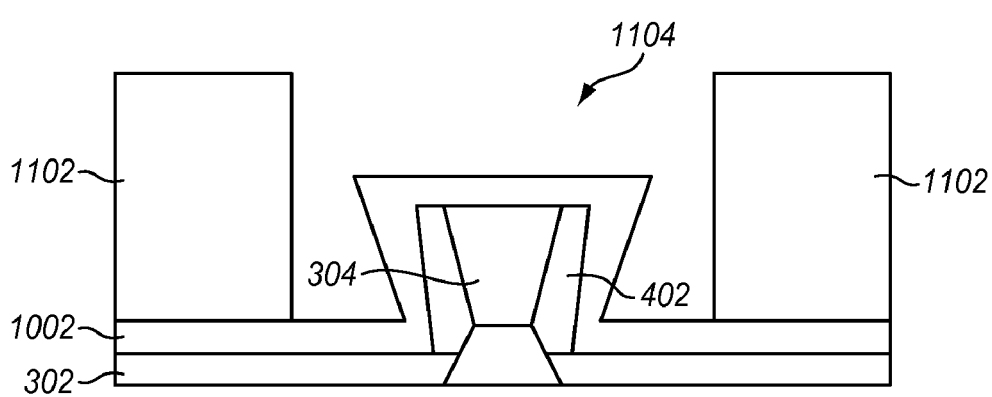
FIG. 11 illustrates a view of a write head during fabrication from the perspective of an edge of an opening in a mask layer after completion of step 113 of FIGS. 1-2 in an exemplary embodiment of the invention.
Figure 12:
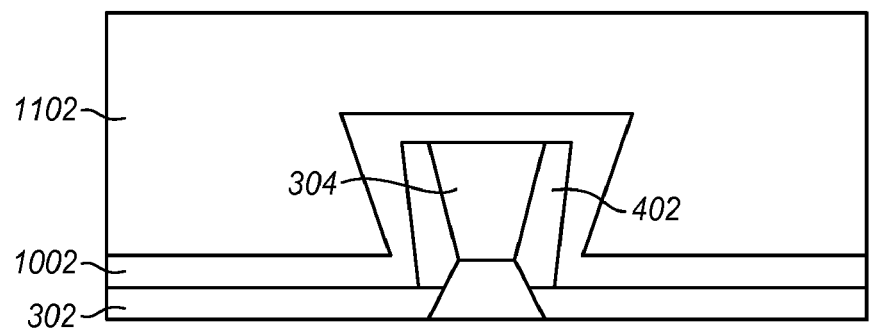
FIG. 12 illustrates an ABS view of a write head during fabrication after completion of step 113 of FIGS. 1-2 in an exemplary embodiment of the invention.
Figure 13:
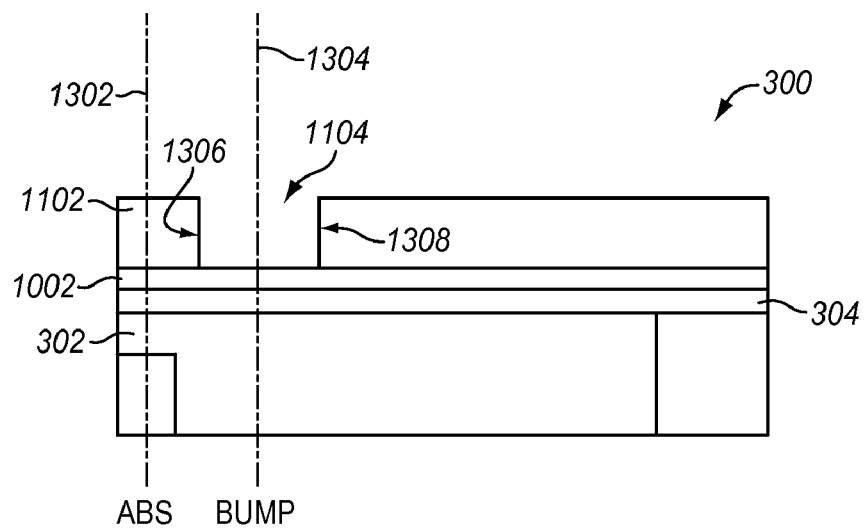
FIG. 13 illustrates a cross sectional view of a write head during fabrication after completion of step 113 of FIGS. 1-2 in an exemplary embodiment of the invention.

Step 113 (see FIG. 2) comprises depositing a second mask layer 1102 (see FIG. 11) and performing a photolithographic process on mask layer 1102 to form an opening 1104 in mask layer 1102. The photolithographic process transforms a resistive material comprising mask layer 1102 into a mask structure. Opening 1104 exposes a portion of seed layer structure 1002 covering write pole 304. More particularly, opening 1104 exposes portions of seed layer structure 1002 covering at least a portion of a flared region (not shown) of write pole 304 and a portion of a main pole of write pole 304. As an option although not shown, a bottom anti-reflective coating (BARC), such as $SiO_xN_y$ or $Si_xN_y$, may be used to minimize reflective notching. In this case, the BARC may be deposited after seed layer structure 1002 and RIE is used after opening 1104 to expose seed layer structure 1002 for plating. FIG. 11 illustrates an ABS view of write head 300 after completion of step 113 from the perspective of an edge of opening 1104 in an exemplary embodiment of the invention. FIG. 12 illustrates an ABS view of write head 300 after completion of step 113 in an exemplary embodiment of the invention. FIG. 13 illustrates a cross sectional view of write head 300 after completion of step 113 in an exemplary embodiment of the invention.

In FIG. 13, the location of an ABS 1302 (which will be subsequently formed by a lapping process) is illustrated in relation to a bump region 1304 (to be subsequently filled) of write head 300. Bump region 1304 will be utilized to subsequently form a region of separation material between write pole 304 and a subsequently formed shield of write head 300. Bump region 1304 is defined as the area between edges 1306 and 1308 of opening 1104.

Step 114 (see FIG. 2) comprises plating exposed portions of seed layer structure 1002 with a separation material 1402 (see FIG. 14) to fill in bump region 1304. The plating process forms separation material 1402 within the region of opening 1104, and does not deposit separation material 1402 on areas of write head 300 covered by mask layer 1102. Separation material 1402 forms a controlled spacing between write pole 304 and a subsequently formed shield of write head 300. This area is known as a bump region 1304 because a subsequently formed shield gap structure includes a bump over separation material 1402. Separation material 1402 may comprise NiP, Au, Pd, Cu, or a material having similar non-magnetic properties.

Figure 14:
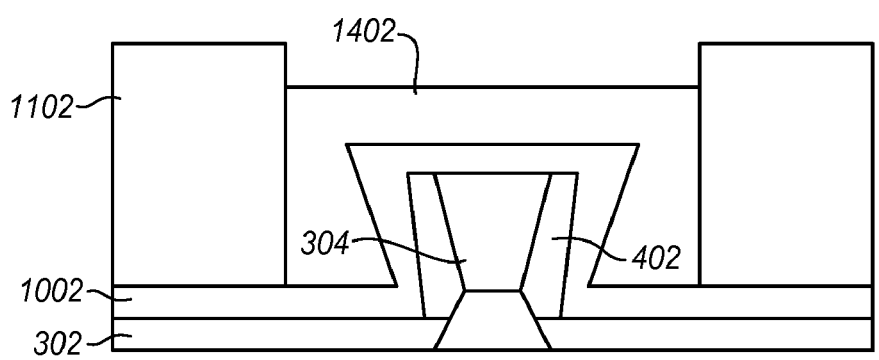
FIG. 14 illustrates a view of a write head during fabrication from the perspective of an edge of the opening in a mask structure after completion of step 114 of FIGS. 1-2 in an exemplary embodiment of the invention.
Figure 15:
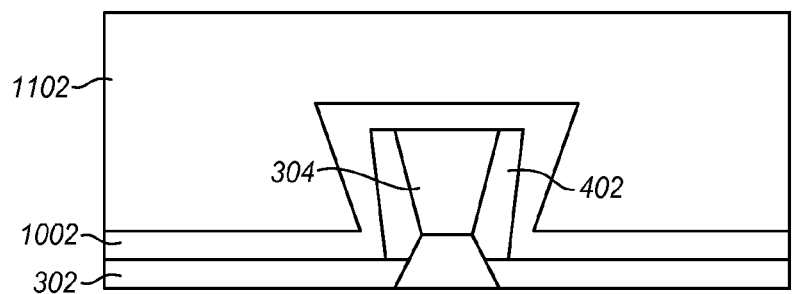
FIG. 15 illustrates an ABS view of a write head during fabrication after completion of step 114 of FIGS. 1-2 in an exemplary embodiment of the invention.
Figure 16:
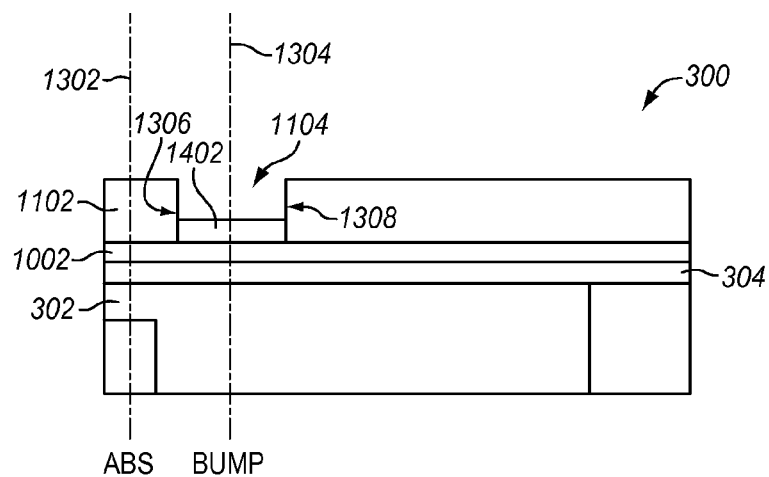
FIG. 16 illustrates a cross sectional view of a write head during fabrication after completion of step 114 of FIGS. 1-2 in an exemplary embodiment of the invention.

FIG. 14 illustrates a view of write head 300 from the perspective of edge 1306 (see FIG. 13) of opening 1104 after completion of step 114 in an exemplary embodiment of the invention. FIG. 15 illustrates an ABS view of write head 300 after completion of step 114 in an exemplary embodiment of the invention. FIG. 16 illustrates a cross sectional view of write head 300 after completion of step 114 in an exemplary embodiment of the invention. The area where separation material 1402 is formed corresponds with the location of the flare point of the write pole. Separation material 1402 is formed proximate to an upper portion of the pole tip (i.e., the portion of the pole tip nearest the flare point), and is not formed proximate to a lower portion of the pole tip (i.e., the portion of the pole nearest the air bearing surface (ABS)). A subsequently-formed wrap around shield will thus have less of a separation near the ABS of the pole tip as compared to the separation near the flare point.

Figure 17:
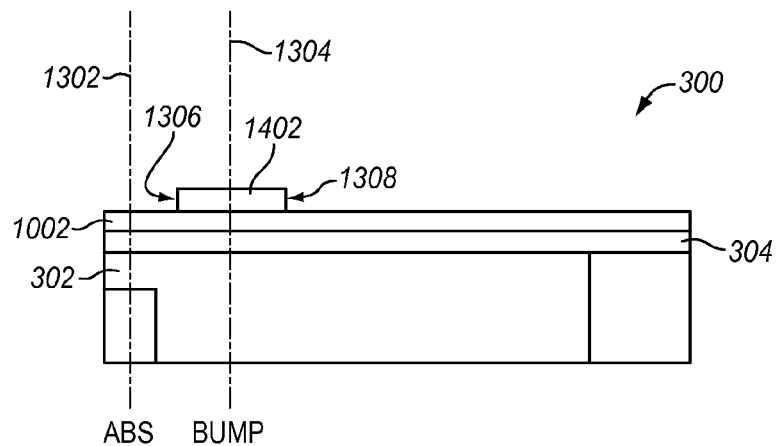
FIG. 17 illustrates a cross sectional view of a write head during fabrication after completion of step 115 of FIGS. 1-2 in an exemplary embodiment of the invention.

Step 115 (see FIG. 2) comprises removing mask layer 1102. Mask layer 1102 may be removed using a conventional lift-off process. The removal of mask layer 1102 exposes portions of seed layer structure 1002 not covered by separation material 1402. FIG. 17 illustrates a cross sectional view of write head 300 after completion of step 115 in an exemplary embodiment of the invention.

Figure 18:
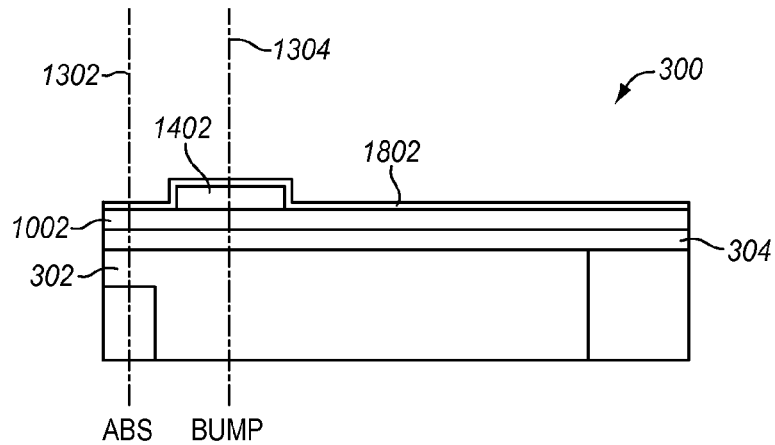
FIG. 18 illustrates a cross sectional view of a write head during fabrication after completion of step 116 of FIGS. 1-2 in an exemplary embodiment of the invention.

Step 116 (see FIG. 2) comprises depositing an optional cap layer 1802 (see FIG. 18). Cap layer 1802 is formed as an adhesion layer for a subsequently formed shield of write head 300. If separation material 1402 comprises NiP, then cap layer 1802 may comprise CoFe, NiFe, or alloys thereof. FIG. 18 illustrates a cross sectional view of write head 300 after completion of step 116 in an exemplary embodiment of the invention.

Step 117 (see FIG. 2) comprises depositing a third mask layer 1902 (see FIG. 19) and performing a photolithographic process on mask layer 1902 to form an opening 2002 (see FIG. 20) exposing portions of cap layer 1802. If cap layer 1802 is not deposited, then opening 2002 will expose portions of separation material 1402 and seed layer structure 1002. Opening 2002 defines an area or location where a subsequently formed shield will be plated on write head 300. Opening 2002 is toward the ABS side of write head 300 is a position for a wrap around shield.

Figure 19:
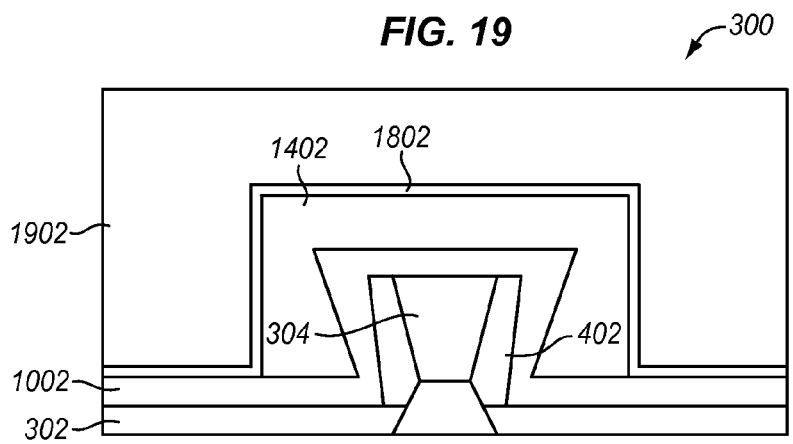
FIG. 19 illustrates an ABS view of a write head during fabrication from the perspective of a bump region after completion of step 117 of FIGS. 1-2 in an exemplary embodiment of the invention.
Figure 20:
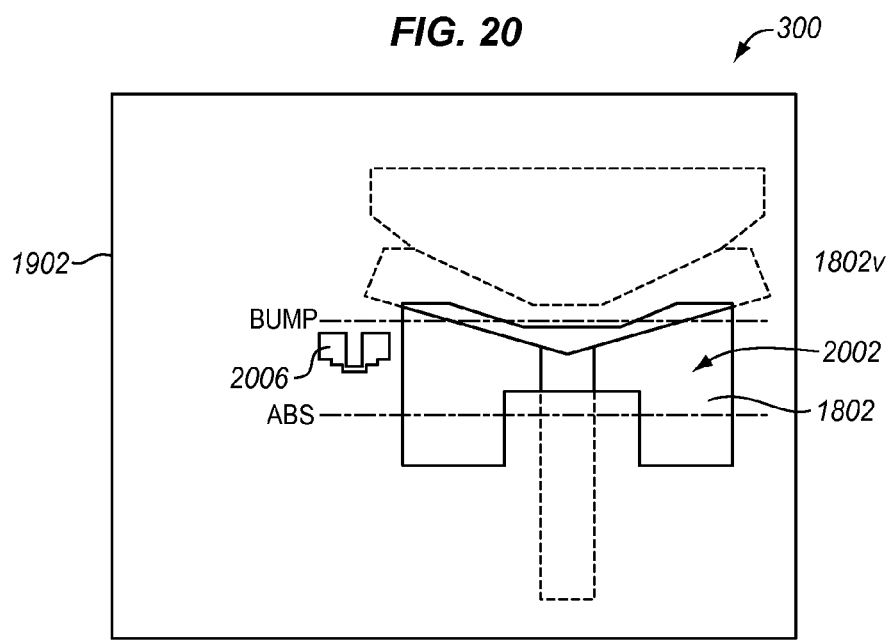
FIG. 20 illustrates a top view of a write head during fabrication after completion of step 117 of FIGS. 1-2 in an exemplary embodiment of the invention.
Figure 21:
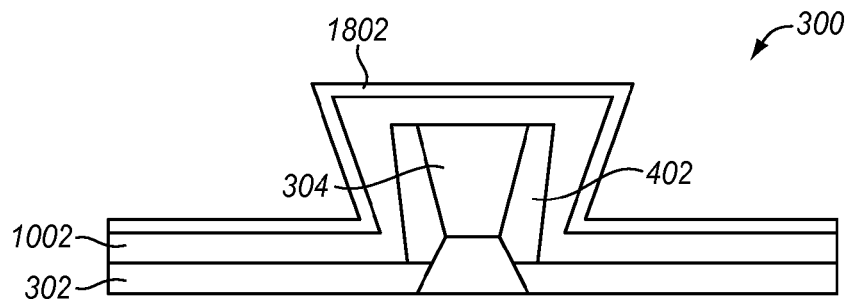
FIG. 21 illustrates an ABS view of a write head during fabrication after completion of step 117 of FIGS. 1-2 in an exemplary embodiment of the invention.
Figure 22:
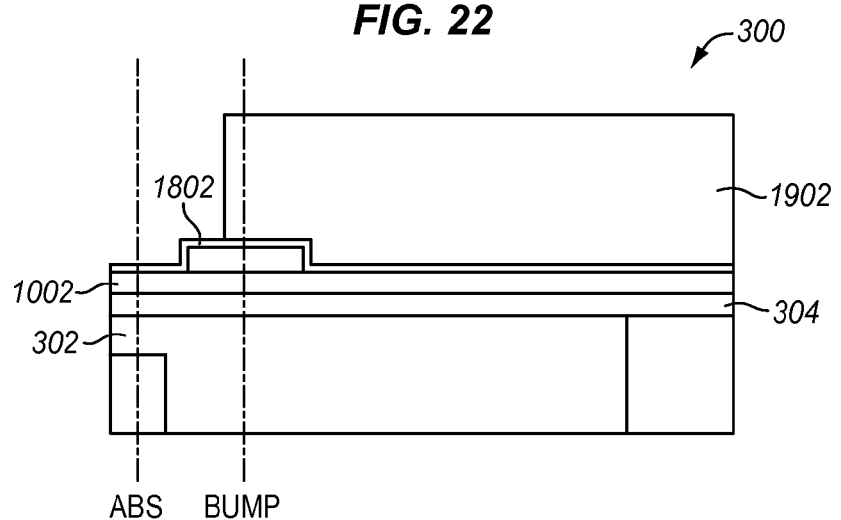
FIG. 22 illustrates a cross sectional view of a write head during fabrication after completion of step 117 of FIGS. 1-2 in an exemplary embodiment of the invention.

FIG. 19 illustrates an ABS view from bump region 1304 (see FIG. 13) of write head 300 after completion of step 117 in an exemplary embodiment of the invention. FIG. 20 illustrates a top view of write head 300 after completion of step 117 in an exemplary embodiment of the invention. FIG. 21 illustrates an ABS of write head 300 after completion of step 117 in an exemplary embodiment of the invention. FIG. 22 illustrates a cross sectional view of write head 300 after completion of step 117 in an exemplary embodiment of the invention. The photolithographic process may optionally comprise forming electronic lapping guide (ELGs) openings 2006 (see FIG. 2) in mask layer 1102 or mask layer 1902. ELG openings 2006 may then be utilized to plate material and form ELGs for write head 300. After the ELG 2006 is plated, although not shown, the write pole is masked and protected with resist. Ion milling is then performed to image transfer the plated ELGs into the seed-layer. The plated ELGs are wet-etched and the remaining seed layer serves as the ELGs. In subsequent processing, leads are connected to the ELGs.

Figure 23:
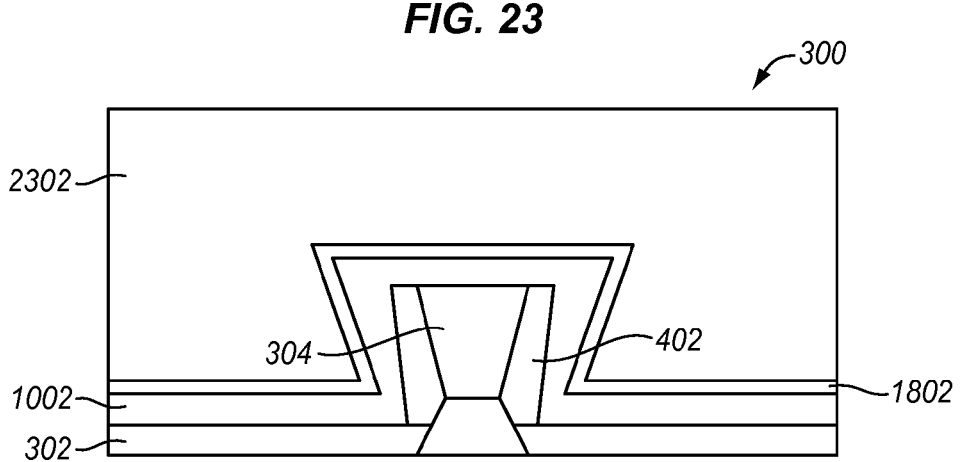
FIG. 23 illustrates an ABS view of a write head during fabrication after completion of step 118 of FIGS. 1-2 in an exemplary embodiment of the invention.
Figure 24:
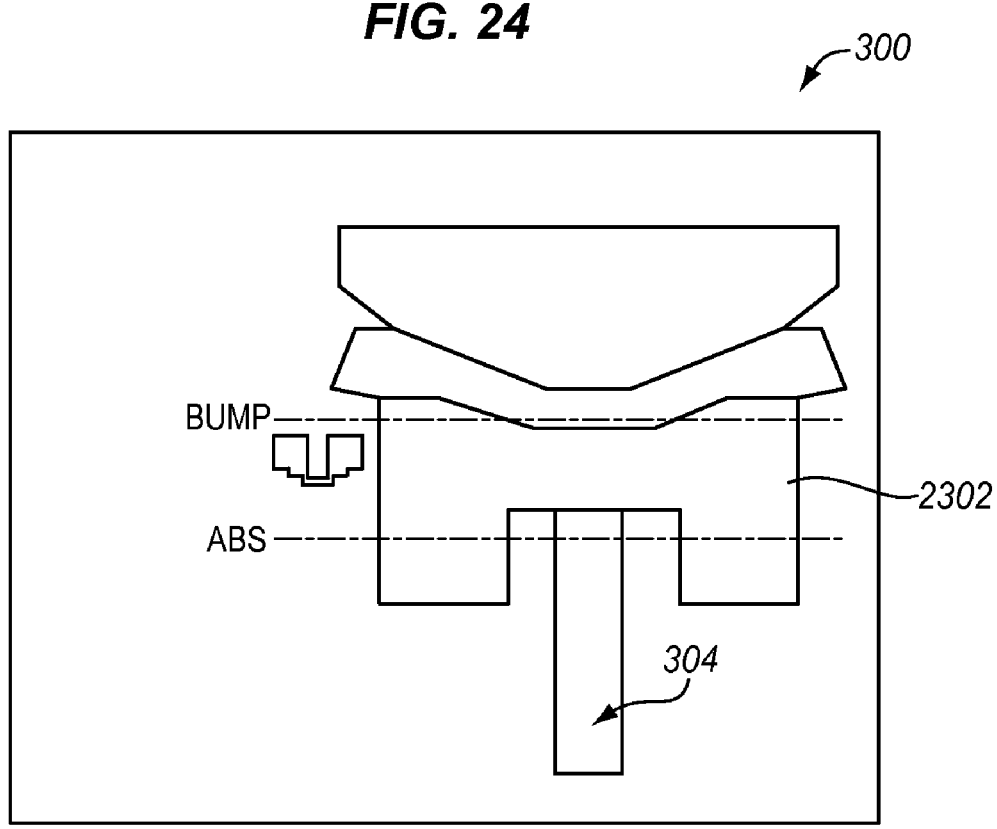
FIG. 24 illustrates a top view of a write head during fabrication after completion of step 118 of FIGS. 1-2 in an exemplary embodiment of the invention.
Figure 25:
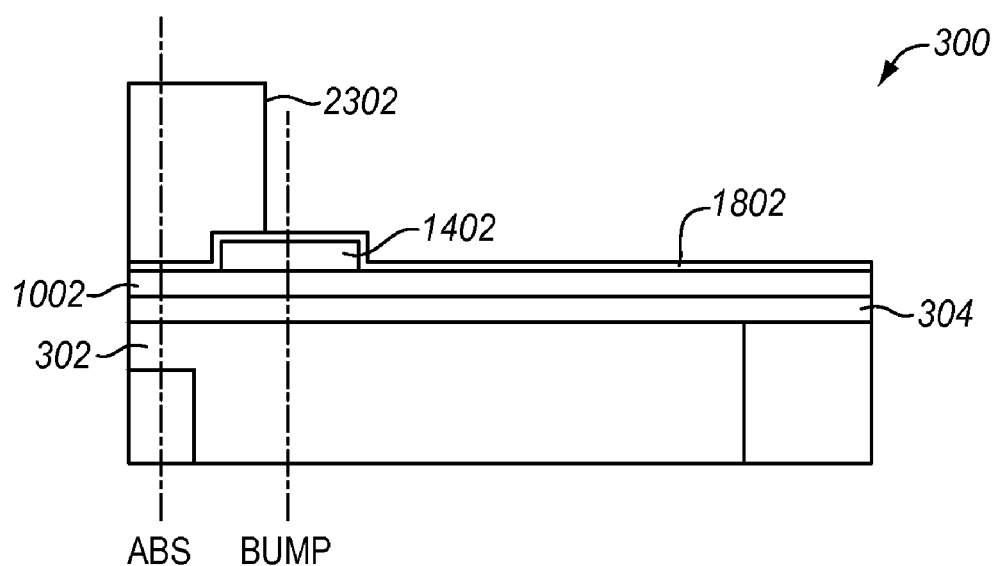
FIG. 25 illustrates a cross sectional view of a write head during fabrication after completion of step 118 of FIGS. 1-2 in an exemplary embodiment of the invention.
Figure 26:
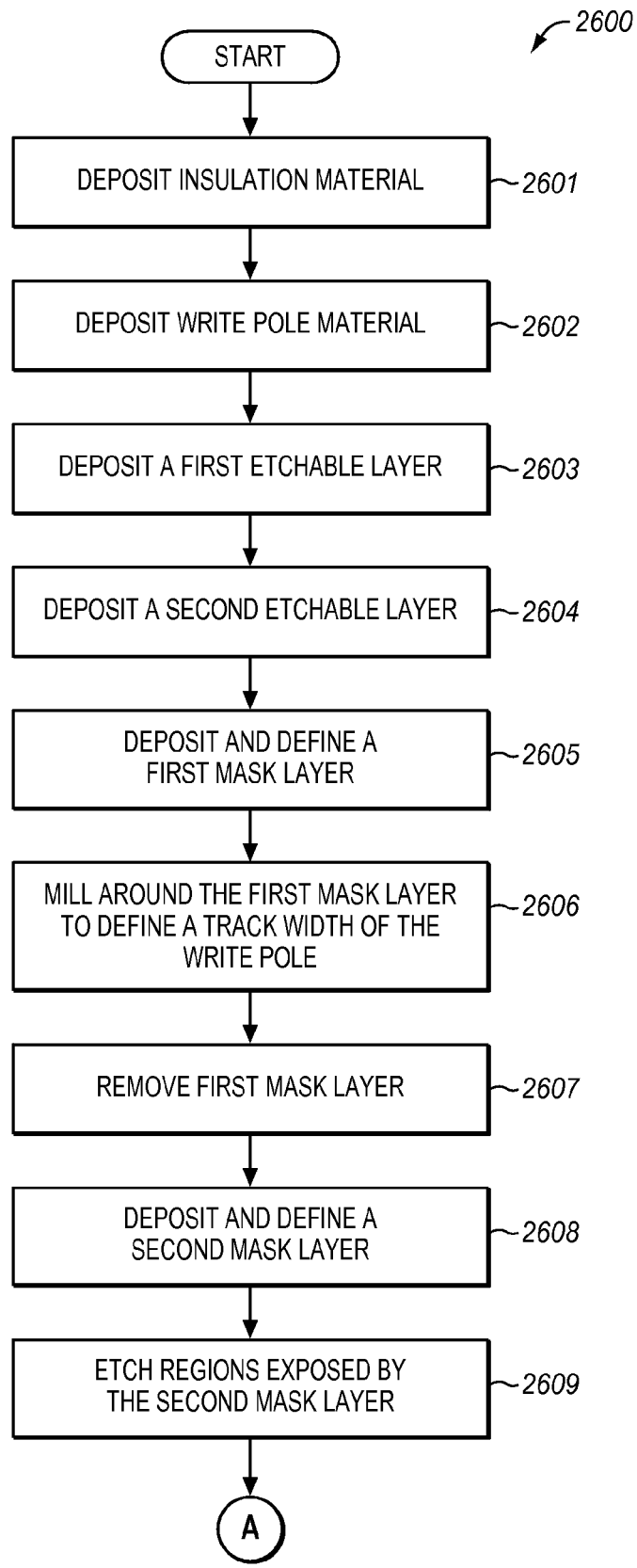
FIGS. 26-29 are flow charts illustrating another method for fabricating a write head in an exemplary embodiment of the invention.
Figure 27:
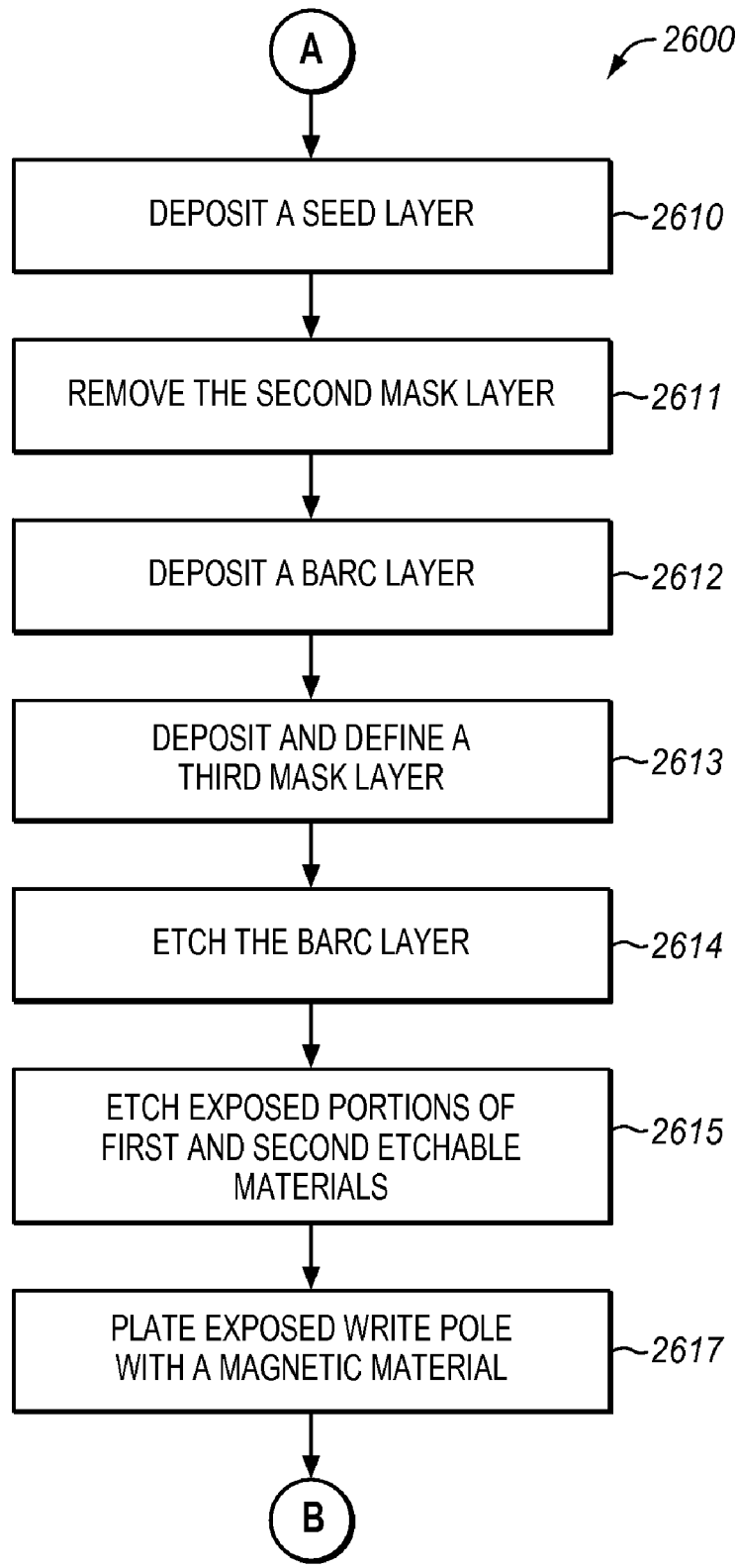
Figure 28:
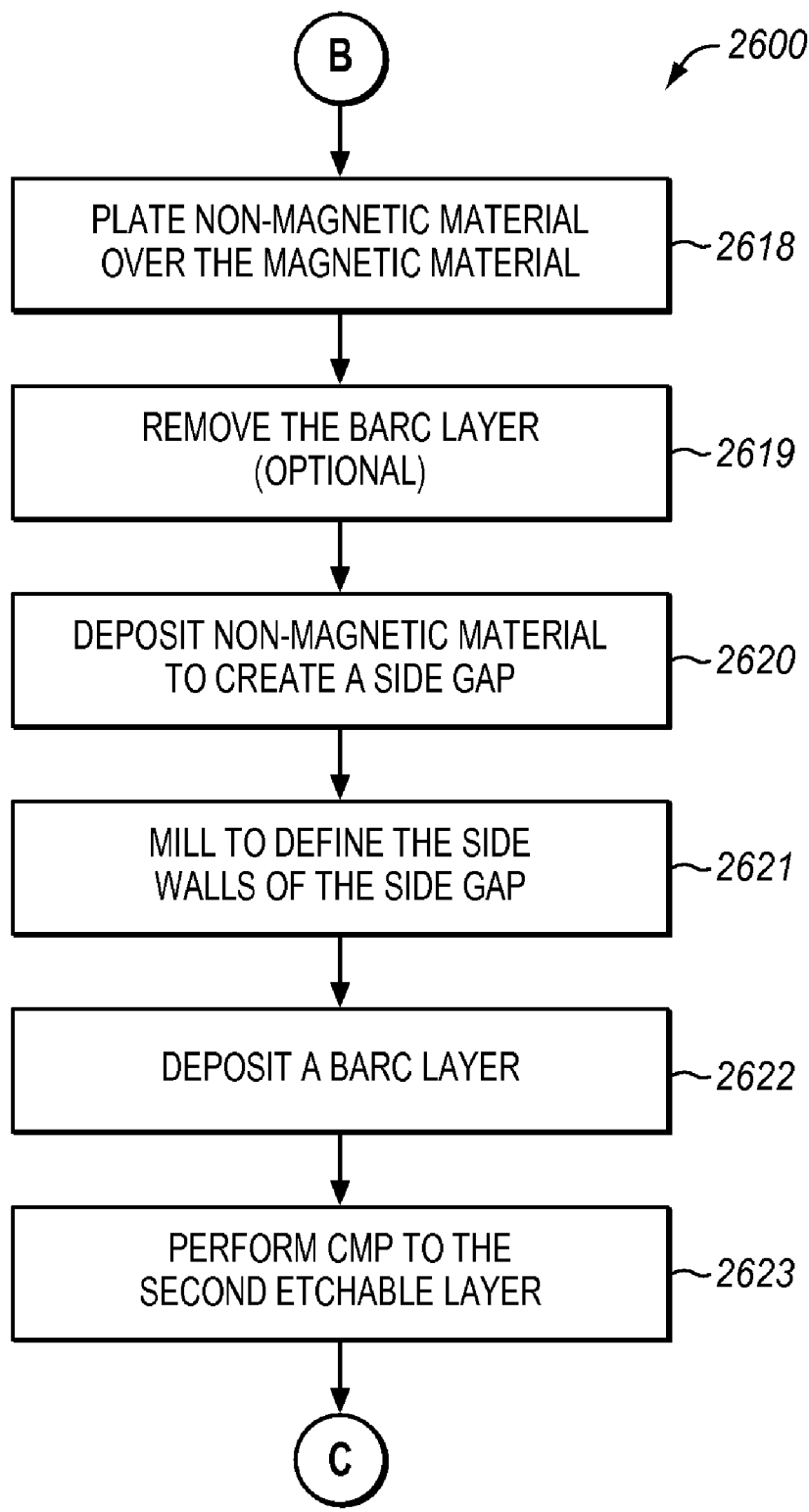
Figure 29:
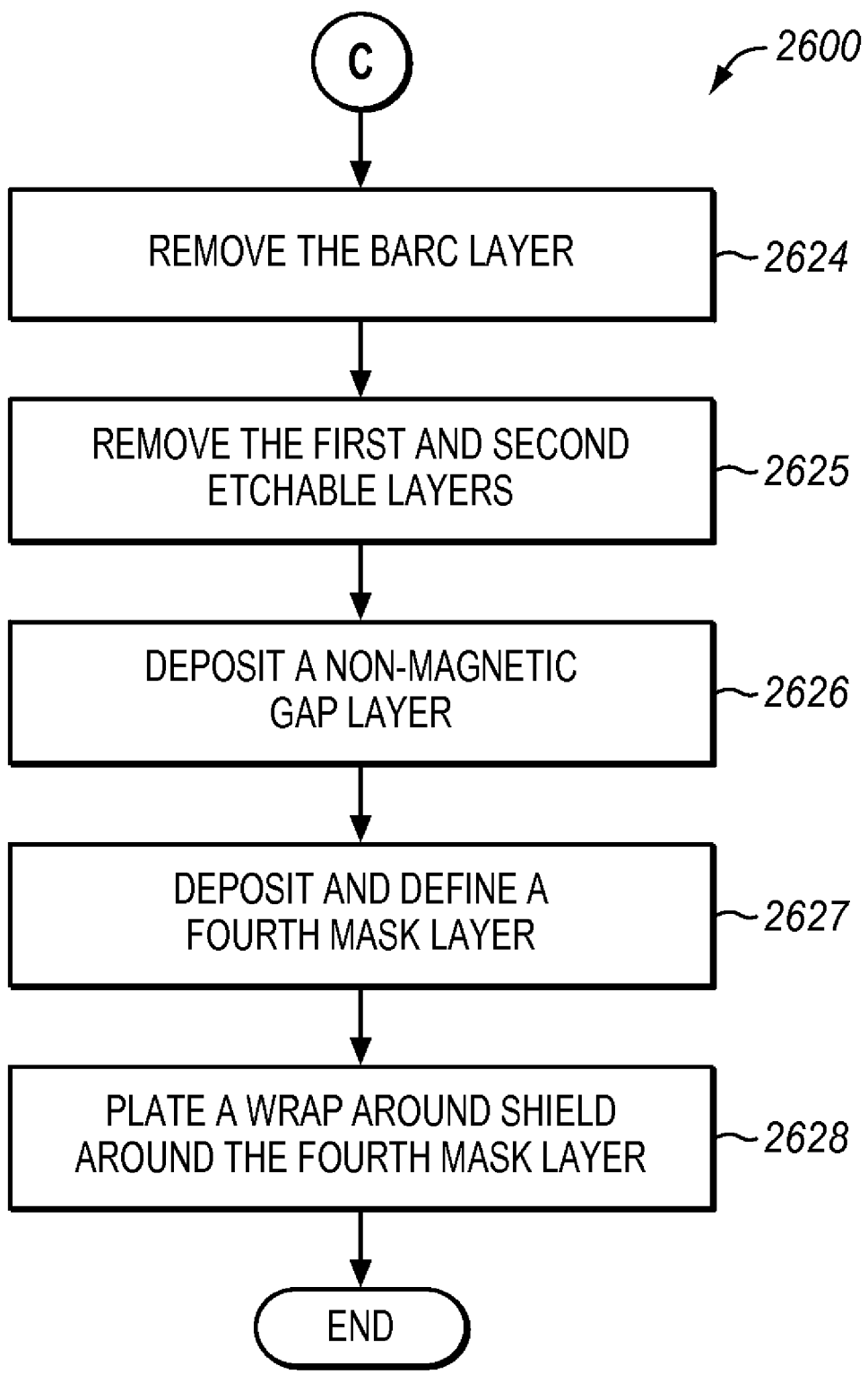

Step 118 (See FIG. 2) comprises plating exposed portions of cap layer 1802 to form a wrap around shield 2302 (see FIG. 23). Wrap around shield 2302 may comprise a single or bi-layer of CoFe, NiFe, or alloys thereof. Mask layer 1902 may then be removed, and subsequent processes may be performed to complete the fabrication process of write head 300. FIG. 23 illustrates an ABS view of write head 300 after completion of step 118 in an exemplary embodiment of the invention. FIG. 24 illustrates a top view of write head 300 after completion of step 118 in an exemplary embodiment of the invention. FIG. 25 illustrates a cross sectional view of write head 300 after completion of step 118 in an exemplary embodiment of the invention. After plating the wrap around shield 2302, if the optional cap layer 1802 is used, then an ion milling process is performed to remove the exposed portions of the cap layer 1802.

In FIG. 25, wrap around shield 2302 is formed over a portion of separation material 1402. However, a portion of separation material 1402 remains uncovered by wrap around shield 2302 after the plating process of step 118. Further, write head 300 has a region of separation material 1402 providing a controlled spacing between write pole 304 and wrap around shield 2302. Separation material 1402 is formed on an upper portion of the pole tip proximate to the flare point but not on a lower portion of the pole tip proximate to an air bearing surface. Thus, the separation material creates a larger spacing between the wrap around shield and the upper portion of the pole tip as compared to the spacing between the wrap around shield and the lower portion of the pole tip.

Method 100 fabricates spacing between write pole 304 and wrap around shield 2302 that is more easily controllable than prior art fabrication techniques. Advantageously, this allows the spacing to be optimally defined such that write head 300 has optimal writability performance.

FIGS. 26-29 are flow charts illustrating another method 2600 for fabricating a write head in an exemplary embodiment of the invention. FIGS. 30-77 illustrate top, side, and cross sectional views of a write head 3000 during fabrication according to method 2600 in exemplary embodiments of the invention, and the steps of method 2600 will be described in reference to write head 3000. The steps of method 2600 may not be all-inclusive, and may include other steps not shown for the sake of brevity.

Figure 30:
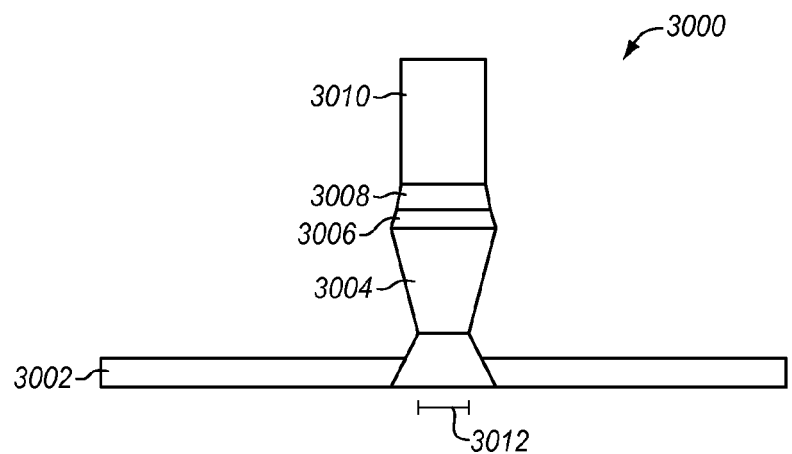
FIG. 30 illustrates an ABS view of a write head after completion of step 2606 of FIGS. 26-29 in an exemplary embodiment of the invention.

Step 2601 (see FIG. 26) comprises depositing insulation material 3002 (see FIG. 30). Insulation material may comprise alumina or a material having similar properties. Step 2602 (see FIG. 26) comprises depositing write pole material 3004 over insulation material 3002. Write pole material 3004 may comprise CoFe or a material having equivalent magnetic properties. Step 2603 (see FIG. 26) comprises depositing a first layer 3006 of etchable material. Etchable layer 3006 may be formed from anon-hydrogenated carbon such as physical vapor deposition (PVD) carbon, ion beam deposited (IBD) diamond like carbon, or cathodic arc carbon having a depth of 300 angstroms to 410 angstroms. Optional, a silicon adhesion can be deposited prior to deposition of the etchable layer 3006. Etchable layer 3006 serves as a CMP stop layer and also an ion mill hard mask. Step 2604 (see FIG. 26) comprises depositing a second layer 3008 of etchable material over etchable layer 3006. Etchable layer 3008 may comprise a layer of PVD sputtered carbon with a depth of 410 angstroms to 800 angstroms (e.g., approximately twice the depth of etchable layer 3006). Etchable layers 3006 and 3008 act as an ion mill hard mask to pattern the write pole material 3004, act as CMP stop layers for a subsequently performed CMP process, and control the separation distance between write pole material 3004 and subsequently formed shields of write head 3000.

Figure 31:
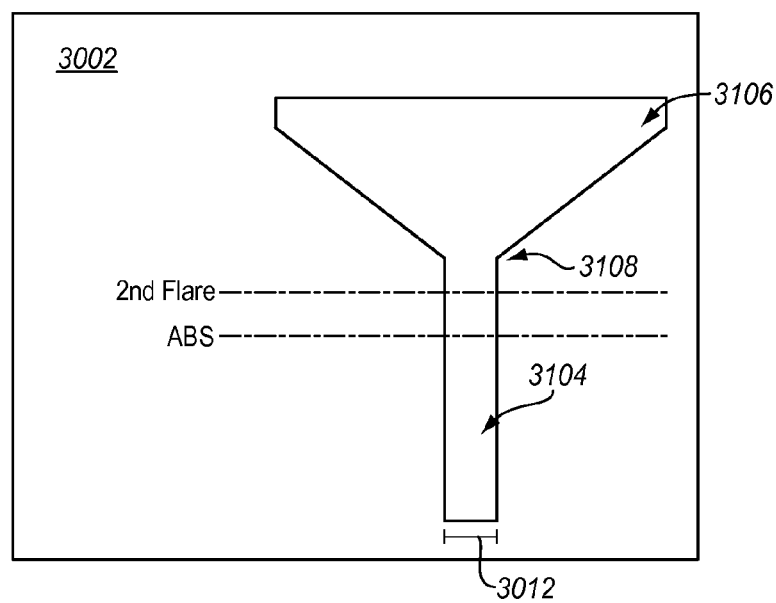
FIG. 31 illustrates a top view of a write pole of the write head of FIG. 30 after completion of step 2606 of FIGS. 26-29 in an exemplary embodiment of the invention.

Step 2605 (see FIG. 26) comprises depositing and defining a first mask layer 3010 over etchable layer 3008. Mask layer 3010 may comprise DURIMIDE® and silicon oxide and may be defined using a photolithographic process and subsequent image transfer by reactive ion etching steps. The definition process defines a first stencil from mask layer 3010, and the dimensions of the first stencil are used to form a track width of a write pole and a flared region (or yoke) of the write pole. Step 2606 comprises milling around the first stencil to define the write pole 3004 from write pole material 3004. Particularly, the milling process defines a track width 3012 (see FIG. 30) of a pole tip 3104 (see FIG. 31) and a flared region 3106 of write pole 3004. Pole tip 3104 and flared region 3106 are coupled at a first flare point 3108. FIG. 30 illustrates an ABS view of write head 3000 after completion of step 2606 in an exemplary embodiment of the invention. FIG. 31 illustrates a top view of a write pole 3004 of write head 3000 after completion of step 2606 (see FIG. 26) in an exemplary embodiment of the invention. Those of ordinary skill in the art will appreciate that other layers may be present above write pole 3004 in FIG. 31 after completion of step 2606, but are not illustrated in FIG. 31 so as to not obscure the top view of write pole 3004.

Figure 32:
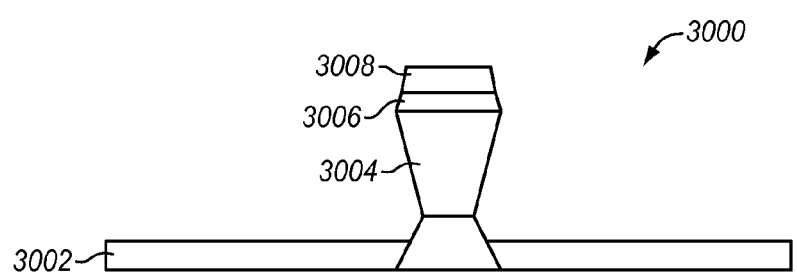
FIG. 32 illustrates an ABS view of a write head after completion of step 2607 of FIGS. 26-29 in an exemplary embodiment of the invention.

Step 2607 (see FIG. 26) comprises removing the first stencil. The first stencil may be removed using a tetramethyl ammonium hydroxide (TMAH) etching process and an N-methylpyrrolidone (NMP) stripping process. FIG. 32 illustrates an ABS view of write head 3000 after completion of step 2607 in an exemplary embodiment of the invention.

Figure 33:
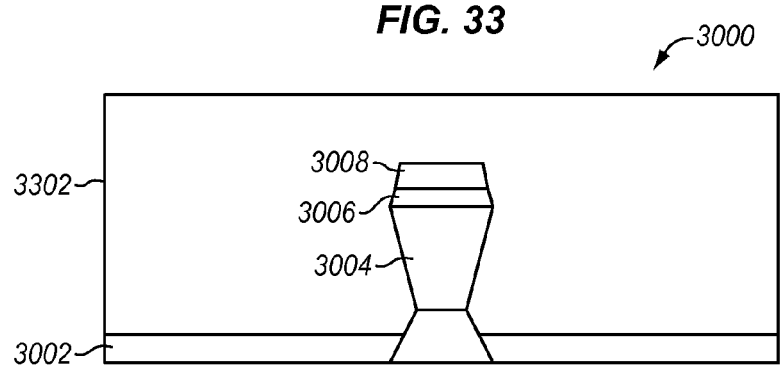
FIG. 33 illustrates an ABS view of a write head after completion of step 2608 of FIGS. 26-29 in an exemplary embodiment of the invention.
Figure 34:
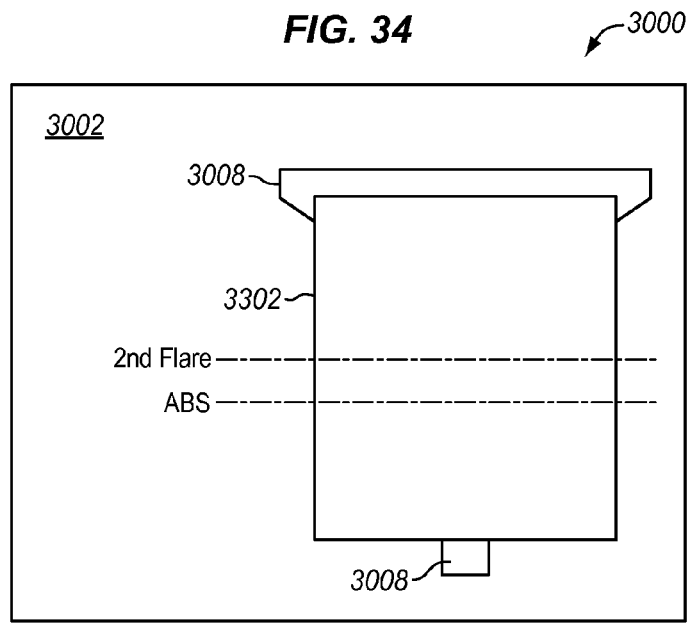
FIG. 34 illustrates a top view of a write head after completion of step 2608 of FIGS. 26-29 in an exemplary embodiment of the invention.

Step 2608 (see FIG. 2) comprises depositing a second mask layer 3302 (see FIG. 33) and performing a photolithographic process to remove portions of mask layer 3302, exposing portions of etchable layer 3008. The exposed portions of etchable layer 3008 define where leads will be subsequently fabricated on write head 3000. FIG. 33 illustrates an ABS view of write head 3000 after completion of step 2608 in an exemplary embodiment of the invention. FIG. 34 illustrates a top view of write head 3000 after completion of step 2608 in an exemplary embodiment of the invention.

Figure 35:
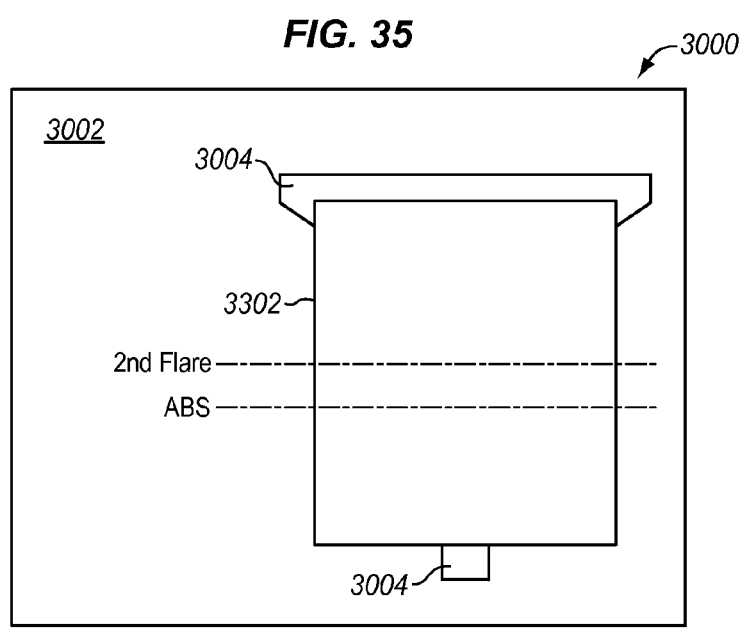
FIG. 35 illustrates a top view of a write head after completion of step 2609 of FIGS. 26-29 in an exemplary embodiment of the invention.

Step 2609 (see FIG. 26) comprises etching regions of etchable layer 3008 and etchable layer 3006 exposed by mask layer 3302. The etching process may comprise a RIE process using either $CO_2$ or $O_2$ chemistry, and exposes portions of flared region 3106 and a pole tip 3104 (see FIG. 35). Optional, if a silicon adhesion layer is used, an etching process may comprise a RIE process using $CF4$ chemistry. FIG. 35 illustrates a top view of write head 3000 after completion of step 2609 in an exemplary embodiment of the invention.

Figure 36:
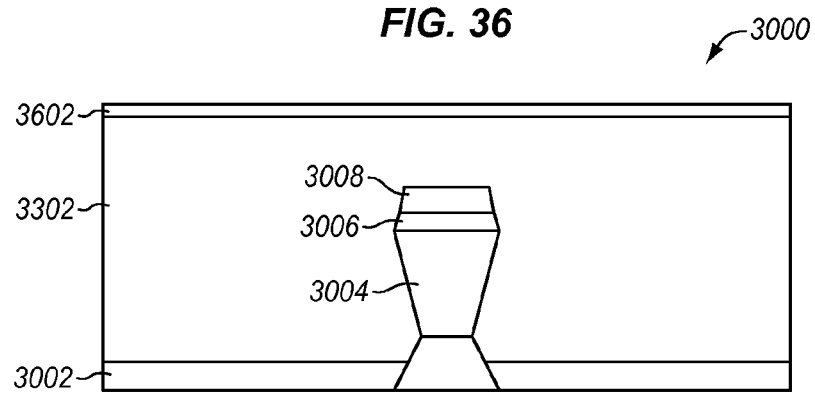
FIG. 36 illustrates an ABS view of a write head after completion of step 2610 of FIGS. 26-29 in an exemplary embodiment of the invention.
Figure 37:
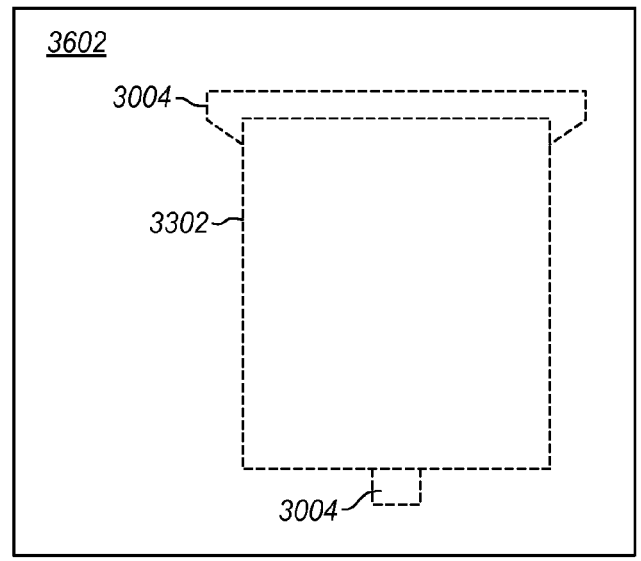
FIG. 37 illustrates a top view of a write head after completion of step 2610 of FIGS. 26-29 in an exemplary embodiment of the invention.

Step 2610 (see FIG. 27) comprises depositing a seed layer 3602 (see FIG. 36). Seed layer 3602 is deposited over the exposed portions of pole tip 3104 and flared region 3106. Seed layer 3602 may comprise a Ta adhesion layer and an Rh seed layer with CoFe, NiFe, or alloys thereof as a thin cap. Other materials may be utilized in seed layer 3602, including Cr or Si as adhesion layer materials, and/or Pd, Au, Ag, Ir, or Ru as seed layer materials. FIG. 36 illustrates an ABS view of write head 3000 after completion of step 2610 in an exemplary embodiment of the invention. FIG. 37 illustrates a top view of write head 3000 after completion of step 2610 in an exemplary embodiment of the invention. The dotted lines illustrate the layers that are covered by seed layer 3602.

Figure 38:
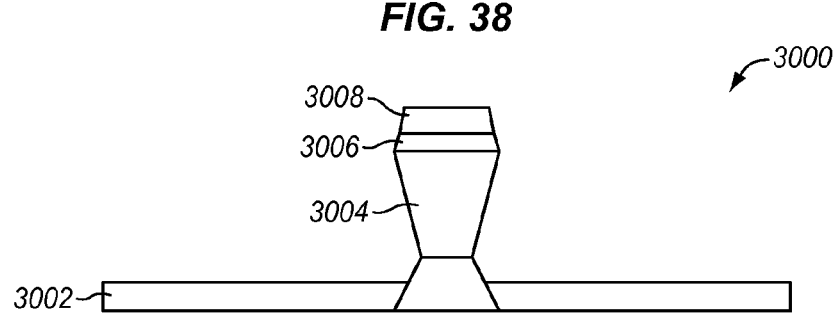
FIG. 38 illustrates an ABS view of a write head after completion of step 2611 of FIGS. 26-29 in an exemplary embodiment of the invention.
Figure 39:
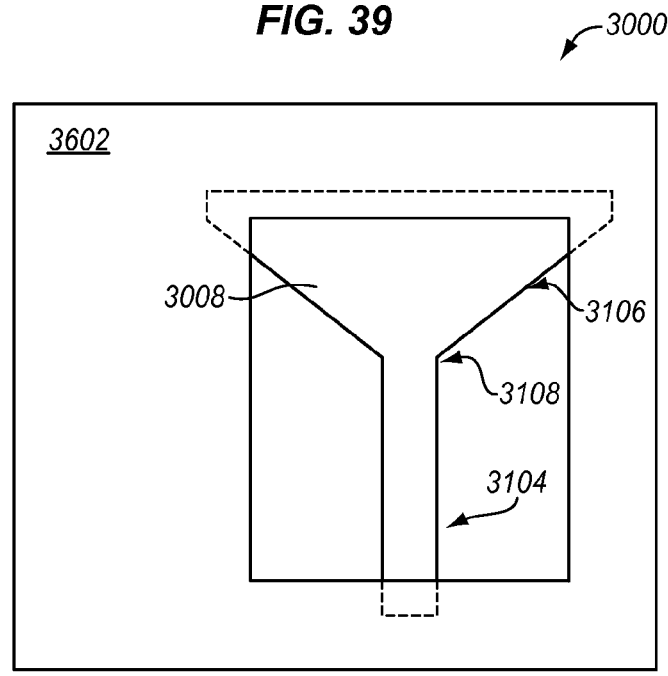
FIG. 39 illustrates a top view of a write head after completion of step 2611 of FIGS. 26-29 in an exemplary embodiment of the invention.

Step 2611 (See FIG. 27) comprises removing second mask layer 3302. Second mask layer 3302 may be removed using a standard liftoff process. The removal process exposes portions of etchable layer 3008. FIG. 38 illustrates an ABS view of write head 3000 after completion of step 2611 in an exemplary embodiment of the invention. FIG. 39 illustrates a top view of write head 3000 after completion of step 2611 in an exemplary embodiment of the invention.

After completion of step 2611, a portion of flared region 3106 is covered by seed layer 3602, and a portion of pole tip 3104 is also covered by seed layer 3602. The portions of flared region 3106 covered by seed layer 3602 is utilized to connect leads to write head 3000. The remaining portions of write pole 3004 are covered with etchable layer 3006 (not visible in FIG. 39) and etchable layer 3008.

Figure 40:
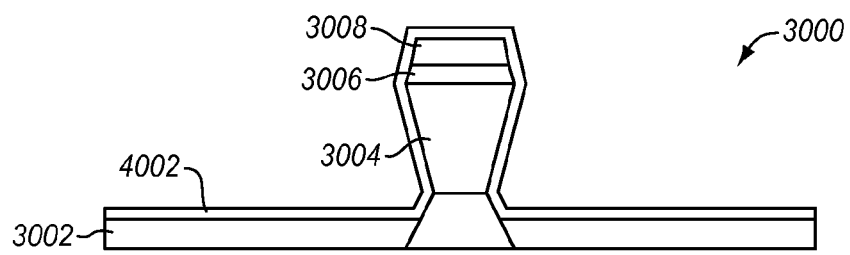
FIG. 40 illustrates an ABS view of a write head after completion of step 2612 of FIGS. 26-29 in an exemplary embodiment of the invention.

Step 2612 (see FIG. 27) comprises depositing an optional BARC layer 4002 (see FIG. 40) to prevent reflective notching of subsequently deposited layers. BARC layer 4002 may comprise $SiO_xN_y$, $Si_3N_4$, or any etchable material having similar properties as an anti-reflective layer. FIG. 40 illustrates an ABS view of write head 3000 after completion of step 2612 in an exemplary embodiment of the invention.

Step 2613 (see FIG. 27) comprises depositing a third mask layer 4100 (see FIG. 41), and performing a photolithographic process to define a second stencil having an opening 4200 (see FIG. 42) exposing a portion of BARC layer 4002. A second flare point 4204 of write pole 3004 is defined by an edge 4206 of opening 4200 closest to an air bearing surface of pole tip 3104 (not visible in FIG. 42).

The photolithographic process may optionally comprise removing additional portions of third mask layer 4100 to form openings 4208 for fabricating electronic lapping guides (ELGS), which may be aligned with edge 4206, and thus, the second flare point 4204 of write pole 3004. ELG openings 4208 may then be utilized to plate material and form ELGs for write head 300. Although not shown in these FIGS, the active element of recording head 3000 may be covered with a resist while the ELG(s) is exposed. An ion milling process may then be formed to transfer the pattern into seed layer 3602 and form the ELG. Plated materials are removed by wet-etched and the seed-layer materials serve as the ELG.

Figure 41:
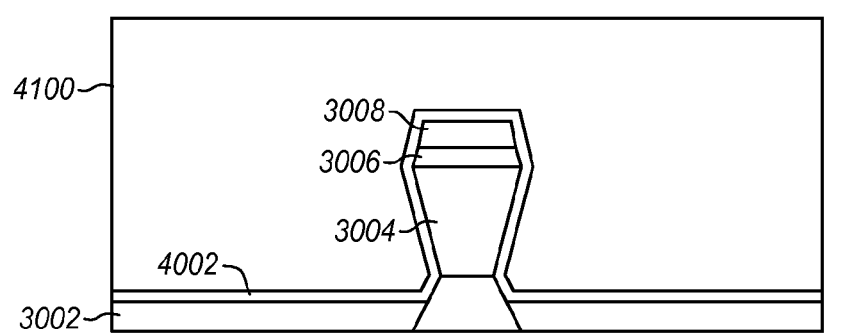
FIG. 41 illustrates a top view of a write head after completion of step 2613 of FIGS. 26-29 in an exemplary embodiment of the invention.
Figure 42:
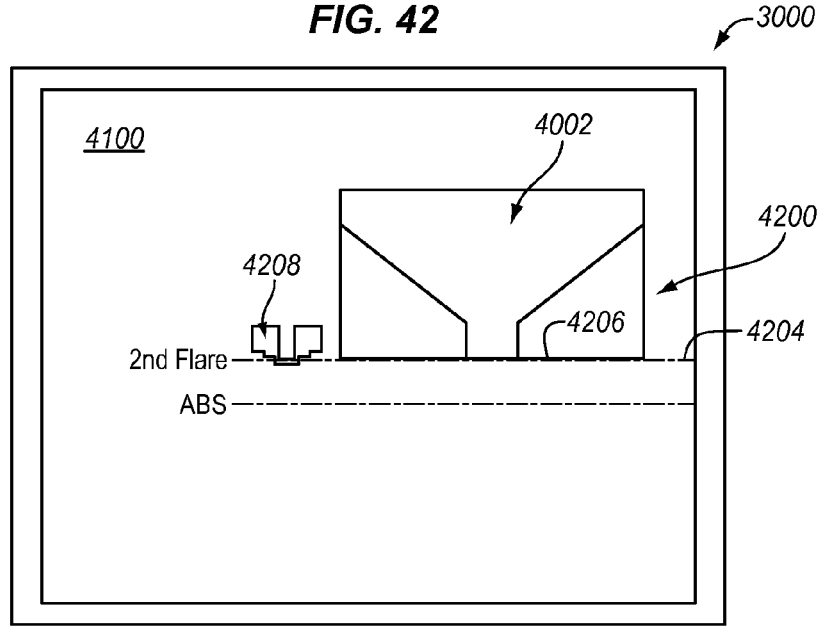
FIG. 42 illustrates a view of a write head from the perspective of a second flare point after completion of step 2613 of FIGS. 26-29 in an exemplary embodiment of the invention.
Figure 43:
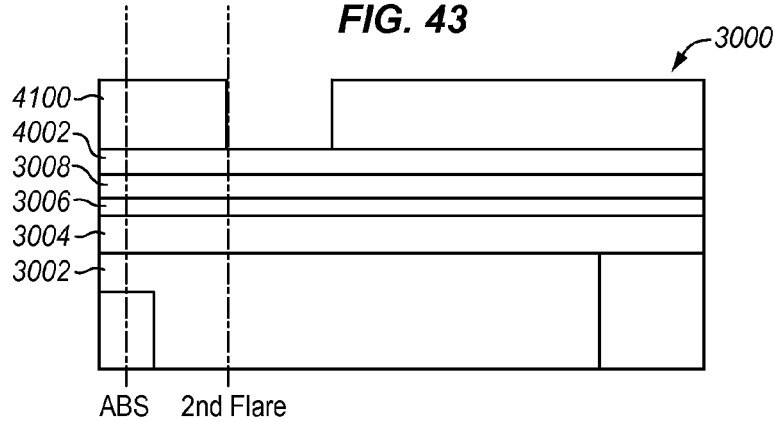
FIG. 43 illustrates a cross sectional view of a write head after completion of step 2613 of FIGS. 26-29 in an exemplary embodiment of the invention.

FIG. 41 illustrates an ABS view of write head 3000 after completion of step 2613 in an exemplary embodiment of the invention. FIG. 42 illustrates a top view of write head 3000 from the perspective of second flare point 4204 (i.e., edge 4206) after completion of step 2613 in an exemplary embodiment of the invention. Thus, BARC layer 4002 is exposed by the second stencil in FIG. 42. FIG. 43 illustrates a cross sectional view of write head 3000 after completion of step 2613 in an exemplary embodiment of the invention.

Figure 44:
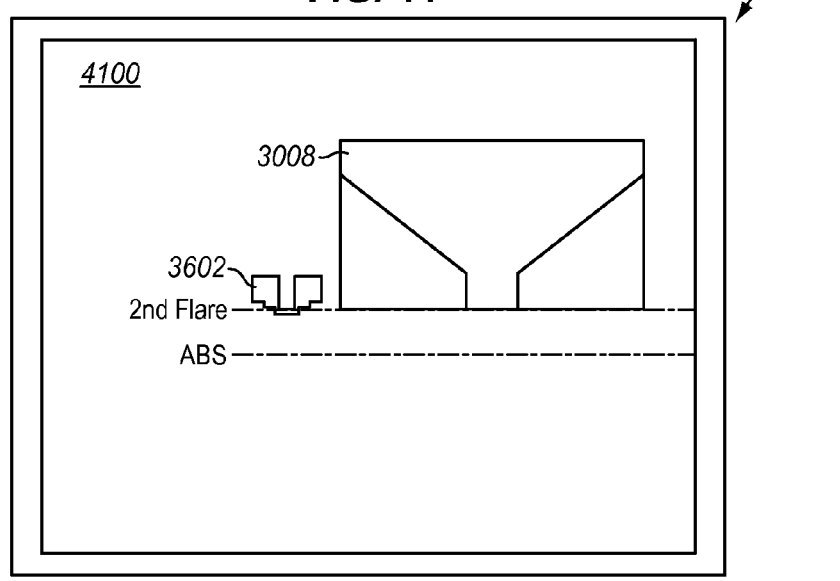
FIG. 44 illustrates a top view of a write head after completion of step 2614 of FIGS. 26-29 in an exemplary embodiment of the invention.
Figure 45:
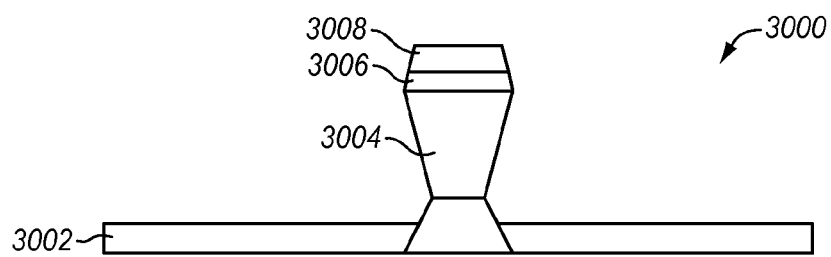
FIG. 45 illustrates a view of a write head from the perspective of a second flare point after completion of step 2614 of FIGS. 26-29 in an exemplary embodiment of the invention.
Figure 46:
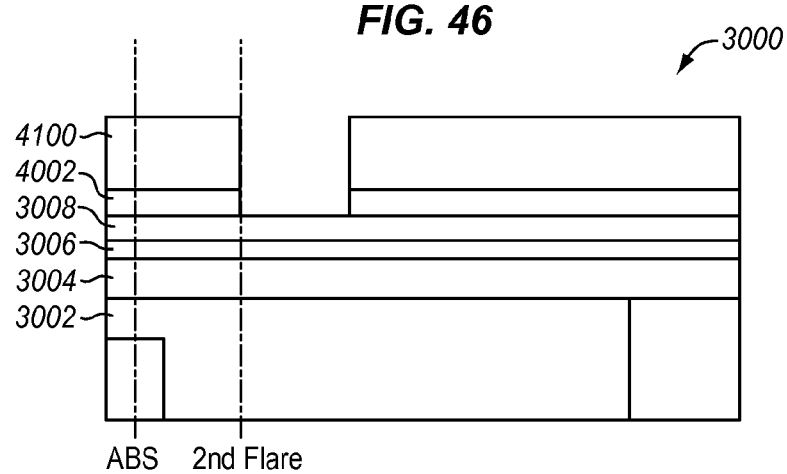
FIG. 46 illustrates a cross sectional view of a write head after completion of step 2614 of FIGS. 26-29 in an exemplary embodiment of the invention.

Step 2614 (see FIG. 27) comprises performing an etching process to remove portions of BARC layer 4002 exposed by opening 4200, thus, exposing etchable layer 3008. The etching process may comprise a RIE process performed on the $SiO_xN_y$ material comprising BARC layer 4002 using $CF_4$ chemistry. BARC layer 4002 will remain in areas covered by the second stencil. FIG. 44 illustrates a top view of write head 3000 after completion of step 2614 in an exemplary embodiment of the invention. The etching process exposes seed layer 3602 under ELGs 4208 as illustrated in FIG. 44. FIG. 45 illustrates an ABS view of write head 3000 from the perspective of the second flare point 4204 after completion of step 2614 in an exemplary embodiment of the invention. FIG. 46 illustrates a cross sectional view of write head 3000 after completion of step 2614 in an exemplary embodiment of the invention.

Step 2616 (see FIG. 27) comprises removing portions of etchable material 3006 and etchable material 3008 exposed by the second stencil. The removal of a portion of etchable layer 3006 and etchable layer 3008 exposes a portion of pole tip 3104 and flared region 3106 (see FIG. 47). Optional, if a silicon adhesion layer is used, an etching process may comprise a RIE process using CF4 chemistry.

Figure 47:
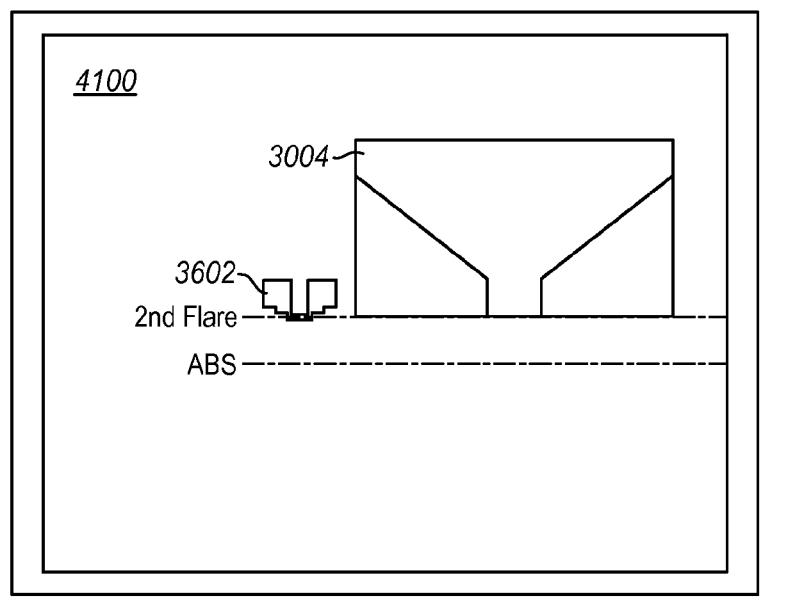
FIG. 47 illustrates a top view of a write head after completion of step 2616 of FIGS. 26-29 in an exemplary embodiment of the invention.
Figure 48:
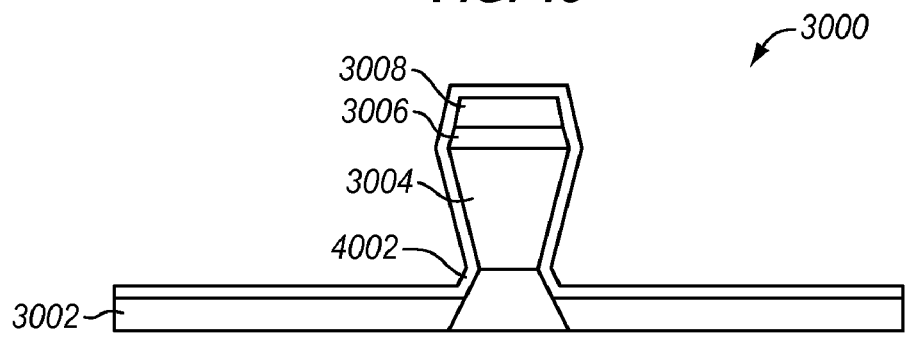
FIG. 48 illustrates an ABS view of a write head after completion of step 2616 of FIGS. 26-29 in an exemplary embodiment of the invention.
Figure 49:
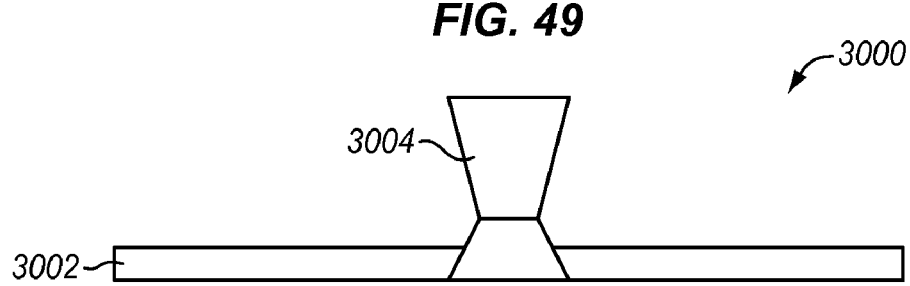
FIG. 49 illustrates a view of a write head from the perspective of a second flare point of a write head after completion of step 2616 of FIGS. 26-29 in an exemplary embodiment of the invention.
Figure 50:
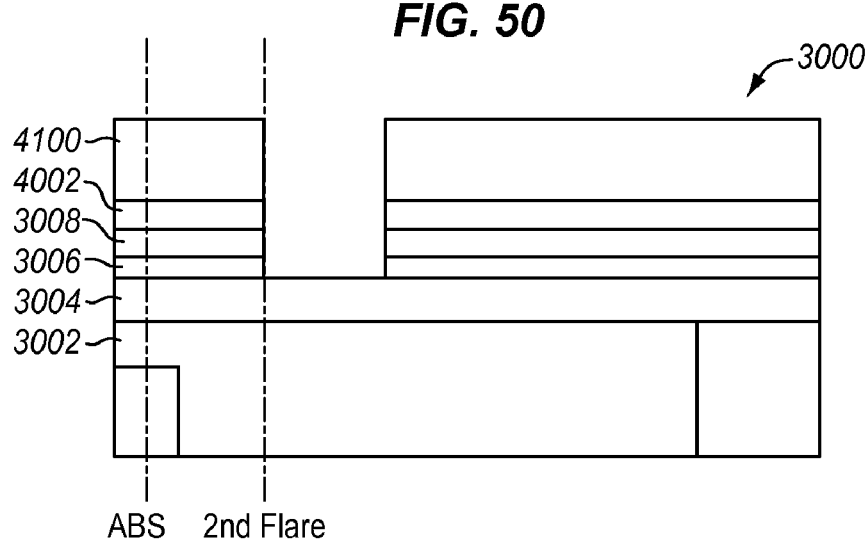
FIG. 50 illustrates a cross sectional view of a write head after completion of step 2616 of FIGS. 26-29 in an exemplary embodiment of the invention.

FIG. 47 illustrates a top view of write head 3000 after completion of step 2616 in an exemplary embodiment of the invention. FIG. 48 illustrates an ABS view of write head 3000 after completion of step 2616 in an exemplary embodiment of the invention. In the ABS view of FIG. 48, write pole 3004 remains covered by etchable material 3006, etchable material 3008, and BARC layer 4002. FIG. 49 illustrates a view of write head 3000 from the perspective of second flare point 4204 of write head 3000 after completion of step 2616 in an exemplary embodiment of the invention. FIG. 50 illustrates a cross sectional view of write head 3000 after completion of step 2616 in an exemplary embodiment of the invention. As illustrated in FIG. 50, after step 2616, write pole 3004 becomes exposed within opening 4200 (see FIG. 40) in mask layer 4100.

Figure 51:
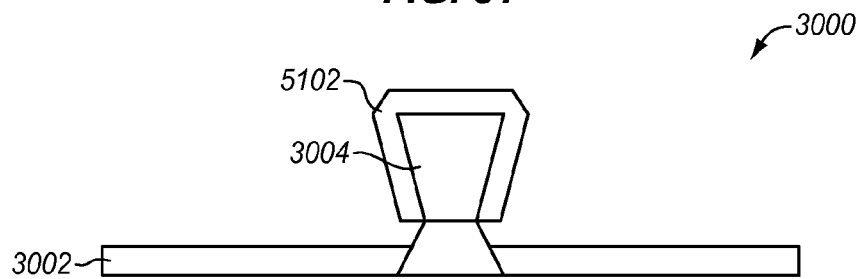
FIG. 51 illustrates a view of a write head from the perspective of a second flare point of a write head after completion of step 2617 of FIGS. 26-29 in an exemplary embodiment of the invention.
Figure 52:
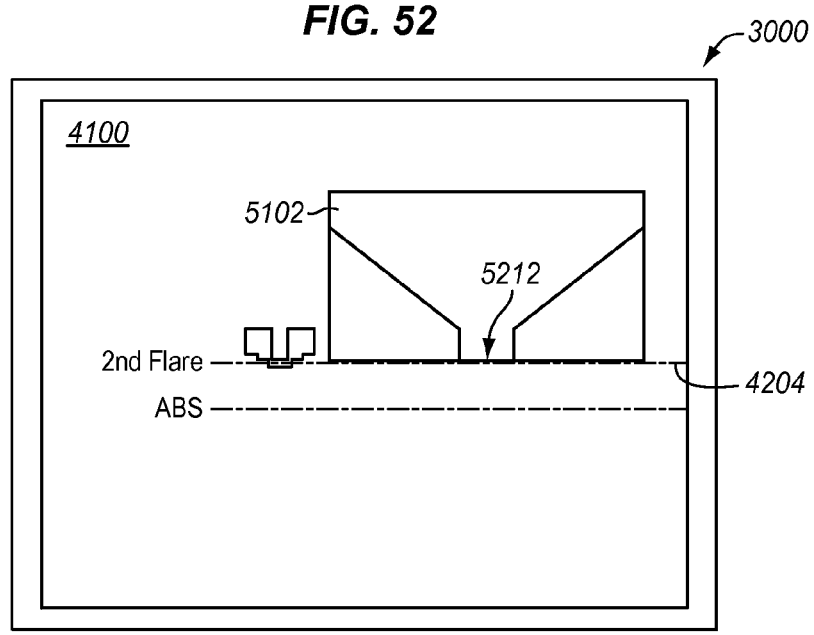
FIG. 52 illustrates a top view of a write head after completion of step 2617 in an exemplary embodiment of the invention.
Figure 53:
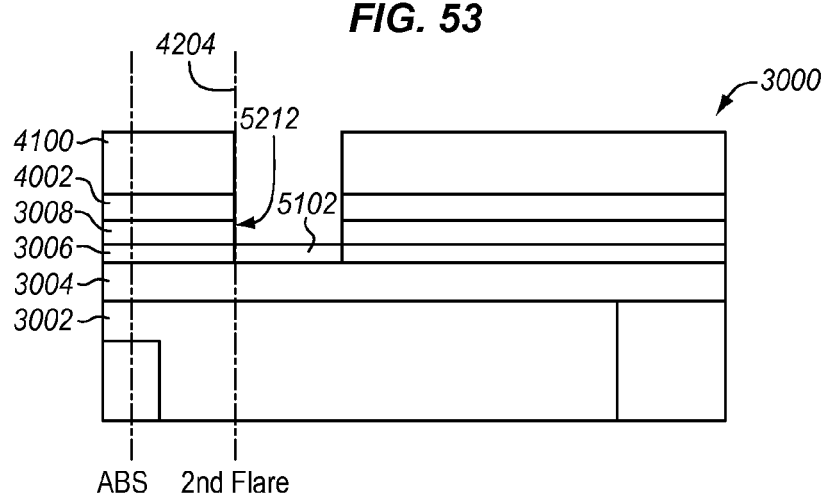
FIG. 53 illustrates a cross sectional view of a write head after completion of step 2617 of FIGS. 26-29 in an exemplary embodiment of the invention.

Step 2617 (see FIG. 27) comprises plating exposed portions of write pole 3004 with a magnetic material 5102 (see FIG. 51). More particularly, magnetic material 5102 is plated on a portion of flared region 3106 and a portion of pole tip 3104 closest to first flare point 3108. The plating process may optionally plate ELGs 4108 if desired. Magnetic material 5102 may comprise CoFe or a material having similar magnetic properties. The plating process thus increases the depth of portions of write pole 3004 exposed by the second stencil. FIG. 51 illustrates a view of write head 3000 from the perspective of second flare point 4204 of write head 3000 after completion of step 2617 in an exemplary embodiment of the invention. FIG. 52 illustrates a top view of write head 3000 after completion of step 2617 in an exemplary embodiment of the invention. FIG. 53 illustrates a cross sectional view of write head 3000 after completion of step 2617 in an exemplary embodiment of the invention. As illustrated in FIG. 52, an edge 5212 of magnetic material 5102 forms second flare point 4204 (see FIG. 42) of write head 3000.

Figure 54:
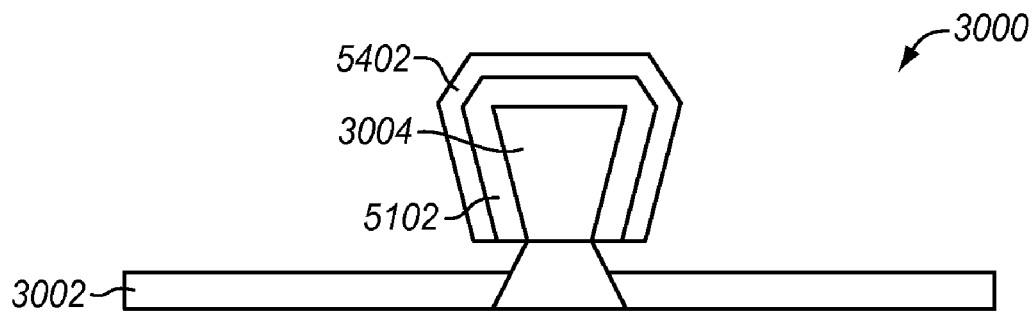
FIG. 54 illustrates a view of a write head from the perspective of a second flare point of a write head after completion of step 2618 of FIGS. 26-29 in an exemplary embodiment of the invention.
Figure 55:
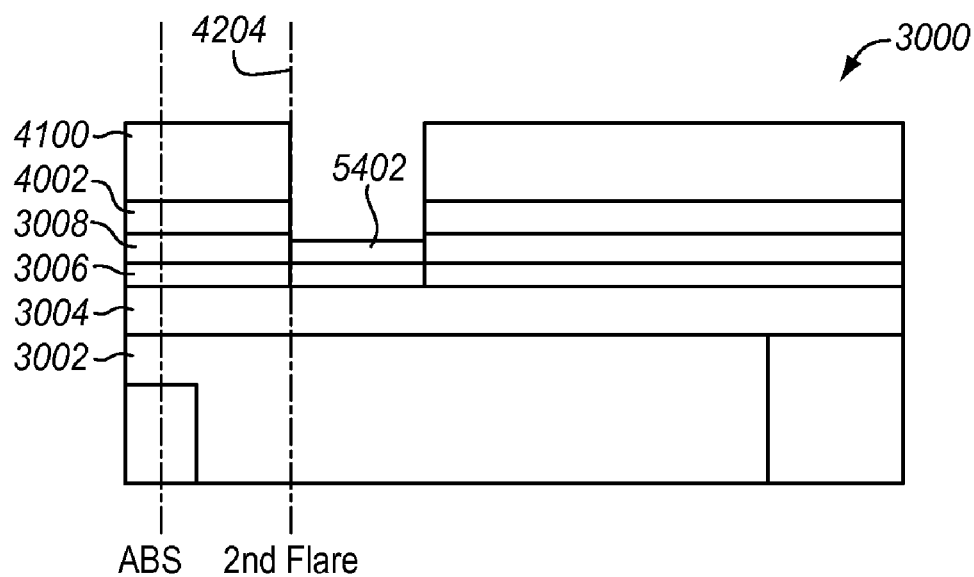
FIG. 55 illustrates a cross sectional view of a write head after completion of step 2618 of FIGS. 26-29 in an exemplary embodiment of the invention
Figure 56:
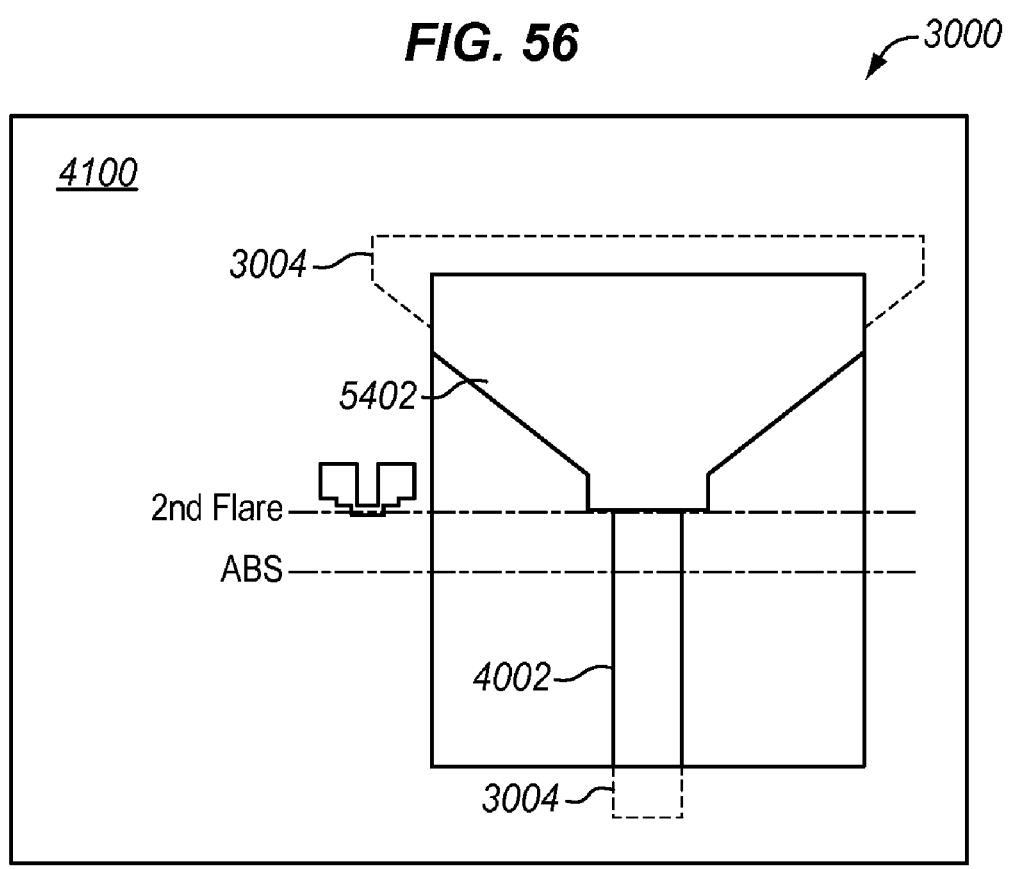
FIG. 56 illustrates a top view of a write head after completion of step 2619 of FIGS. 26-29 in an exemplary embodiment of the invention.

Step 2618 (see FIG. 28) comprises plating non-magnetic material 5402 (see FIG. 54) over magnetic material 5102. The plating process is similar to step 114 of FIG. 1. Non-magnetic material 5402 forms a controlled spacing between write pole 3004 and a subsequently formed shield of write head 300. FIG. 54 illustrates a view of write head 3000 from the perspective of second flare point 4204 (see FIG. 42) of write head 3000 after completion of step 2618 in an exemplary embodiment of the invention. FIG. 55 illustrates a cross sectional view of write head 3000 after completion of step 2618 in an exemplary embodiment of the invention. Method 2600 may include the optional step of removing the BARC layer 4002 (see FIGS. 28 and 40), which will not be illustrated herein. FIG. 56 illustrates a top view of write head 3000 after completion of step 2618 in an exemplary embodiment of the invention.

Step 2620 (see FIG. 28) comprises depositing non-magnetic material 5702 (see FIG. 57) to form a side gap of write head 3000. Optionally, the BARC can be removed by RIE using $CF_4$ prior to forming side gap. Non-magnetic material 5702 may comprise alumina deposited in an atomic layer deposition (ALD) process. FIG. 57 illustrates an ABS view of write head 3000 after completion of step 2620 in an exemplary embodiment of the invention. Step 2621 (see FIG. 28) comprises milling non-magnetic material 5702 to define the size of the side gap of write head 3000, and to recess the floor of non-magnetic material 5702. FIG. 58 illustrates a view of write head 3000 from the perspective of second flare point 4204 of write head 3000 after completion of step 2621 in an exemplary embodiment of the invention.

Step 2622 (see FIG. 28) comprises depositing a sacrificial material (SM) layer 5902 (see FIG. 59). SM layer 5902 may comprise $SiO_2$ deposited in an IBD deposition or PECVD process, and may be similar to BARC layer 4002 described in step 2611. FIG. 59 a view of write head 3000 from the perspective of second flare point 4204 of write head 3000 after completion of step 2622 in an exemplary embodiment of the invention.

Figure 60:
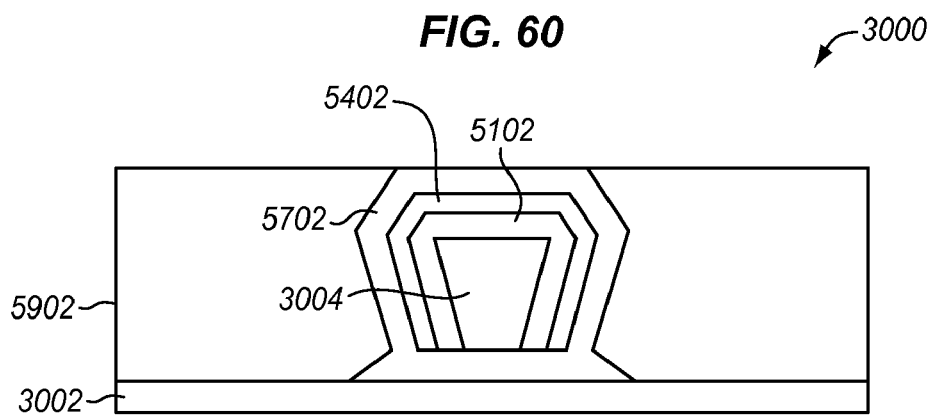
FIG. 60 illustrates a view of a write head from the perspective of the second flare point after completion of step 2623 of FIGS. 26-29 in an exemplary embodiment of the invention.
Figure 61:
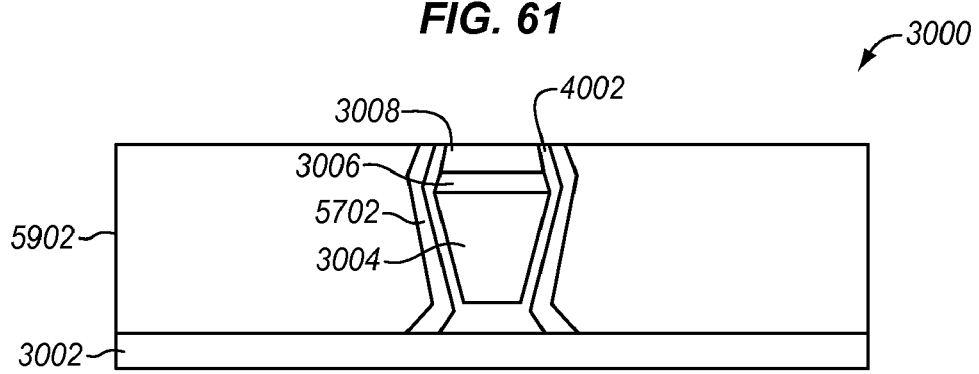
FIG. 61 illustrates an ABS view of a write head after completion of step 2623 of FIGS. 26-29 in an exemplary embodiment of the invention.
Figure 62:
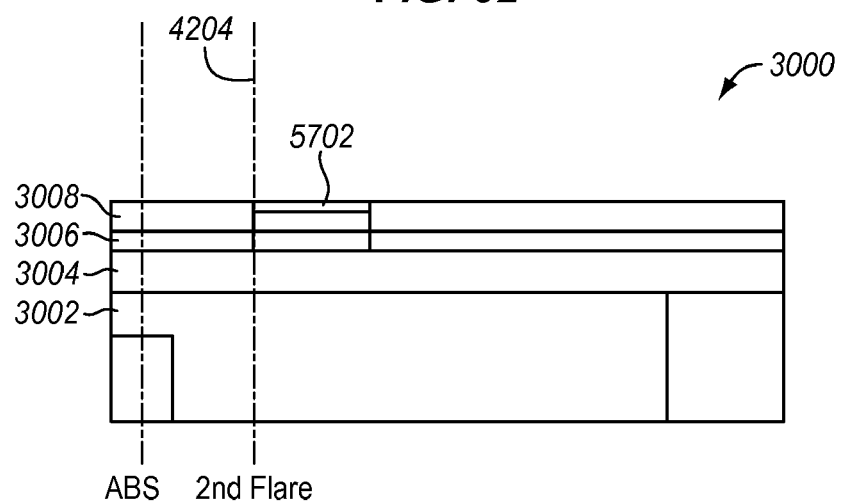
FIG. 62 illustrates a cross sectional view of a write head after completion of step 2623 of FIGS. 26-29 in an exemplary embodiment of the invention.
Figure 63:
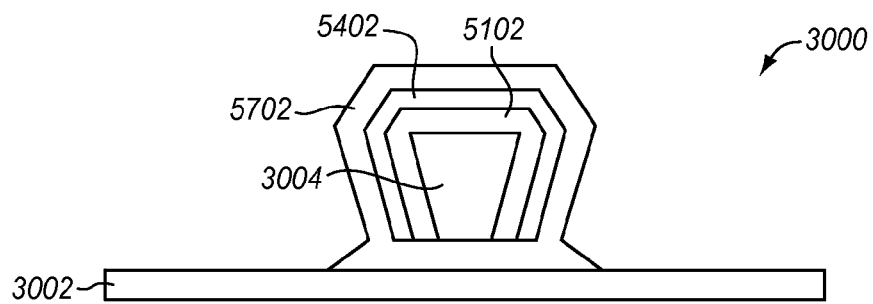
FIG. 63 illustrates a view of a write head from the perspective of a second flare point after completion of step 2625 of FIGS. 26-29 in an exemplary embodiment of the invention.

Step 2623 (see FIG. 28) comprises performing a CMP process down to etchable layer 3008. The CMP process removes portions of BARC layer 5902 and non-magnetic material 5702 on the top surface of write head 3000. FIG. 60 illustrates a view of write head 3000 from the perspective of second flare point 4204 after completion of step 2623 in an exemplary embodiment of the invention. FIG. 61 illustrates an ABS view of write head 3000 after completion of step 2623 in an exemplary embodiment of the invention. FIG. 62 illustrates a cross sectional view of write head 3000 after completion of step 2623 in an exemplary embodiment of the invention. As illustrated in FIGS. 61-63, portions of non-magnetic material 5702 are removed above non-magnetic material 5402.

Step 2624 (see FIG. 29) comprises removing BARC layer 5902. BARC layer 5902 may be removed using a RIE process performed on the $SiO_2$ material using $CF_4$ chemistry. Step 2625 (see FIG. 29) comprises removing etchable layer 3006 and etchable layer 3008. Etchable layer 3006 and etchable layer 3008 may be removed using an $O_2$ or $CO_2$ RIE process. The etching process exposes portions of write pole 3004. The removal process also exposes non-magnetic material 5702 forming the side gap of write head 3000.

Figure 64:
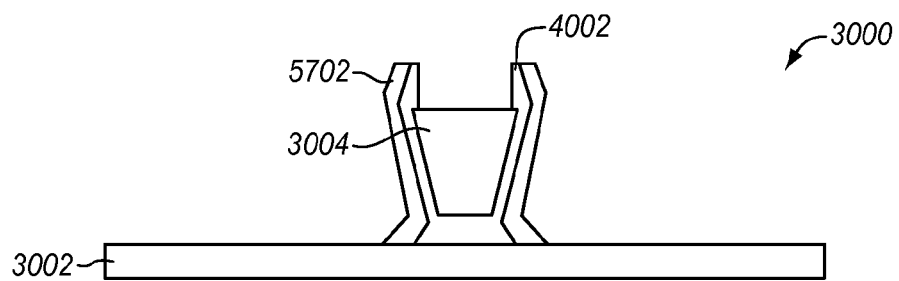
FIG. 64 illustrates an ABS view of a write head after completion of step 2625 of FIGS. 26-29 in an exemplary embodiment of the invention.
Figure 65:
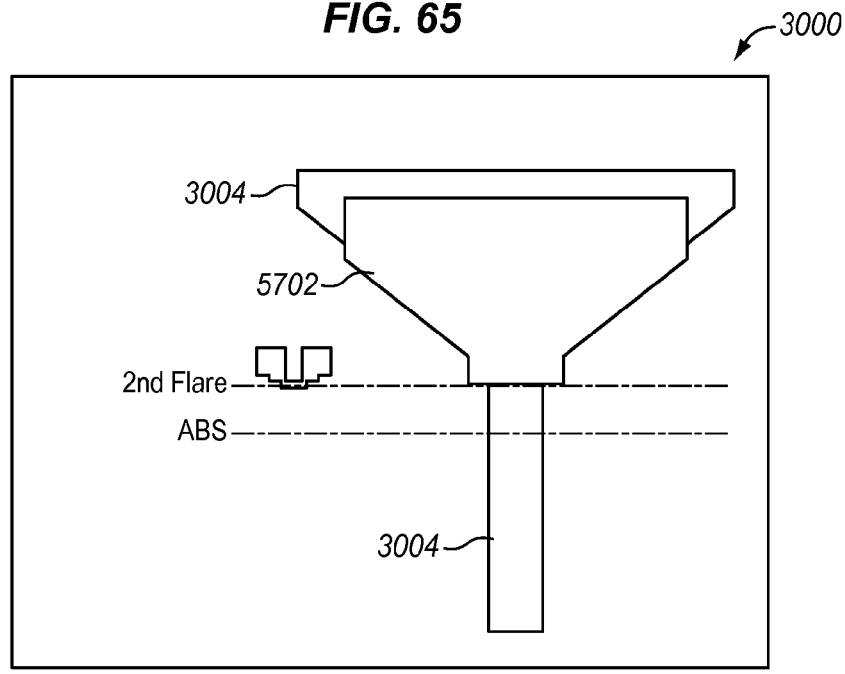
FIG. 65 illustrates a top view of a write head after completion of step 2625 of FIGS. 26-29 in an exemplary embodiment of the invention.
Figure 66:
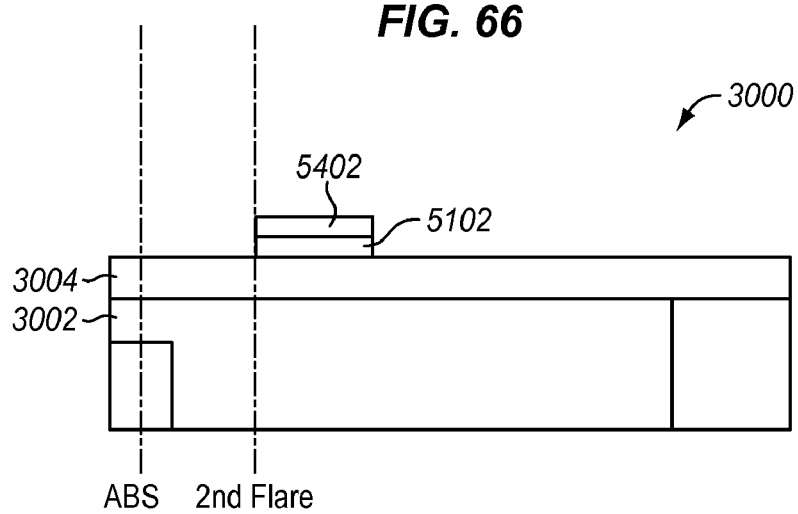
FIG. 66 illustrates a cross sectional view of a write head after completion of step 2625 of FIGS. 26-29 in an exemplary embodiment of the invention.

FIG. 63 illustrates a view of write head 3000 from the perspective of the second flare point 4204 (see FIG. 42) after completion of step 2625 in an exemplary embodiment of the invention. FIG. 64 illustrates an ABS view of write head 3000 after completion of step 2625 in an exemplary embodiment of the invention. FIG. 65 illustrates a top view of write head 3000 after completion of step 2625 in an exemplary embodiment of the invention. FIG. 66 illustrates a cross sectional view of write head 3000 after completion of step 2625 in an exemplary embodiment of the invention. As illustrated in FIGS. 63-64, a top surface of write pole 3004 is exposed between an ABS and second flare point 4204 of write head 3000. Referring to FIG. 66, a portion of magnetic material 5102 and non-magnetic material 5402 (i.e., a bump region) remain above a top surface of write pole 3004 and flared region 3106. As described above, magnetic material 5102 forms a portion of write pole 3004, and non-magnetic material 5402 forms a separation distance between write pole 3004 and a subsequently formed shield of write head 3000.

Figure 67:
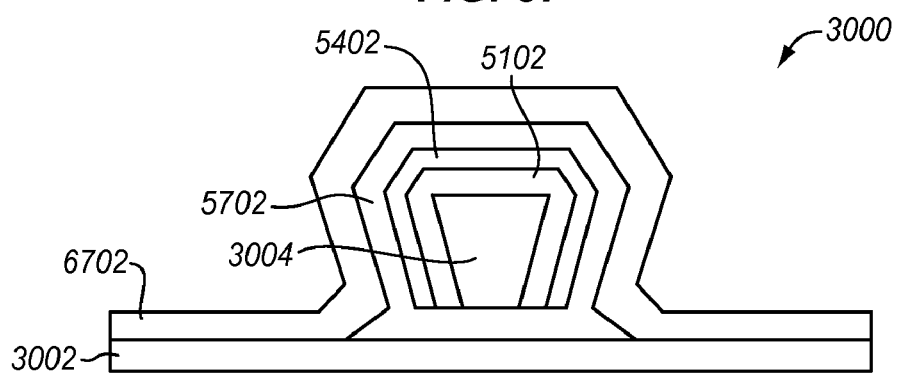
FIG. 67 illustrates a view of a write head from the perspective of a second flare point after completion of step 2626 of FIGS. 26-29 in an exemplary embodiment of the invention.
Figure 68:
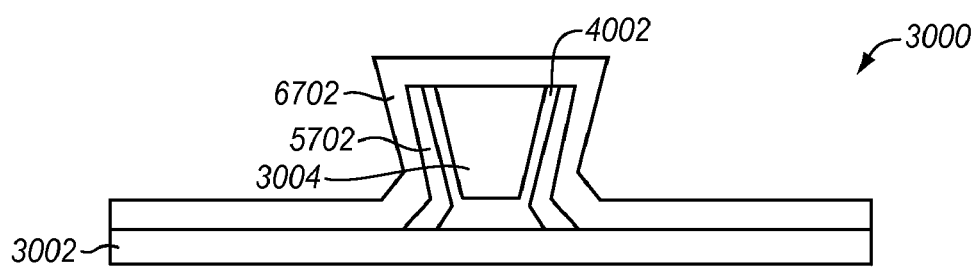
FIG. 68 illustrates an ABS view of a write head after completion of step 2626 of FIGS. 26-29 in an exemplary embodiment of the invention.

Step 2626 (see FIG. 29) comprises depositing a layer of non-magnetic material 6702 (see FIG. 67) to form a wrap around shield gap. Non-magnetic material 6702 may comprise a metallic material so that a subsequently formed wrap around shield may be plated over non-magnetic material 6702. FIG. 67 illustrates a view of write head 3000 from the perspective of second flare point 4204 (see FIG. 42) after completion of step 2626 in an exemplary embodiment of the invention. FIG. 68 illustrates an ABS view of write head 3000 after completion of step 2626 in an exemplary embodiment of the invention. FIG. 69 illustrates a cross sectional view of write head 3000 after completion of step 2626 in an exemplary embodiment of the invention.

Step 2627 (see FIG. 29) comprises depositing a fourth mask layer 7002 (see FIG. 70) and performing a photolithographic process on mask layer 7002 to expose portions of non-magnetic material 6702. The exposed portions of non-magnetic material 6702 define where a subsequently formed wrap around shield will be fabricated on write head 3000. FIG. 70 illustrates a cross sectional view of write head 3000 after completion of step 2627 in an exemplary embodiment of the invention. FIG. 71 illustrates a top view of write head 3000 after completion of step 2627 in an exemplary embodiment of the invention.

Figure 72:
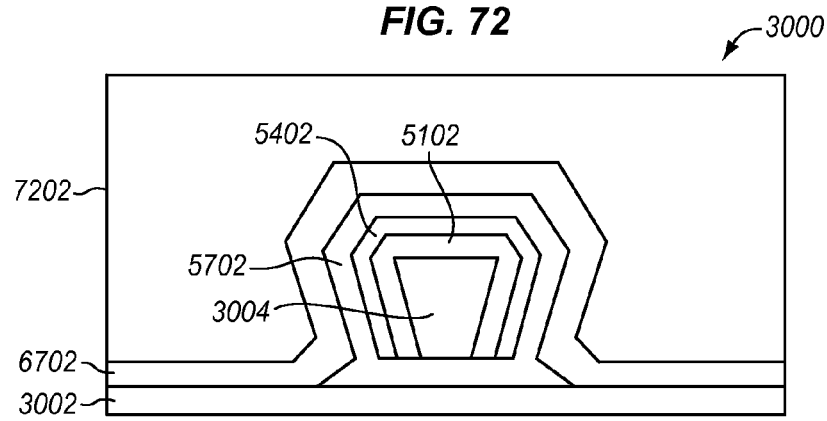
FIG. 72 illustrates a view of a write head from the perspective of a second flare point after completion of step 2628 of FIGS. 26-29 in an exemplary embodiment of the invention.
Figure 73:
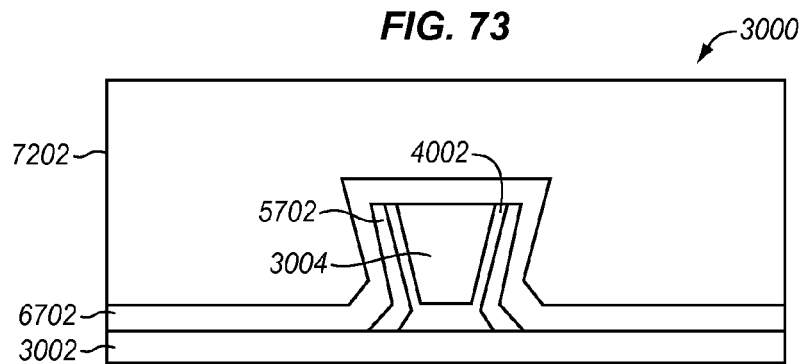
FIG. 73 illustrates an ABS view of a write head after completion of step 2628 of FIGS. 26-29 in an exemplary embodiment of the invention.
Figure 74:
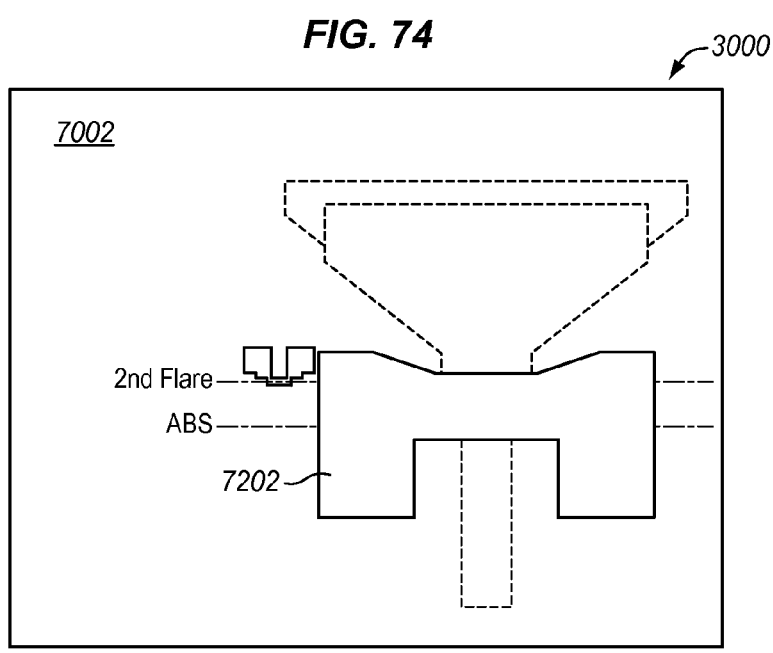
FIG. 74 illustrates a top view of a write head after completion of step 2628 of FIGS. 26-29 in an exemplary embodiment of the invention.
Figure 75:
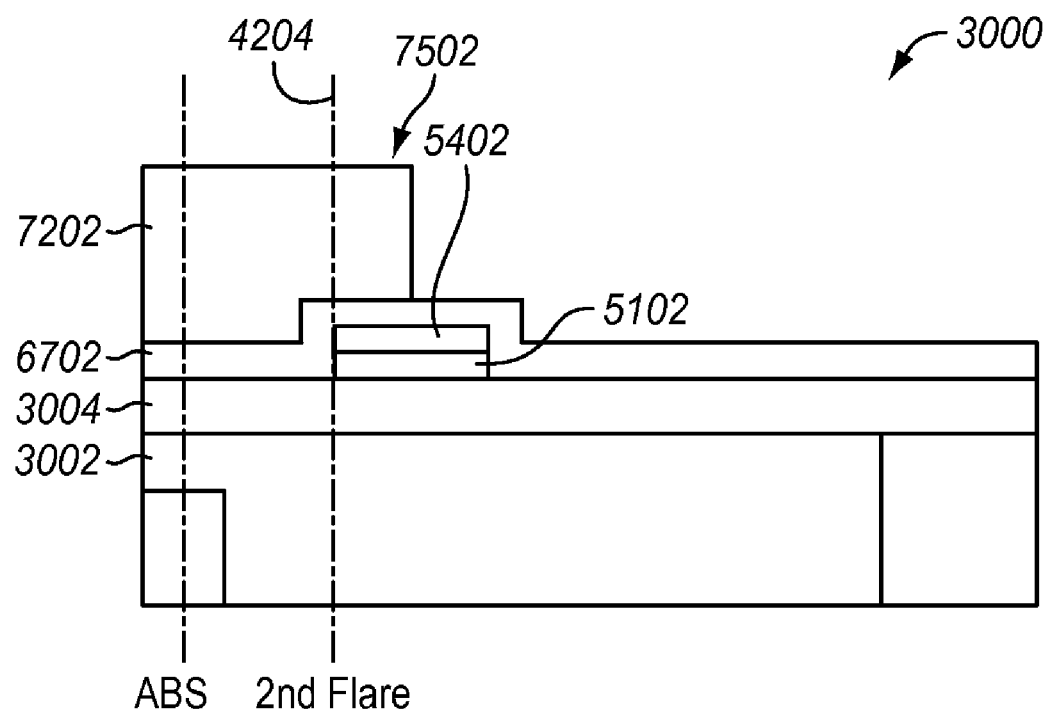
FIG. 75 illustrates a cross sectional view of a write head after completion of step 2628 of FIGS. 26-29 in an exemplary embodiment of the invention.

Step 2628 (see FIG. 29) comprises plating exposed portions of non-magnetic material 6702 to form a wrap around shield 7202 (see FIG. 72). Wrap around shield 7202 may comprise a magnetic material such as CoFe, NiFe, or alloys thereof. Mask layer 7002 may then be removed, and subsequent processes may be performed to complete the fabrication process. Optional, if ELG is not fabricated at the secondary flare, it can be made with the wrap-around shield as shown in FIG. 72. FIG. 72 illustrates a view of write head 3000 from the perspective of second flare point 4204 after completion of step 2628 in an exemplary embodiment of the invention. FIG. 73 illustrates an ABS view of write head 3000 after completion of step 2628 in an exemplary embodiment of the invention. FIG. 74 illustrates a top view of write head 3000 after completion of step 2628 in an exemplary embodiment of the invention. FIG. 75 illustrates a cross sectional view of write head 3000 after completion of step 2628 in an exemplary embodiment of the invention.

In FIG. 75, the front edge of magnetic material 5102 forms second flare point 4204 (see FIG. 42). Further, non-magnetic material 5402 provides a controlled separation between magnetic material 5102, which extends the depth of write pole 3004. Advantageously, the separation distance between wrap around shield 7202 and write pole 3004 can be accurately defined for optimal performance of write head 3000. Further, the method of FIGS. 26-29 accurately self-aligns second flare point 4204 and a back edge 7502 (see FIG. 75) of wrap around shield 7202 (see FIG. 77). This further results in better write performance for write head 3000. One advantage of method 2600 is the combined thicknesses of etchable layers 3006 and 3008 is the height of the combined thickness of magnetic layer 5102 and non-magnetic layer 5402 as plated. This allows for good control of the thickness of the plated materials.

While method 2600 has been illustrated as fabricating a wrap around shield 7202 of write head 3000, it will be appreciated that other types of shield fabrication may be utilized. For example, wrap around shield 7202 may be replaced by a top shield only, side shields only, a draping wrap around shield, etc. Those of ordinary skill in the art will appreciate adjustments to the above described method to fabricate these different types of shield structures.

Figure 76:
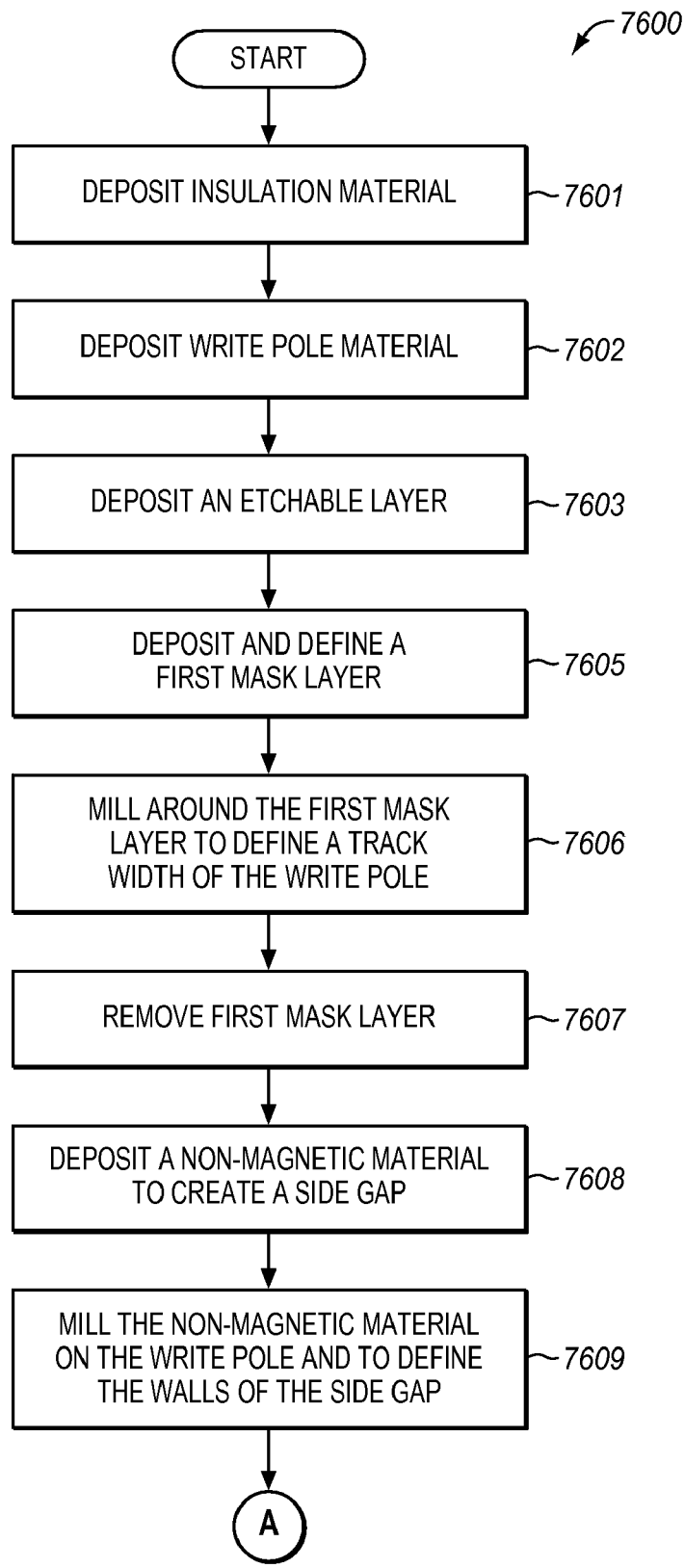
FIGS. 76-78 are flow charts illustrating another method for fabricating a write head in an exemplary embodiment of the invention.
Figure 77:
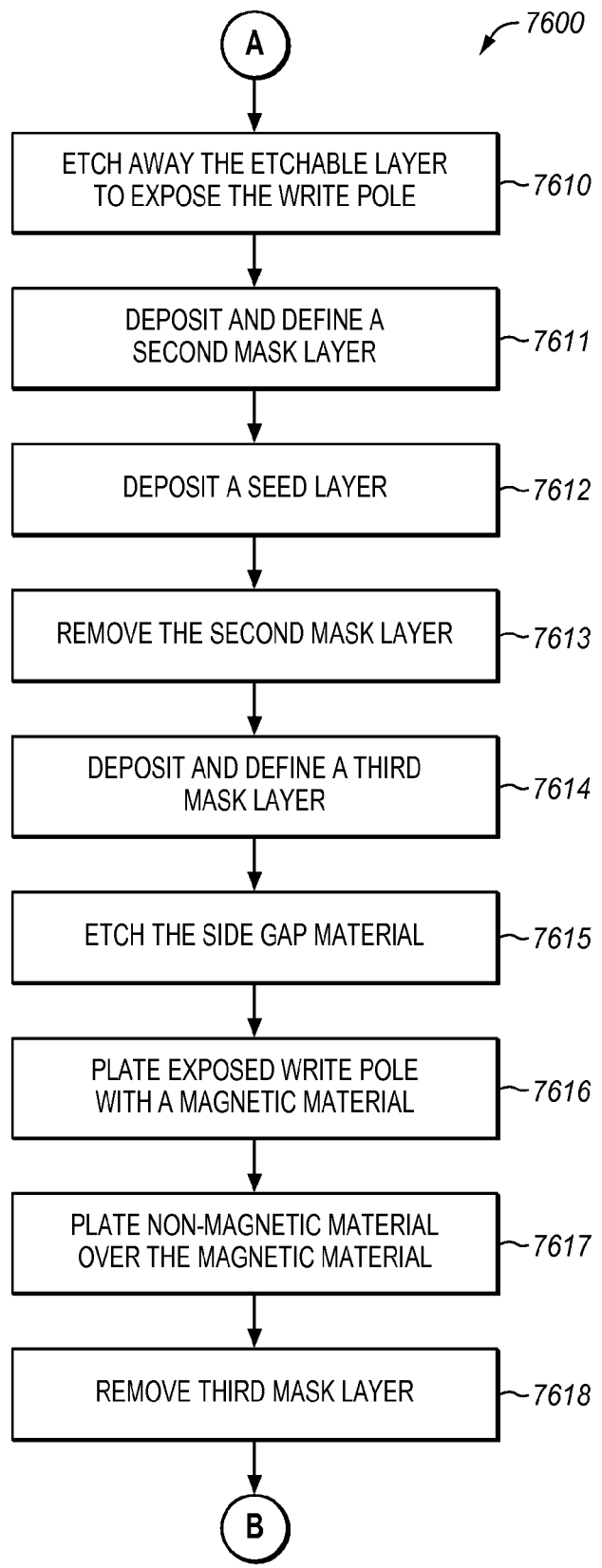
Figure 78:
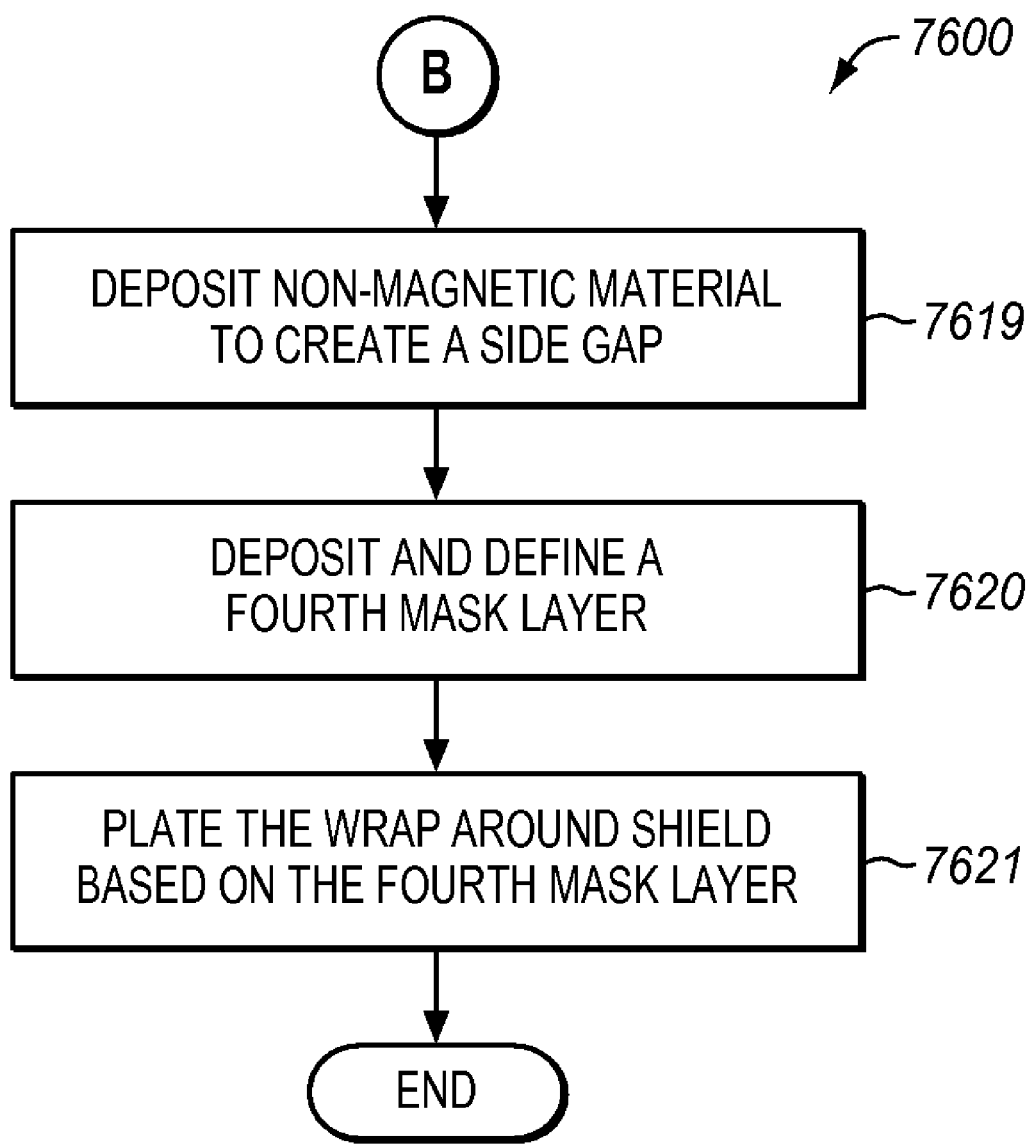

FIGS. 76-78 are flow charts illustrating another method 7600 for fabricating a write head in an exemplary embodiment of the invention. FIGS. 79-102 illustrate top, side, and cross sectional views of a write head 7900 during fabrication according to method 7600 in exemplary embodiments of the invention, and the steps of method 7600 will be described in reference to write head 7900. The steps of method 7600 may not be all-inclusive, and may include other steps not shown for the sake of brevity.

Figure 79:
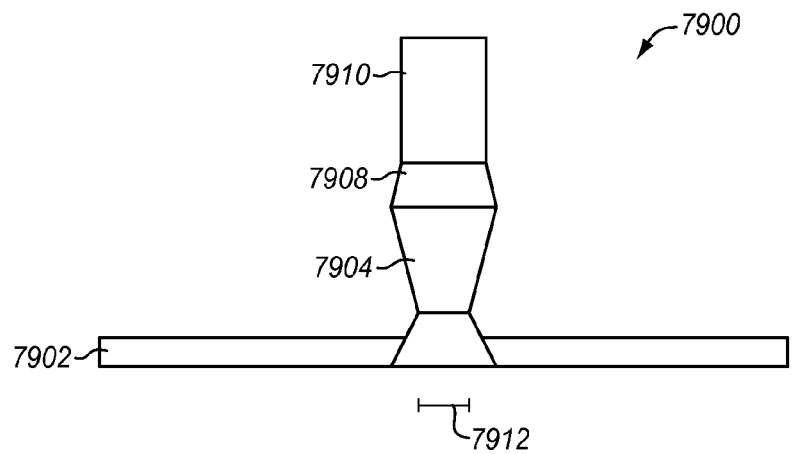
FIG. 79 illustrates an ABS view of a write head after completion of steps 7601-7606 of FIGS. 26-29 in an exemplary embodiment of the invention.

Step 7601 (see FIG. 76) comprises depositing insulation material 7902 (see FIG. 79). Insulation material may comprise alumina or a material having similar properties. Step 7602 (see FIG. 79) comprises depositing write pole material 7904 over insulation material 7902. Write pole material 7904 may comprise CoFe or a material having equivalent magnetic properties. Step 7603 (see FIG. 76) comprises depositing a first layer 7908 of etchable material. Etchable layer 7908 acts as an ion mill hard mask to pattern the write pole material 7904, and controls the separation distance between write pole material 7904 and subsequently formed shields of write head 7900. Optional, a silicon adhesion can be deposited prior to deposition of the etchable layer 7908.

Figure 80:
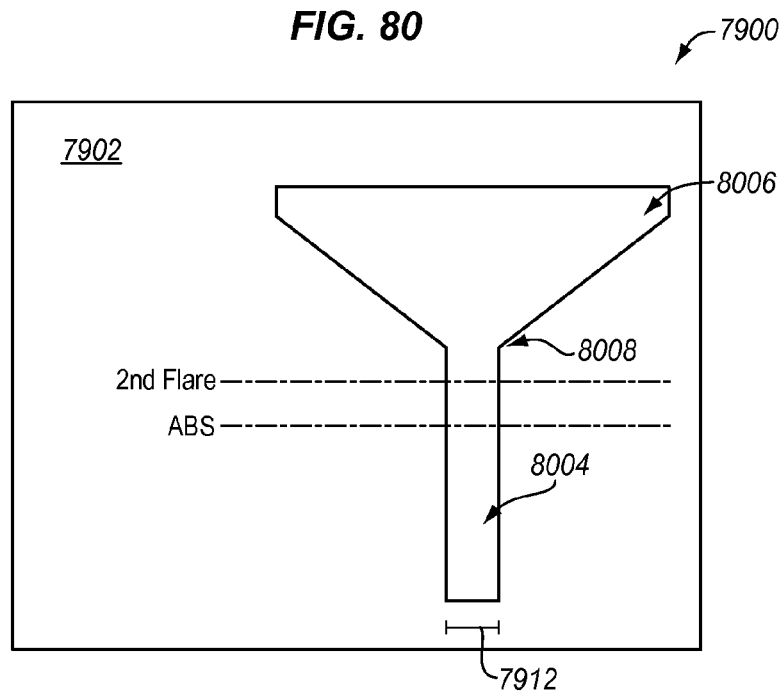
FIG. 80 illustrates a top view of a write pole of a write head after completion of steps 7106-7606 of FIGS. 26-29 in an exemplary embodiment of the invention.

Step 7605 (see FIG. 76) comprises depositing and defining a first mask layer 7910 over etchable layer 7908. Mask layer 7910 may comprise DURIMIDE® and silicon oxide and may be defined using a photolithographic process and subsequent image transfer by reactive ion etching steps. The definition process defines a first stencil from mask layer 7910, and the dimensions of the first stencil are used to form a track width of a write pole and a flared region (or yoke) of the write pole. Step 7606 comprises milling around the first stencil to define the write pole 7904 from write pole material 7904. Particularly, the milling process defines a track width 7912 (see FIG. 80) of a pole tip 8004 (see FIG. 80) and a flared region 8006 of write pole 7910. Pole tip 8004 and flared region 8006 are coupled at a first flare point 8008. FIG. 79 illustrates an ABS view of write head 7900 after completion of step 7606 in an exemplary embodiment of the invention. FIG. 80 illustrates a top view of a write pole 7904 of write head 7900 after completion of step 7606 (see FIG. 76) in an exemplary embodiment of the invention. Those of ordinary skill in the art will appreciate that other layers may be present above write pole 7904 in FIG. 80 after completion of step 7606, but are not illustrated in FIG. 80 so as to not obscure the top view of write pole 7904. Step 7607 (see FIG. 76) comprises removing the first stencil. The first stencil may be removed using a tetramethyl ammonium hydroxide (TMAH) etching process and an N-methylpyrrolidone (NMP) stripping process.

Figure 81:
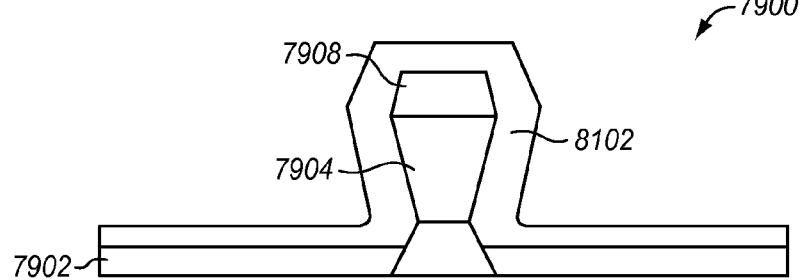
FIG. 81 illustrates an ABS view of a write head after completion of step 7608 of FIGS. 26-29 in an exemplary embodiment of the invention.
Figure 82:
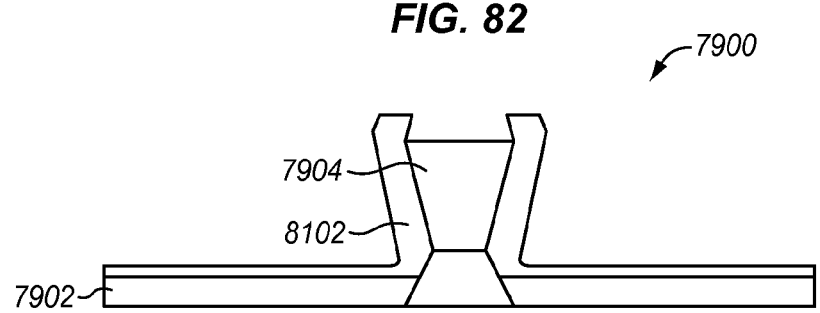
FIG. 82 illustrates an ABS view of a write head after completion of steps 7609-7910 of FIGS. 26-29 in an exemplary embodiment of the invention.

Step 7608 (see FIG. 76) comprises depositing non-magnetic material 8102 (see FIG. 81) to form a side gap of write head 7900 and to use as a BARC material to prevent reflective notching of subsequently deposited layers. Non-magnetic 8102 material may comprise of $SiO_xN_y$, $Si_3N_4$, or any etchable material having similar properties as an anti-reflective layer. FIG. 81 illustrates an ABS view of write head 7900 after completion of step 7608 in an exemplary embodiment of the invention. Step 7609 (see FIG. 76) comprises milling to remove the non-magnetic material 8102 on top of write pole 7904, and to define the size of the side gap of write head 7900 if needed. Step 7610 (see FIG. 77) comprises etching away etchable layer 7908 using reactive ion etching (RIE) with oxygen or carbon dioxide chemistries to expose write pole 7904. FIG. 82 illustrates an ABS view of write head 7900 after completion of steps 7609-7910 in an exemplary embodiment of the invention.

Figure 83:
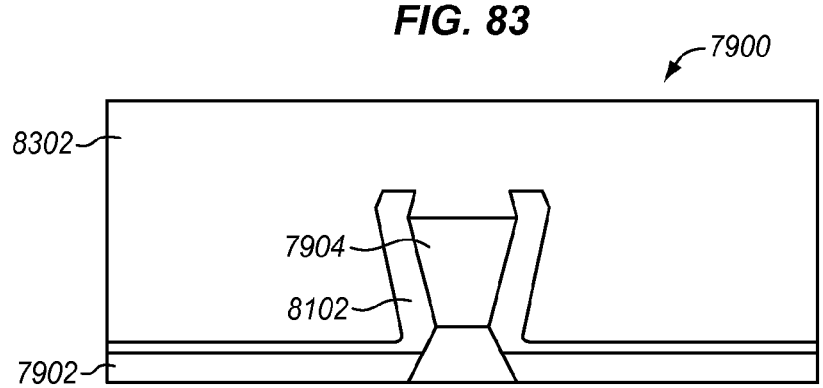
FIG. 83 illustrates an ABS view of a write head after completion of step 7611 of FIGS. 26-29 in an exemplary embodiment of the invention.
Figure 84:
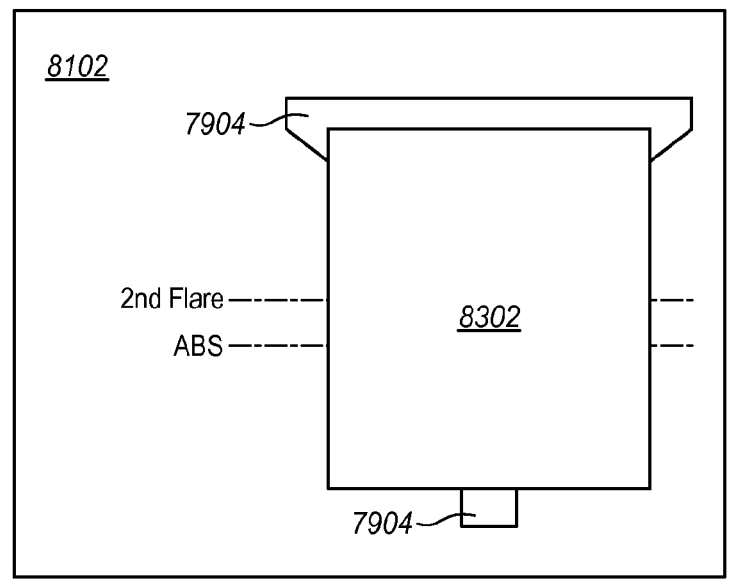
FIG. 84 illustrates a top view of a write head after completion of step 7611 of FIGS. 26-29 in an exemplary embodiment of the invention.

Step 7611 (see FIG. 77) comprises depositing a second mask layer 8302 (see FIG. 83) and performing a photolithographic process to remove portions of mask layer 8302, exposing portions of write pole 7904. The exposed portions of write pole 7904 define where leads will be subsequently fabricated on write head 7900. FIG. 83 illustrates an ABS view of write head 7900 after completion of step 7611 in an exemplary embodiment of the invention. FIG. 84 illustrates a top view of write head 7900 after completion of step 7611 in an exemplary embodiment of the invention.

Figure 85:
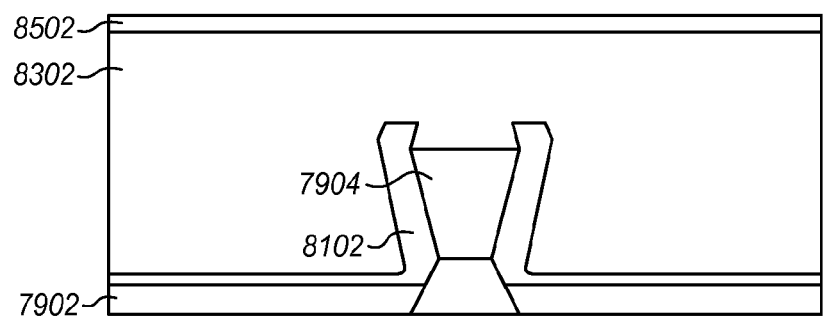
FIG. 85 illustrates an ABS view of a write head after completion of step 7612 of FIGS. 26-29 in an exemplary embodiment of the invention.
Figure 86:
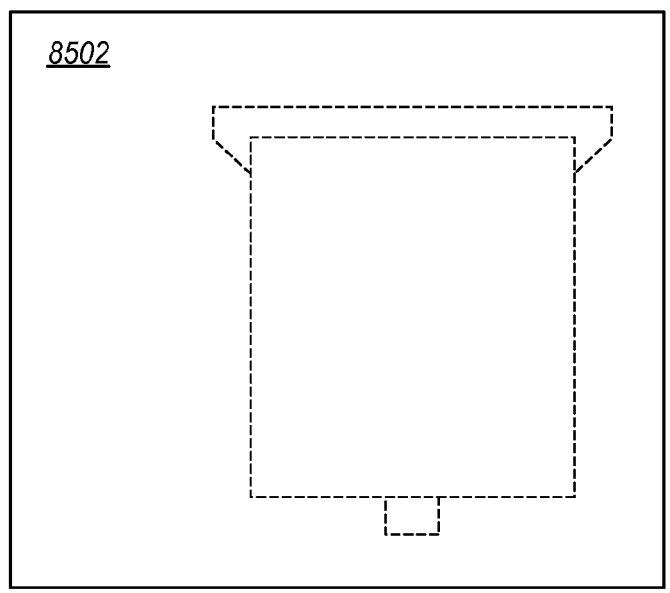
FIG. 86 illustrates a top view of a write head after completion of step 7612 of FIGS. 26-29 in an exemplary embodiment of the invention.

Step 7612 (see FIG. 77) comprises depositing a seed layer 8502 (see FIG. 85). Seed layer 8502 is deposited over the exposed portions of pole tip 8004 and flared region 8006. Seed layer 8502 may comprise Ta adhesion layer and an Rh seed layer with CoFe, NiFe, or alloys thereof as a thin cap. Other materials may be utilized in seed layer 8502, including Cr or Si as adhesion layer materials, and/or Pd, Au, Ag, Ir, or Ru as seed layer materials. FIG. 85 illustrates an ABS view of write head 7900 after completion of step 7612 in an exemplary embodiment of the invention. FIG. 86 illustrates a top view of write head 7900 after completion of step 7612 in an exemplary embodiment of the invention. The dotted lines illustrate the layers that are covered by seed layer 8502.

Figure 87:
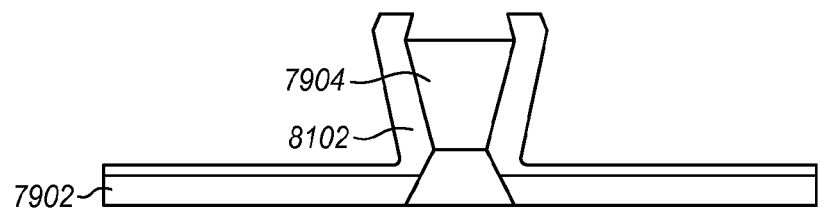
FIG. 87 illustrates an ABS view of a write head after completion of step 7613 of FIGS. 26-29 in an exemplary embodiment of the invention.
Figure 88:
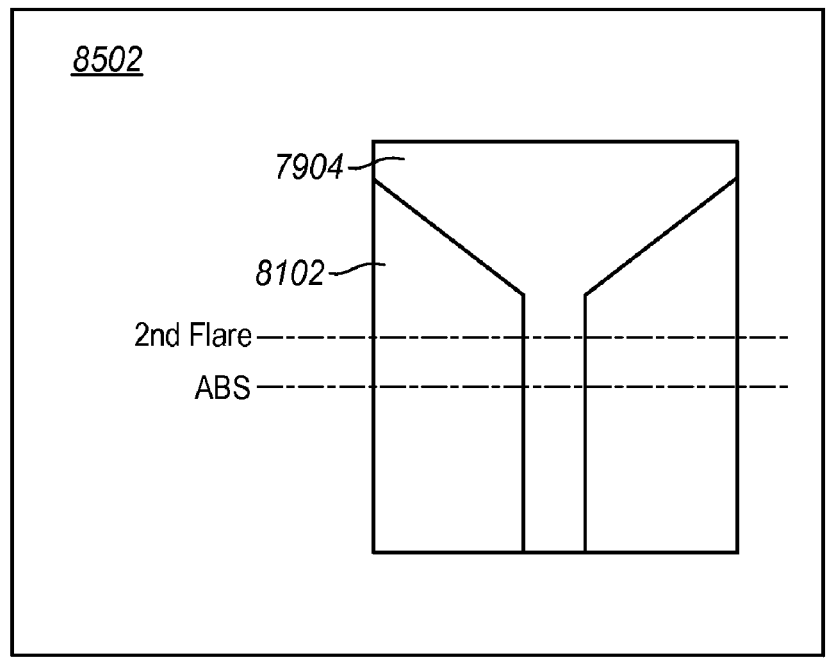
FIG. 88 illustrates a top view of a write head after completion of step 7613 of FIGS. 26-29 in an exemplary embodiment of the invention.

Step 7613 (see FIG. 77) comprises removing second mask layer 8302. Mask layer 8302 may be removed using a standard liftoff process. The removal process exposes portions of write pole 7904. FIG. 87 illustrates an ABS view of write head 7900 after completion of step 7613 in an exemplary embodiment of the invention. FIG. 88 illustrates a top view of write head 7900 after completion of step 7613 in an exemplary embodiment of the invention.

After completion of step 7613, a portion of flared region 8006 is covered by seed layer 8502, and a portion of pole tip 8004 is also covered by seed layer 8502. The portions of flared region 8006 and pole tip 8004 covered by seed layer 8502 is utilized to connect leads to write head 7900.

Figure 89:
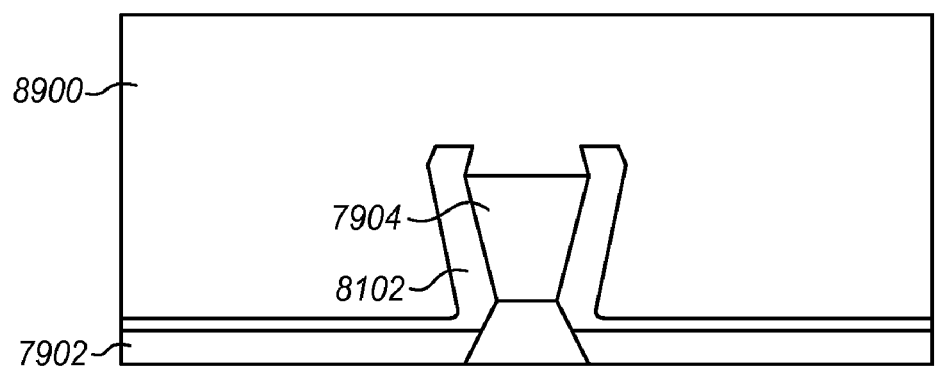
FIG. 89 illustrates an ABS view of a write head after completion of step 7614 of FIGS. 26-29 in an exemplary embodiment of the invention.
Figure 90:
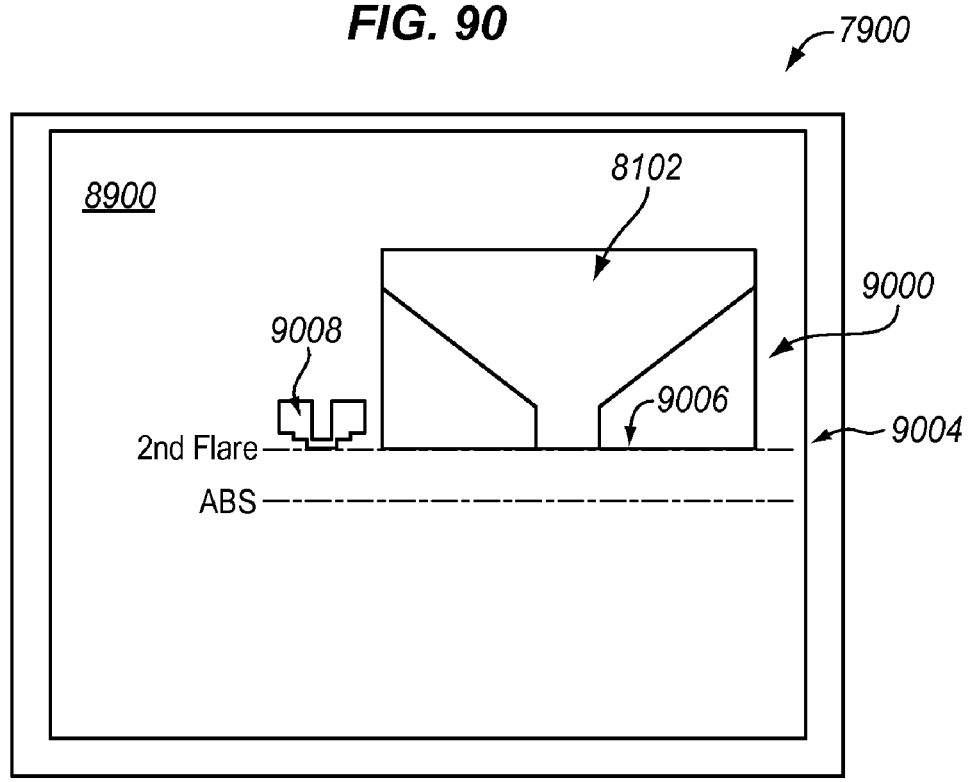
FIG. 90 illustrates a top view of a write head after completion of step 7614 of FIGS. 26-29 in an exemplary embodiment of the invention.

Step 7614 (see FIG. 77) comprises depositing a third mask layer 8900 (see FIG. 89), and performing a photolithographic process to define a second stencil having an opening 9000 (see FIG. 90). A second flare point 9004 of write pole 7904 is defined by an edge 9006 of opening 9000 closest to an air bearing surface of pole tip 8004 (not visible in FIG. 90).

Figure 91:
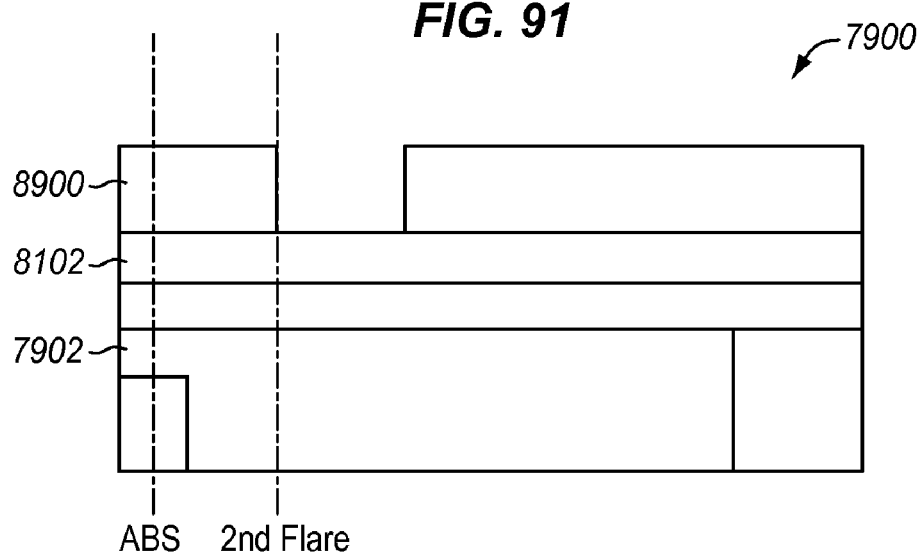
FIG. 91 illustrates a cross sectional view of write head 7900 after completion of step 7614 in an exemplary embodiment of the invention.

The photolithographic process may optionally comprise removing additional portions of third mask layer 8900 to form openings for fabricating electronic lapping guides (ELGS) 9008, which may be aligned with edge 9006, and thus, the second flare point 9004 of write pole 7904. FIG. 89 illustrates an ABS view of a write head after completion of step 7614 of FIGS. 26-29 in an exemplary embodiment of the invention. FIG. 90 illustrates a top view of write head 7900 after completion of step 7614 in an exemplary embodiment of the invention. FIG. 91 illustrates a cross sectional view of write head 7900 after completion of step 7614 in an exemplary embodiment of the invention.

Figure 92:
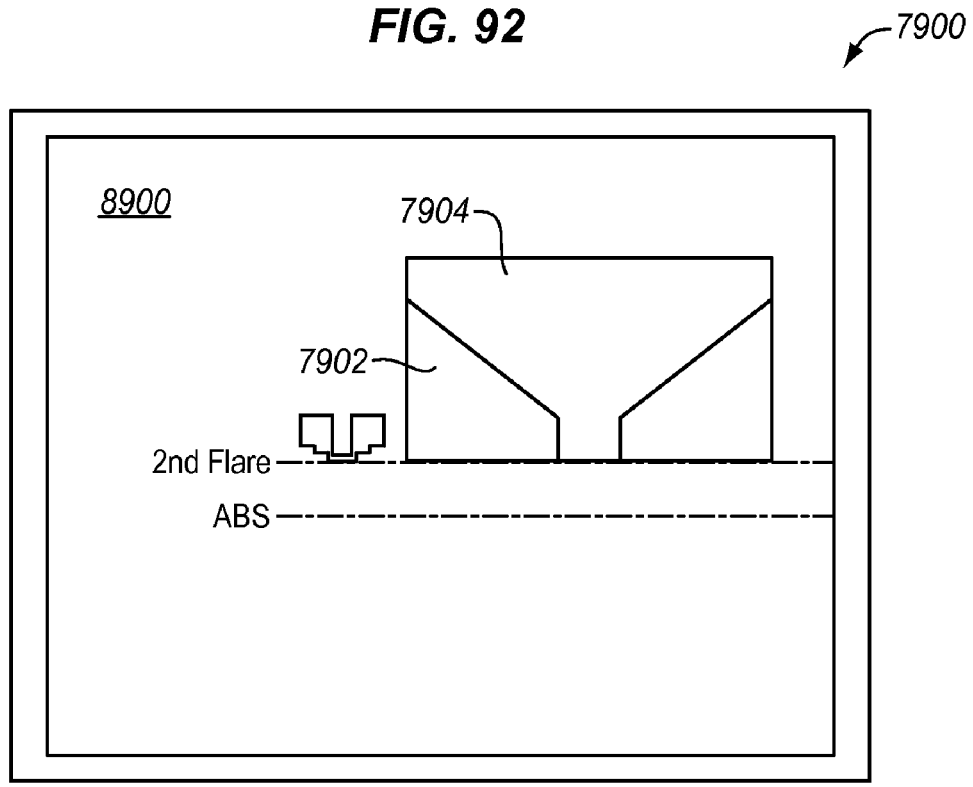
FIG. 92 illustrates a top view of a write head after completion of step 7615 of FIGS. 26-29 in an exemplary embodiment of the invention.
Figure 93:
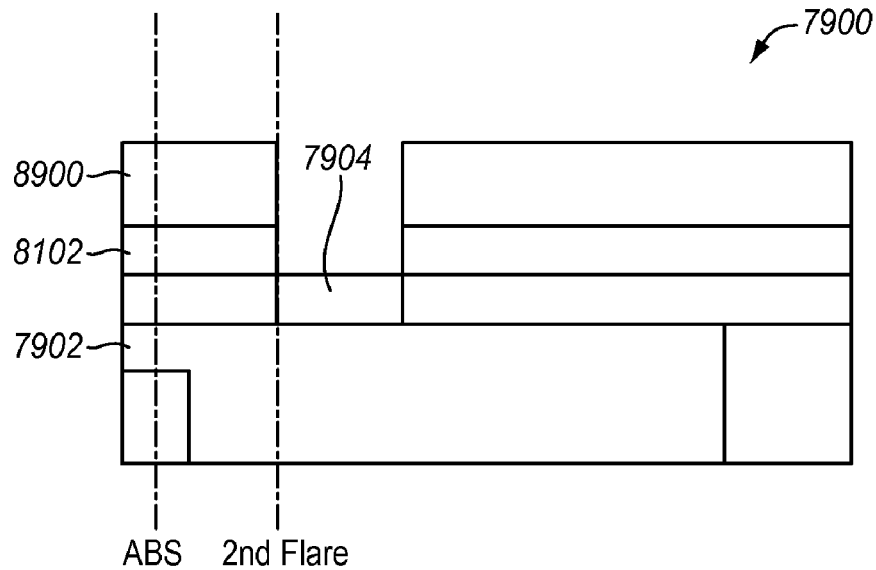
FIG. 93 illustrates a cross sectional view of a write head after completion of step 7615 of FIGS. 26-29 in an exemplary embodiment of the invention.

Step 7615 (see FIG. 77) comprises performing an etching process to remove the non-magnetic layer around the yoke 8006 and the upper portion of the pole tip 8004. The etching process may comprise a RIE process using $CF_4$ chemistry. FIG. 92 illustrates a top view of write head 3000 after completion of step 7615 in an exemplary embodiment of the invention. The etching process exposes the insulating layer 7902. FIG. 93 illustrates a cross sectional view of write head 7900 after completion of step 7615 in an exemplary embodiment of the invention.

Figure 94:
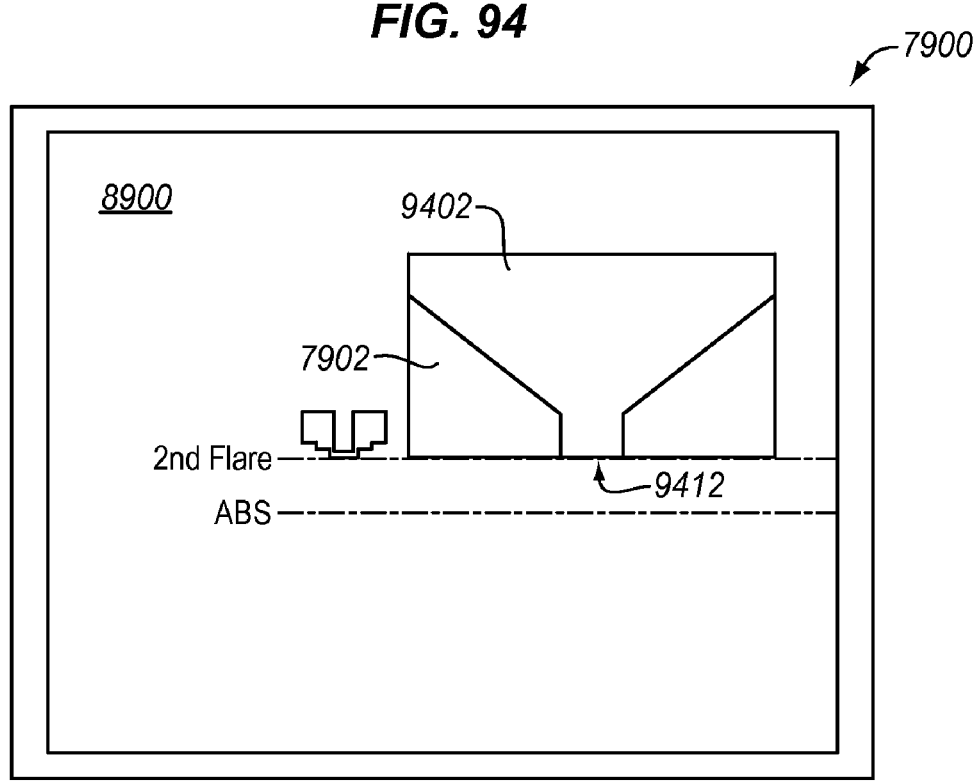
FIG. 94 illustrates a top view of a write head after completion of step 7616 of FIGS. 26-29 in an exemplary embodiment of the invention.
Figure 95:
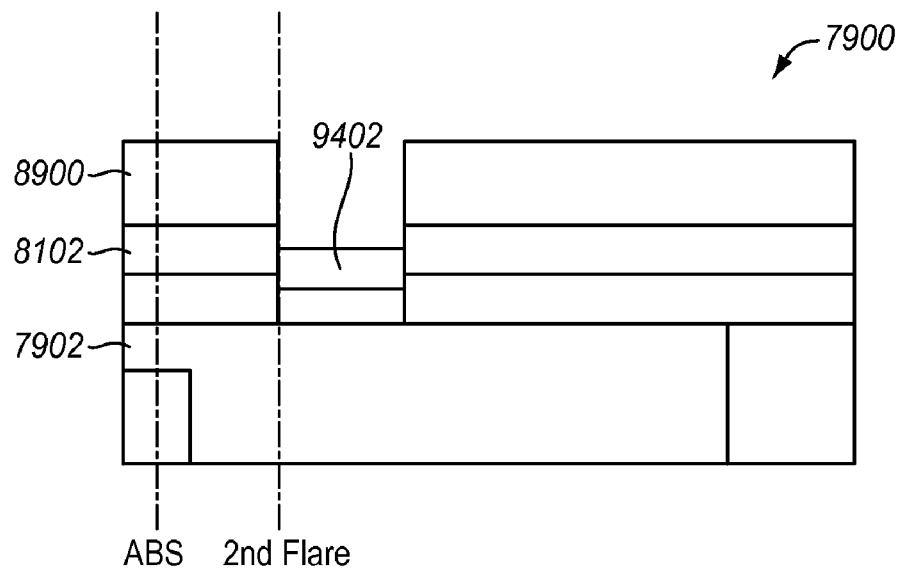
FIG. 95 illustrates a cross sectional view of a write head after completion of step 7616 of FIGS. 26-29 in an exemplary embodiment of the invention.

Step 7616 (see FIG. 77) comprises plating exposed portions of write pole 7904 with a magnetic material 9402 (see FIG. 94). More particularly, magnetic material 9402 is plated on a portion of flared region 8006 and the upper portion of pole tip 8004 closest to first flare point 8008. The plating process may optionally plate ELGs 9008 if desired. Magnetic material 9402 may comprise CoFe or a material having similar magnetic properties. The plating process thus increases the depth of portions of write pole 7904 exposed by the second stencil. FIG. 94 illustrates a top view of write head 3000 after completion of step 7616 in an exemplary embodiment of the invention. FIG. 95 illustrates a cross sectional view of write head 3000 after completion of step 7616 in an exemplary embodiment of the invention. As illustrated in FIG. 94, an edge 9412 of magnetic material 9402 forms second flare point (see FIG. 94) of write head 7900.

Figure 96:
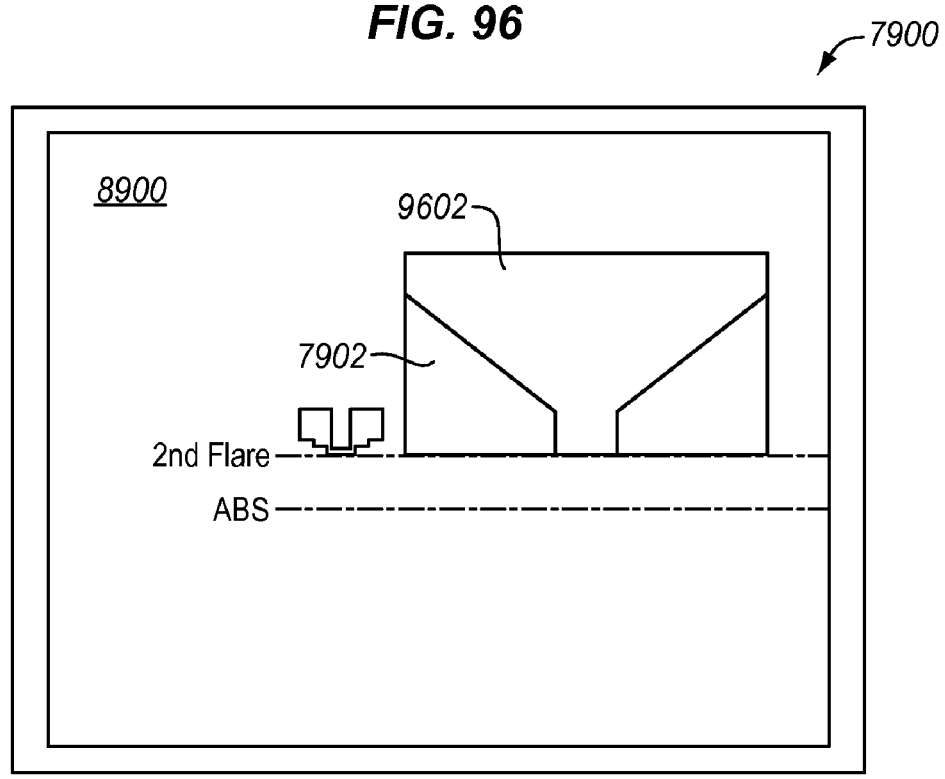
FIG. 96 illustrates a top view of a write head after completion of step 7617 of FIGS. 26-29 in an exemplary embodiment of the invention.
Figure 97:
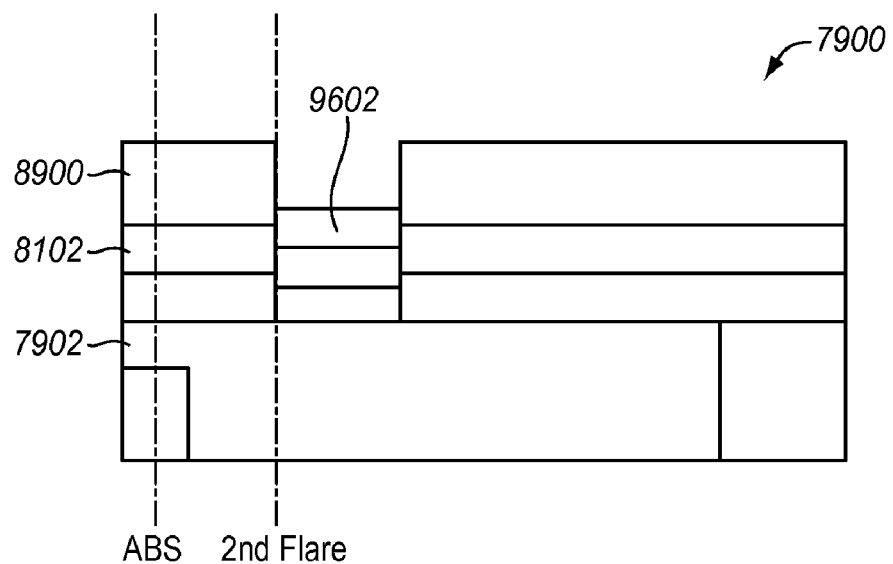
FIG. 97 illustrates a cross sectional view of a write head after completion of step 7617 of FIGS. 26-29 in an exemplary embodiment of the invention.

Step 7617 (see FIG. 77) comprises plating non-magnetic material 9602 (see FIG. 96) over magnetic material 9402. Non-magnetic material 9602 forms a controlled spacing between write pole 7904 and a subsequently formed shield of write head 7900. FIG. 96 illustrates a top view of write head 7900 after completion of step 7617 in an exemplary embodiment of the invention. FIG. 97 illustrates a cross sectional view of write head 7900 after completion of step 7617 in an exemplary embodiment of the invention. Step 7618 comprises removing mask structure 8900. After plating, layer 8900 is removed by NMP before proceeding with step 7618.

Figure 98:
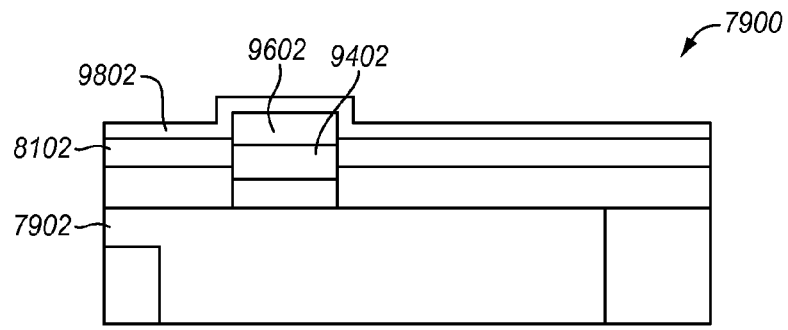
FIG. 98 illustrates a cross sectional view of a write head after completion of step 7618 of FIGS. 26-29 in an exemplary embodiment of the invention.

Step 7618 (see FIG. 78) comprises depositing a layer of non-magnetic material 9802 (see FIG. 98) to form a wrap around shield gap. Non-magnetic material 9802 may comprise a metallic material so that a subsequently formed wrap around shield may be plated over non-magnetic material 9802. Non-magnetic material may comprise a Ta adhesion layer and an Rh seed layer with CoFe, NiFe, or alloys thereof as a thin cap. Other materials may be utilized in seed layer including Cr or Si as adhesion layer materials, and/or Pd, Au, Ag, Ir, or Ru as seed layer materials. Before step 7618 is performed, a photo step may be performed to protect the ELG. Material 9802 is deposited, and the resist is removed with a lift-off process. A seed may then be deposited everywhere except in the area of the ELG. FIG. 98 illustrates a cross sectional view of write head 7900 after completion of step 7618 in an exemplary embodiment of the invention.

Figure 99:
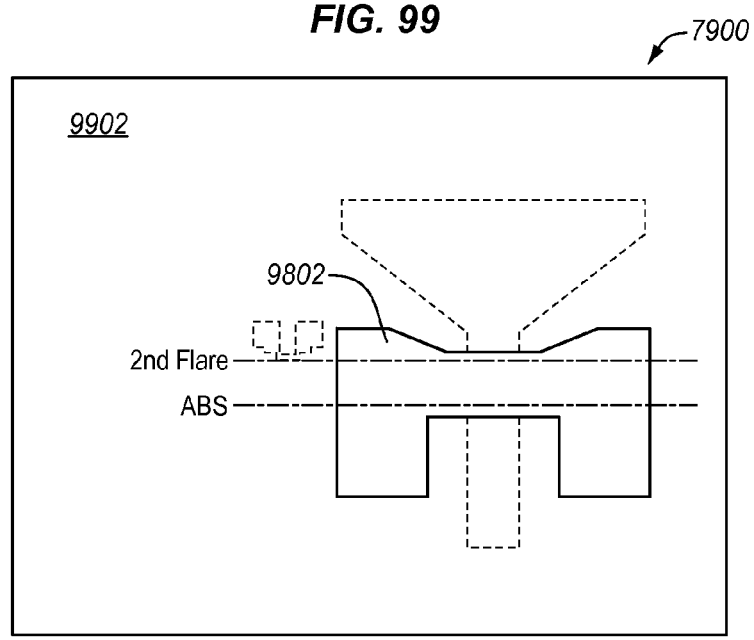
FIG. 99 illustrates a top view of a write head after completion of step 7619 of FIGS. 26-29 in an exemplary embodiment of the invention.
Figure 100:
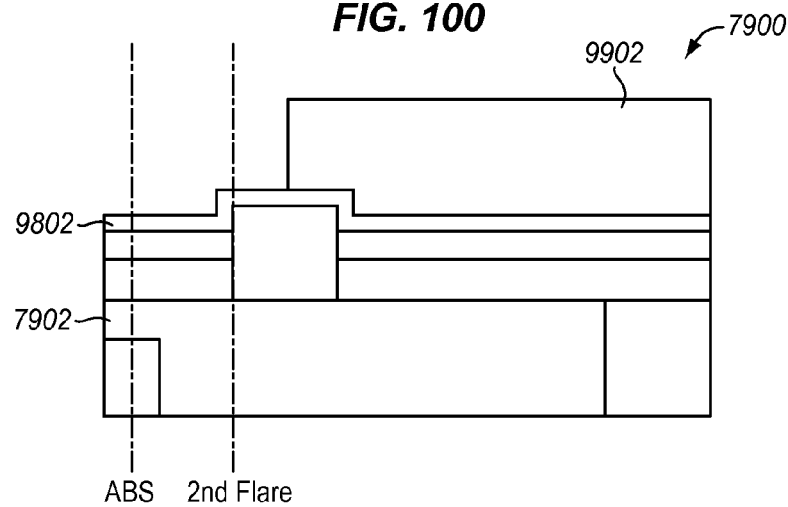
FIG. 100 illustrates a cross sectional view of a write head after completion of step 7619 of FIGS. 26-29 in an exemplary embodiment of the invention.

Step 7619 (see FIG. 78) comprises depositing a fourth mask layer 9902 (see FIG. 99) and performing a photolithographic process on mask layer 9902 to expose a location where a subsequently formed wrap around shield will be fabricated on write head 7900. FIG. 99 illustrates a top view of write head 7900 after completion of step 7619 in an exemplary embodiment of the invention. FIG. 100 illustrates a cross sectional view of write head 3000 after completion of step 7619 in an exemplary embodiment of the invention.

Figure 101:
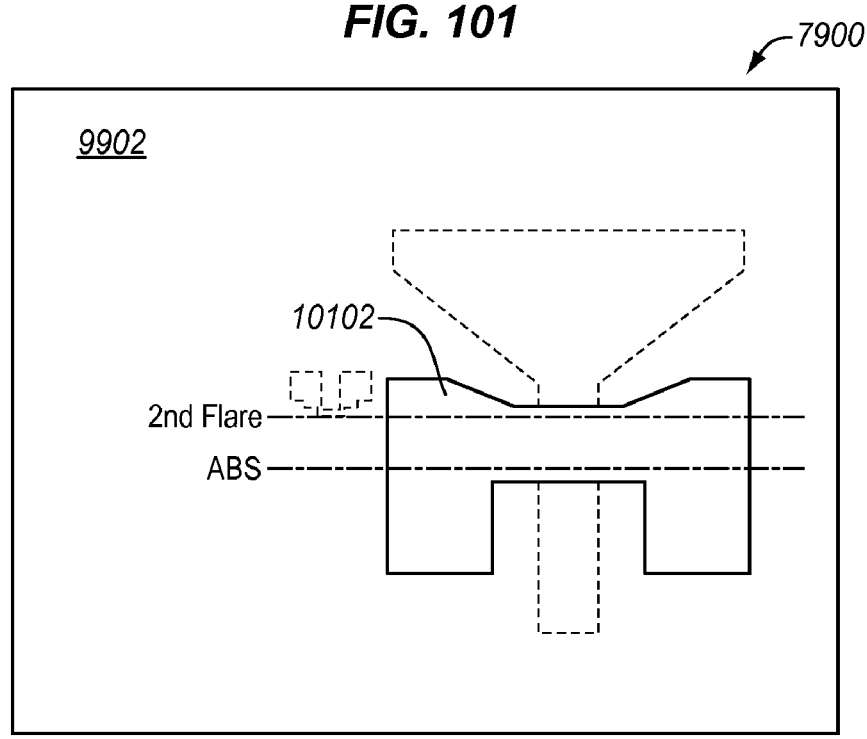
FIG. 101 illustrates a top view of a write head after completion of step 7620 of FIGS. 26-29 in an exemplary embodiment of the invention.
Figure 102:
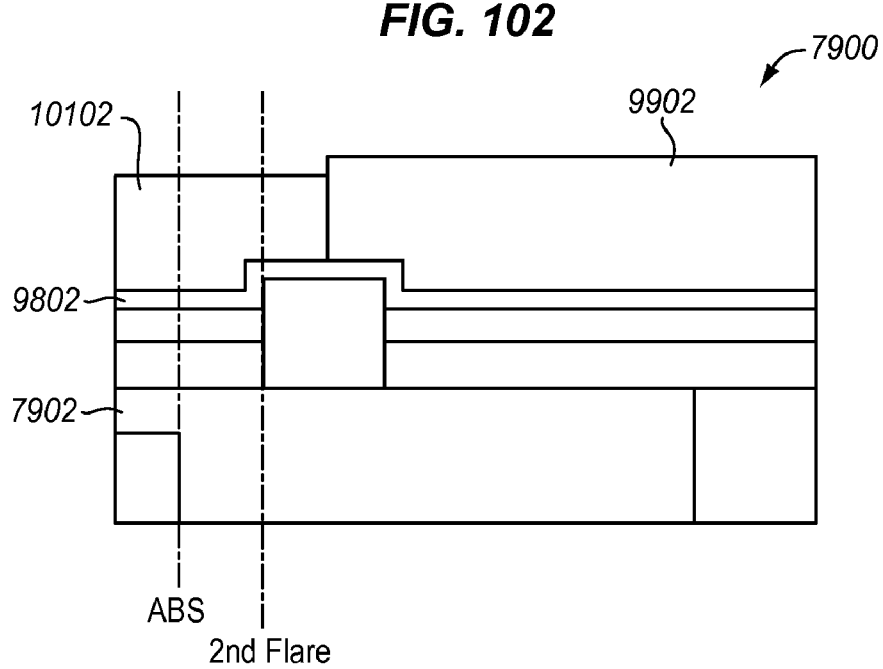
FIG. 102 illustrates a cross sectional view of a write head after completion of step 7620 of FIGS. 26-29 in an exemplary embodiment of the invention.

Step 7620 (see FIG. 78) comprises plating exposed portions of non-magnetic material 9802 to form a wrap around shield 10102 (see FIG. 101). FIG. 101 illustrates a top view of write head 7900 after completion of step 7620 in an exemplary embodiment of the invention. Wrap around shield 10102 may comprise a magnetic material such as CoFe, NiFe, or alloys thereof. Mask layer 9902 may then be removed, and subsequent processes may be performed to complete the fabrication process. FIG. 102 illustrates a cross sectional view of write head 7900 after completion of step 7620 in an exemplary embodiment of the invention.

In FIG. 102, the separation distance between wrap around shield 10102 and write pole 7904 can be accurately defined for optimal performance of write head 7900. While method 7600 has been illustrated as fabricating a wrap around shield 10202 of write head 7900, it will be appreciated that other types of shield fabrication may be utilized. For example, wrap around shield 10102 may be replaced by a top shield only, side shields only, a draping wrap around shield, etc. Those of ordinary skill in the art will appreciate adjustments to the above described method to fabricate these different types of shield structures.

For method 7600, the write pole is fabricated and then the side gap is defined (see layer 8102 in FIG. 81). After the side gap is defined, the secondary flare point and the back edge of the bump are defined by opening 9000 in third mask layer 8900 (see FIG. 90). One advantage of this process sequence is the thickness of the non-magnetic material 9802 defines the distance between the write pole 7904 and the wrap around shield 10102.

Figure 103:
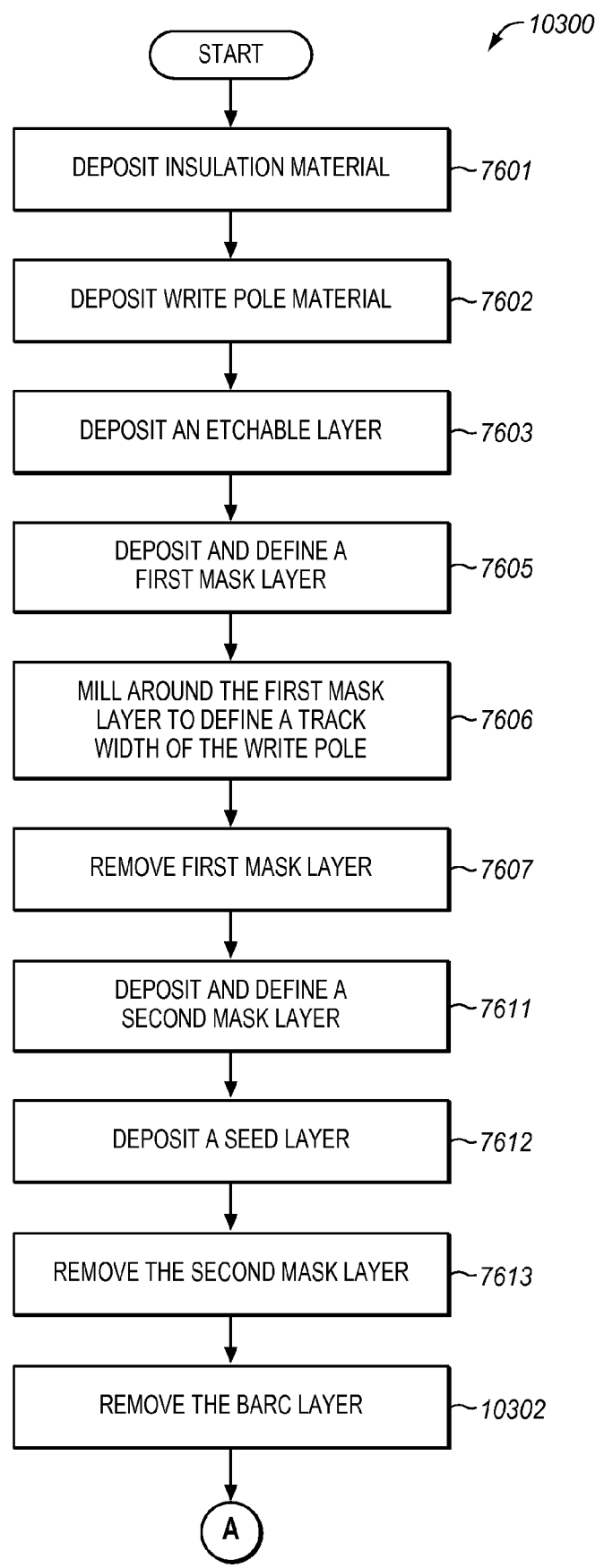
FIGS. 103-105 are flow charts illustrating a sequence modification of the method of FIGS. 76-78 for fabricating a write head in an exemplary embodiment of the invention.
Figure 104:
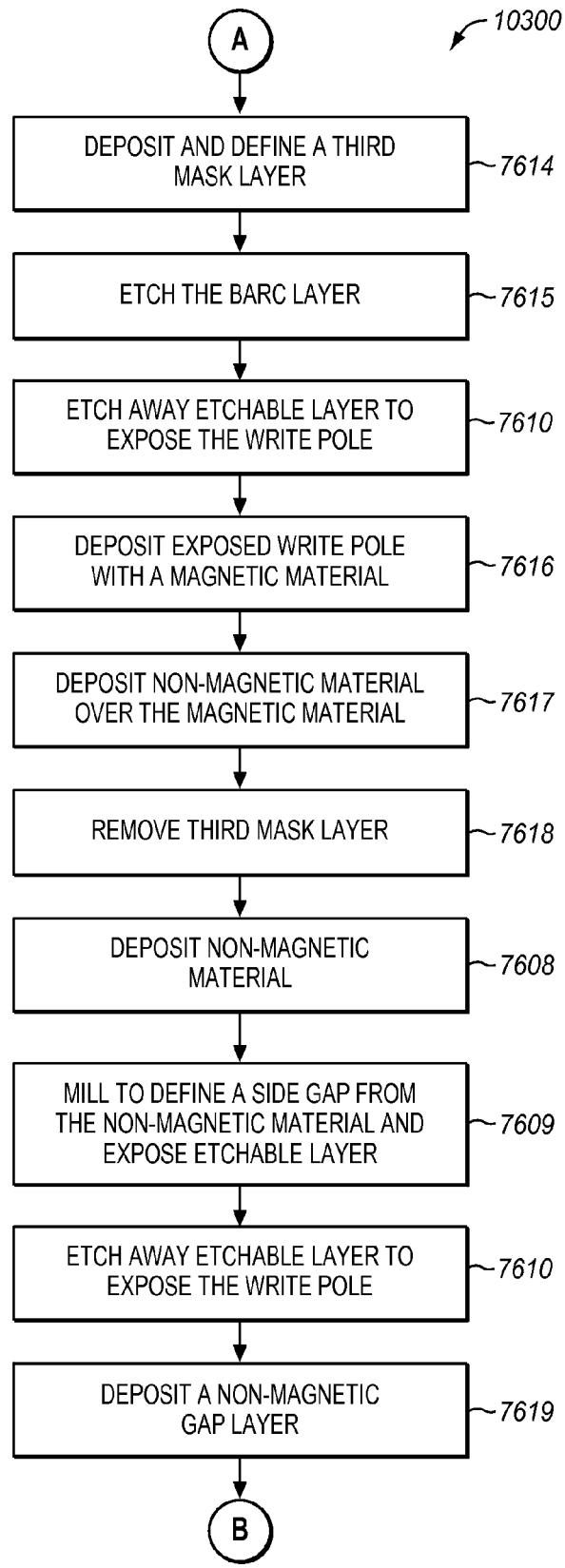

The order of method 7600 may be changed in other embodiments so that the secondary flare point and the back edge of the bump are defined with a mask layer before the side gap is defined. FIGS. 103-105 are flow charts illustrating a sequence modification of method 7600 for fabricating a write head in an exemplary embodiment of the invention. Steps 7601-7607 of method 7600 in FIGS. 103-105 are similar to FIGS. 76-78. Instead of depositing a non-magnetic material in step 7608 as in FIGS. 76-78, method 7600 in FIGS. 103-105 jumps to step 7611 of depositing and defining a second mask layer without first defining the walls of the side gap. Method 7600 in FIGS. 103-105 proceeds with steps 7611-7613. After step 7613, a thin BARC layer is deposited in step 10302. Method 7600 in FIGS. 103-105 proceeds with steps 7614-7618. After removing the third mask layer in step 7618, non-magnetic material 9802 is deposited in step 7608 to create a side gap. A milling step is then performed in step 7609 to define a side gap and expose the etchable layer 7908. The etchable layer 7908 is then etched in step 7610 to expose the write pole 7904. Method 7600 in FIGS. 103-105 then proceeds with steps 7619-7621.

One advantage of this modified process sequence of method 7600 in FIGS. 103-105 is the thickness of the non-magnetic material 9802 defines the distance between the write pole 7904 and the wrap around shield 10102 only on top of the write pole. The separation on the sides of the write pole 7904 and the wrap around shield 10102 is the combined thicknesses of the nonmagnetic material deposited in steps 7608 and 7619. As a result, the top gap material separating the trailing edge of the second flare point and the write pole 7904 from the wrap around shield 10102 has a thickness that is less than the thickness of the side gap material separating the sides of the second flare point and the write pole 7904 from the wrap around shield 10102.

Although specific embodiments were described herein, the scope of the invention is not limited to those specific embodiments. The scope of the invention is defined by the following claims and any equivalents thereof.

I claim:

1. A method for fabricating a write head, the method comprising:
    performing a lithographic process to form a write pole having a pole tip and a yoke intersecting at a flare point;
    forming a first mask structure having a bump opening corresponding with the flare point of the write pole;
    forming separation material in the bump opening of the first mask structure to form a bump;
    removing the first mask structure;
    forming a second mask structure having a shield opening over the pole tip between an air bearing surface and the flare point that at least partially exposes the bump; and
    forming shield material in the shield opening over the pole tip and the bump to form a wrap around shield, wherein the bump creates a larger spacing between the wrap around shield and an upper portion of the pole tip proximate to the flare point as compared to the spacing between the wrap around shield and a lower portion of the pole tip proximate to the air bearing surface.

2. The method of claim 1 further comprising forming a seed layer on the write pole prior to forming the first mask structure, wherein forming the separation material further comprises:
    plating the separation material on the seed layer exposed by the bump opening in the first mask structure.

3. The method of claim 1 wherein the separation material comprises one of NiP, Au, Pd, or Cu.

4. The method of claim 1 further comprising:
    forming a cap layer above the bump from one of CoFe, CoFeNi, or NiFe.

5. The method of claim 1 wherein:
    forming the second mask structure further comprises forming a lapping guide opening defining an electronic lapping guide aligned with an edge of the shield opening; and
    forming the shield material further comprises forming an electrical lapping guide in the lapping guide opening with the shield material.

6. The method of claim 1 wherein forming shield material in the shield opening to form a wrap around shield comprises:
    plating the shield material in the shield opening to form the wrap around shield.

7. A method for fabricating a write head, the method comprising:
    depositing a layer of write pole material and a layer of etchable material on the write pole material;
    depositing a first mask layer and etching the first mask layer to form a first stencil defining a track width and a flared region of a write pole;
    milling around the first stencil to define the track width and the flared region;
    depositing side gap material and milling the side gap material to form a side gap of the write pole;
    depositing a sacrificial material layer;
    performing a chemical mechanical polishing (CMP) process down to the layer of etchable material which removes the first stencil;
    removing the sacrificial material layer;
    etching to remove the layer of etchable material;
    forming a seed layer structure;
    depositing a second mask layer and performing a photolithographic process on the second mask layer to form a first opening exposing portions of the seed layer structure covering at least a portion of the flared region of the write pole and a portion of a pole tip of the write pole;

plating exposed portions of the seed layer structure with a separation material;

removing the second mask layer;

depositing a cap layer;

depositing a third mask layer and performing a photolithographic process on the third mask layer to form a second opening defining a wrap around shield; and plating the wrap around shield in the second opening.

8. The method of claim 7 wherein the layer of etchable material comprises a carbon material with a film density higher than about 1.8 g/cc.

9. The method of claim 7 wherein the side gap material is comprised of a of nonmagnetic material comprising $Al_2O_3$.

10. The method of claim 7 wherein the sacrificial material comprises one of $Ta_2O_5$, $Si_3N_4$, SiOxNy, or $SiO_2$.

11. The method of claim 7 wherein the separation material comprises one of NiP, Au, Pd, or Cu.

12. The method of claim 7 further comprising:

milling portions of the cap layer exposed by the wrap around shield.

13. The method of claim 7 wherein:

the second opening in the third mask structure further defines a lapping guide opening for an electronic lapping guide aligned with an edge of the second opening; and plating the wrap around shield in the second opening further comprises plating an electrical lapping guide in the lapping guide opening.

* * * * *

UNITED STATES PATENT AND TRADEMARK OFFICE
CERTIFICATE OF CORRECTION

PATENT NO.         : 8,099,855 B2                                     Page 1 of 1
APPLICATION NO.    : 11/957467
DATED              : January 24, 2012
INVENTOR(S)        : Le It is certified that error appears in the above-identified patent and that said Letters Patent is hereby corrected as shown below:

In column 8 line 43, the text "the CMP process hi step 109" should read -- the CMP process in step 109 --

In column 21 line 15, the text "9. The method of claim 7 wherein the side gap material is comprised of a of nonmagnetic material comprising $Al_2O_3$" should read -- 9. The method of claim 7 wherein the side gap material is comprised of a nonmagnetic material comprising $Al_2O_3$ --

Signed and Sealed this
Eighth Day of May, 2012

David J. Kappos
*Director of the United States Patent and Trademark Office*